US009143881B2

(12) United States Patent
Fan et al.

(10) Patent No.: US 9,143,881 B2
(45) Date of Patent: Sep. 22, 2015

(54) PROVIDING INTERACTIVE SERVICES TO ENHANCE INFORMATION PRESENTATION EXPERIENCES USING WIRELESS TECHNOLOGIES

(75) Inventors: James Fan, San Ramon, CA (US); Thomas Barrett, San Ramon, CA (US); Jennifer K. Lam, Fremont, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 603 days.

(21) Appl. No.: 12/911,265

(22) Filed: Oct. 25, 2010

(65) Prior Publication Data

US 2012/0102409 A1    Apr. 26, 2012

(51) Int. Cl.
*H04W 4/00* (2009.01)
*G06F 3/0481* (2013.01)
*G06Q 10/10* (2012.01)
*G06Q 30/02* (2012.01)

(52) U.S. Cl.
CPC ............... *H04W 4/00* (2013.01); *G06F 3/0481* (2013.01); *G06Q 10/10* (2013.01); *G06Q 30/02* (2013.01)

(58) Field of Classification Search
USPC .......................................................... 715/738
See application file for complete search history.

(56) References Cited

U.S. PATENT DOCUMENTS

| | | | | |
|---|---|---|---|---|
| 4,682,367 A * | 7/1987 | Childress et al. | ............... | 455/17 |
| 5,929,848 A * | 7/1999 | Albukerk et al. | ............. | 715/700 |
| 5,978,770 A * | 11/1999 | Waytena et al. | .................. | 705/5 |
| 6,046,689 A * | 4/2000 | Newman | ...................... | 340/996 |
| 6,061,571 A * | 5/2000 | Tamura | .......................... | 455/463 |
| 6,128,649 A * | 10/2000 | Smith et al. | .................... | 709/217 |
| 6,233,605 B1 * | 5/2001 | Watson | .......................... | 709/204 |
| 6,266,614 B1 * | 7/2001 | Alumbaugh | .................. | 701/468 |
| 6,401,032 B1 * | 6/2002 | Jamison et al. | ............... | 701/468 |
| 6,411,816 B1 * | 6/2002 | McDonald et al. | ........... | 455/518 |
| 6,456,930 B1 * | 9/2002 | Naito et al. | .................... | 701/410 |
| 6,526,351 B2 * | 2/2003 | Whitham | ...................... | 701/438 |
| 6,532,415 B2 * | 3/2003 | Nishikawa | .................... | 701/516 |
| 6,572,662 B2 * | 6/2003 | Manohar et al. | .............. | 715/273 |
| 6,691,153 B1 * | 2/2004 | Hanson et al. | ................ | 709/204 |
| 6,795,863 B1 * | 9/2004 | Doty, Jr. | ......................... | 709/231 |

(Continued)

OTHER PUBLICATIONS

"Guideport—The Ultimate Visitor Information System," <http://www.guidePORT.com>, 20 pages, published Apr. 9, 2009.

(Continued)

*Primary Examiner* — Steven B Theriault
(74) *Attorney, Agent, or Firm* — Amin, Turocy & Watson, LLP

(57) ABSTRACT

Systems, methods, and devices that provide interactive services relating to an information presentation to user equipment (UE) are presented. A presentation management component (PMC) provides at least a portion of the information presentation to one or more UEs, which can be integrated with the PMC, to facilitate enabling one or more UE users to use interactive services in relation to a tour of a point(s) of interest associated with the PMC. The interactive services comprise, for example, broadcast communications to desired UEs in a tour group, UE clustering, customized tour recommendations, whiteboard feature, note-taking functions, "slow down" option, and "raise hand" option. Respective UEs in a group are configured to be a master UE, sub-master UE, or slave UE, wherein the master UE at least partially controls communications of the other UEs in the group, and the sub-master UE at least partially controls communications of UEs in a sub-group.

20 Claims, 28 Drawing Sheets

(56) References Cited

U.S. PATENT DOCUMENTS

| | | | |
|---|---|---|---|
| 6,889,098 B1* | 5/2005 | Laval et al. | 700/19 |
| 6,889,900 B2* | 5/2005 | Davies et al. | 235/385 |
| 6,931,254 B1* | 8/2005 | Egner et al. | 455/456.3 |
| 6,985,240 B2* | 1/2006 | Benke et al. | 356/614 |
| 7,012,602 B2* | 3/2006 | Watson et al. | 345/419 |
| 7,013,290 B2* | 3/2006 | Ananian | 705/26.42 |
| 7,047,205 B2* | 5/2006 | Hale et al. | 705/5 |
| 7,107,010 B2* | 9/2006 | Heinonen et al. | 455/41.2 |
| 7,124,164 B1* | 10/2006 | Chemtob | 709/204 |
| 7,159,186 B2* | 1/2007 | Mattila et al. | 715/769 |
| 7,174,301 B2* | 2/2007 | Florance et al. | 705/313 |
| 7,212,919 B2* | 5/2007 | Chou et al | 701/533 |
| 7,212,983 B2* | 5/2007 | Redmann et al. | 705/6 |
| 7,218,941 B1* | 5/2007 | Kubo et al. | 455/456.6 |
| 7,240,108 B2* | 7/2007 | Smith et al. | 709/223 |
| 7,246,261 B2* | 7/2007 | Miller et al. | 714/6.32 |
| 7,269,434 B2* | 9/2007 | Tabata et al. | 455/519 |
| 7,293,243 B1* | 11/2007 | Ben-Shachar et al. | 715/781 |
| 7,323,991 B1* | 1/2008 | Eckert et al. | 340/572.1 |
| 7,334,190 B2* | 2/2008 | Wierowski | 715/712 |
| 7,353,252 B1* | 4/2008 | Yang et al. | 709/204 |
| 7,358,959 B2* | 4/2008 | Fitzsimmons, Jr. | 345/169 |
| 7,460,953 B2* | 12/2008 | Herbst et al. | 701/438 |
| 7,525,932 B2* | 4/2009 | Tischer | 370/310 |
| 7,526,718 B2* | 4/2009 | Samadani et al. | 715/201 |
| 7,595,798 B2* | 9/2009 | Ben-Shachar et al. | 345/418 |
| 7,652,594 B2* | 1/2010 | Lamont et al. | 340/988 |
| 7,657,594 B2* | 2/2010 | Banga et al. | 709/203 |
| 7,668,536 B2* | 2/2010 | Hull et al. | 455/414.1 |
| 7,675,412 B2* | 3/2010 | Adra | 340/539.13 |
| 7,685,134 B2* | 3/2010 | Myka et al. | 707/622 |
| 7,720,596 B2* | 5/2010 | Kobuya et al. | 701/426 |
| 7,721,223 B2* | 5/2010 | Ben-Shachar et al. | 715/790 |
| 7,747,688 B2* | 6/2010 | Narayanaswami et al. | 709/204 |
| 7,774,010 B2* | 8/2010 | Kokkonen et al. | 455/518 |
| 7,787,965 B2* | 8/2010 | Hale et al. | 700/17 |
| 7,823,068 B2* | 10/2010 | Cowtan et al. | 715/738 |
| 7,826,966 B2* | 11/2010 | Little et al. | 701/426 |
| 7,835,689 B2* | 11/2010 | Goldberg et al. | 455/3.06 |
| 7,920,169 B2* | 4/2011 | Jung et al. | 348/211.1 |
| 7,962,284 B2* | 6/2011 | Cutitta, II | 701/426 |
| 7,981,000 B2* | 7/2011 | Watterson et al. | 482/8 |
| 8,010,279 B2* | 8/2011 | Kobuya et al. | 701/438 |
| 8,010,286 B2* | 8/2011 | Templeton et al. | 701/412 |
| 8,019,819 B2* | 9/2011 | Monteverde et al. | 709/205 |
| 8,042,064 B2* | 10/2011 | Cardu | 715/850 |
| 8,065,709 B2* | 11/2011 | Tischer et al. | 725/105 |
| 8,073,461 B2* | 12/2011 | Altman et al. | 455/456.1 |
| 8,082,165 B2* | 12/2011 | Natsuyama et al. | 705/5 |
| 8,082,517 B2* | 12/2011 | Ben-Shachar et al. | 715/781 |
| 8,090,459 B2* | 1/2012 | Hsu | 700/94 |
| 8,108,778 B2* | 1/2012 | Athsani et al. | 715/738 |
| 8,112,490 B2* | 2/2012 | Upton et al. | 709/208 |
| 8,121,784 B2* | 2/2012 | Templeton et al. | 701/516 |
| 8,139,514 B2* | 3/2012 | Weber et al. | 370/312 |
| 8,171,516 B2* | 5/2012 | Tischer | 725/62 |
| 8,175,802 B2* | 5/2012 | Forstall et al. | 701/424 |
| 8,510,247 B1* | 8/2013 | Kane et al. | 706/46 |
| 8,595,634 B2* | 11/2013 | Sherrard et al. | 715/834 |
| 8,725,120 B2* | 5/2014 | Glorikian | 455/414.1 |
| 8,725,175 B2* | 5/2014 | Altman et al. | 455/456.3 |
| 8,779,265 B1* | 7/2014 | Gottlieb | 84/600 |
| 8,831,963 B2* | 9/2014 | Backer et al. | 705/5 |
| 2001/0018634 A1* | 8/2001 | Nishikawa | 701/200 |
| 2001/0020211 A1* | 9/2001 | Takayama et al. | 701/200 |
| 2002/0002571 A1* | 1/2002 | Manohar et al. | 707/526 |
| 2002/0033844 A1* | 3/2002 | Levy et al. | 345/744 |
| 2002/0044535 A1* | 4/2002 | Tabata et al. | 370/276 |
| 2002/0046259 A1* | 4/2002 | Glorikian | 709/218 |
| 2002/0059070 A1* | 5/2002 | Watanabe | 704/257 |
| 2002/0062403 A1* | 5/2002 | Burnett et al. | 709/318 |
| 2002/0081972 A1* | 6/2002 | Rankin | 455/41 |
| 2002/0085029 A1* | 7/2002 | Ghani | 345/751 |
| 2002/0087592 A1* | 7/2002 | Ghani | 707/500 |
| 2002/0091793 A1* | 7/2002 | Sagie | 709/217 |
| 2002/0095334 A1* | 7/2002 | Kao | 705/14 |
| 2002/0112003 A1* | 8/2002 | Glorikian | 709/203 |
| 2002/0174243 A1* | 11/2002 | Spurgat et al. | 709/231 |
| 2002/0183072 A1* | 12/2002 | Steinbach et al. | 455/456 |
| 2002/0184310 A1* | 12/2002 | Traversat et al. | 709/204 |
| 2003/0002521 A1* | 1/2003 | Traversat et al. | 370/465 |
| 2003/0009281 A1* | 1/2003 | Whitham | 701/211 |
| 2003/0024975 A1* | 2/2003 | Rajasekharan | 235/375 |
| 2003/0093797 A1* | 5/2003 | Bazzaz | 725/74 |
| 2003/0104824 A1* | 6/2003 | Hale et al. | 455/456 |
| 2003/0155413 A1* | 8/2003 | Kovesdi et al. | 235/375 |
| 2004/0002305 A1* | 1/2004 | Byman-Kivivuori et al. | 455/41.2 |
| 2004/0041836 A1* | 3/2004 | Zaner et al. | 345/751 |
| 2004/0054428 A1* | 3/2004 | Sheha et al. | 700/56 |
| 2004/0087326 A1* | 5/2004 | Dunko et al. | 455/517 |
| 2004/0205091 A1* | 10/2004 | Mulcahy et al. | 707/204 |
| 2004/0209569 A1* | 10/2004 | Heinonen et al. | 455/41.2 |
| 2004/0224638 A1* | 11/2004 | Fadell et al. | 455/66.1 |
| 2005/0024488 A1* | 2/2005 | Borg | 348/36 |
| 2005/0037708 A1* | 2/2005 | Torvinen | 455/41.2 |
| 2005/0048954 A1* | 3/2005 | Gortz et al. | 455/414.1 |
| 2005/0093868 A1* | 5/2005 | Hinckley | 345/502 |
| 2005/0132299 A1* | 6/2005 | Jones et al. | 715/759 |
| 2005/0135286 A1* | 6/2005 | Nurminen et al. | 370/310 |
| 2005/0172001 A1* | 8/2005 | Zaner et al. | 709/205 |
| 2005/0192025 A1* | 9/2005 | Kaplan | 455/456.1 |
| 2005/0228860 A1* | 10/2005 | Hamynen et al. | 709/203 |
| 2005/0267826 A1* | 12/2005 | Levy et al. | 705/34 |
| 2006/0010197 A1* | 1/2006 | Ovenden | 709/204 |
| 2006/0022030 A1* | 2/2006 | Boothroyd | 235/375 |
| 2006/0105783 A1* | 5/2006 | Giraldin et al. | 455/456.3 |
| 2006/0146765 A1* | 7/2006 | Van De Sluis et al. | 370/338 |
| 2006/0156330 A1* | 7/2006 | Chiu | 725/24 |
| 2006/0161335 A1* | 7/2006 | Beinhaker | 701/200 |
| 2006/0179160 A1* | 8/2006 | Uehara et al. | 709/248 |
| 2006/0190827 A1* | 8/2006 | Zaner et al. | 715/751 |
| 2006/0230337 A1* | 10/2006 | Lamont et al. | 715/501.1 |
| 2006/0242234 A1* | 10/2006 | Counts et al. | 709/204 |
| 2006/0242584 A1* | 10/2006 | Johanson et al. | 715/738 |
| 2006/0259469 A1* | 11/2006 | Chiu | 707/3 |
| 2006/0267789 A1* | 11/2006 | Baldwin | 340/825.49 |
| 2006/0277079 A1* | 12/2006 | Gilligan et al. | 705/6 |
| 2007/0020603 A1* | 1/2007 | Woulfe | 434/350 |
| 2007/0078729 A1* | 4/2007 | Brown | 705/26 |
| 2007/0100939 A1* | 5/2007 | Bagley et al. | 709/204 |
| 2007/0124503 A1* | 5/2007 | Ramos et al. | 709/248 |
| 2007/0142040 A1* | 6/2007 | Weinans et al. | 455/414.1 |
| 2007/0174042 A1* | 7/2007 | Thompson | 704/3 |
| 2007/0185744 A1* | 8/2007 | Robertson | 705/5 |
| 2007/0186007 A1* | 8/2007 | Field et al. | 709/233 |
| 2007/0233367 A1* | 10/2007 | Chen et al. | 701/207 |
| 2007/0299710 A1* | 12/2007 | Haveliwala | 705/8 |
| 2007/0300165 A1* | 12/2007 | Haveliwala | 715/758 |
| 2008/0039967 A1* | 2/2008 | Sherwood | 700/94 |
| 2008/0163073 A1* | 7/2008 | Becker et al. | 715/753 |
| 2008/0177793 A1* | 7/2008 | Epstein et al. | 707/104.1 |
| 2008/0201227 A1* | 8/2008 | Bakewell et al. | 705/14 |
| 2008/0209330 A1* | 8/2008 | Cruver | 715/733 |
| 2008/0222308 A1* | 9/2008 | Abhyanker | 709/245 |
| 2008/0222538 A1* | 9/2008 | Cardu | 715/760 |
| 2008/0229211 A1* | 9/2008 | Herberger et al. | 715/744 |
| 2008/0248809 A1* | 10/2008 | Gower | 455/456.1 |
| 2008/0298294 A1* | 12/2008 | Gonsa et al. | 370/312 |
| 2009/0005080 A1* | 1/2009 | Forstall et al. | 455/456.3 |
| 2009/0012824 A1* | 1/2009 | Brockway et al. | 705/6 |
| 2009/0031246 A1* | 1/2009 | Cowtan et al. | 715/786 |
| 2009/0037946 A1* | 2/2009 | Chang et al. | 725/24 |
| 2009/0063683 A1* | 3/2009 | Palin et al. | 709/226 |
| 2009/0143977 A1* | 6/2009 | Beletski et al. | 701/201 |
| 2009/0160731 A1* | 6/2009 | Schuler et al. | 345/1.1 |
| 2009/0177513 A1* | 7/2009 | Eckhart et al. | 705/8 |
| 2009/0186700 A1* | 7/2009 | Konkle | 463/42 |
| 2009/0192887 A1* | 7/2009 | Moore et al. | 705/14 |
| 2009/0204905 A1* | 8/2009 | Toghia | 715/753 |
| 2009/0216547 A1* | 8/2009 | Canora et al. | 705/1 |
| 2009/0216633 A1* | 8/2009 | Whitsett et al. | 705/14 |
| 2009/0265197 A1* | 10/2009 | Chan | 705/7 |
| 2009/0265426 A1* | 10/2009 | Svendsen et al. | 709/204 |

(56) References Cited

U.S. PATENT DOCUMENTS

| | | | |
|---|---|---|---|
| 2009/0265651 A1* | 10/2009 | Hodson et al. | 715/769 |
| 2009/0287790 A1* | 11/2009 | Upton et al. | 709/208 |
| 2009/0293095 A1* | 11/2009 | Karaoguz et al. | 725/119 |
| 2009/0305219 A1* | 12/2009 | Stuempfle | 434/365 |
| 2009/0319306 A1* | 12/2009 | Chanick | 705/5 |
| 2010/0030578 A1* | 2/2010 | Siddique et al. | 705/3 |
| 2010/0138151 A1* | 6/2010 | Jang et al. | 701/201 |
| 2010/0146115 A1* | 6/2010 | Bezos | 709/225 |
| 2010/0169131 A1* | 7/2010 | Robertson | 705/5 |
| 2010/0191728 A1* | 7/2010 | Reilly et al. | 707/736 |
| 2010/0198690 A1* | 8/2010 | Gilvar et al. | 705/14.58 |
| 2010/0203868 A1* | 8/2010 | Sagie | 455/414.1 |
| 2010/0257234 A1* | 10/2010 | Caughey | 709/203 |
| 2010/0311395 A1* | 12/2010 | Zheng et al. | 455/414.1 |
| 2011/0035685 A1* | 2/2011 | Johanson et al. | 715/753 |
| 2011/0055546 A1* | 3/2011 | Klassen et al. | 713/150 |
| 2011/0061005 A1* | 3/2011 | Zha | 715/753 |
| 2011/0072367 A1* | 3/2011 | Bauer | 715/757 |
| 2011/0105092 A1* | 5/2011 | Felt et al. | 455/414.1 |
| 2011/0244954 A1* | 10/2011 | Goldman et al. | 463/30 |
| 2011/0301835 A1* | 12/2011 | Bongiorno | 701/201 |
| 2011/0314090 A1* | 12/2011 | Cardu | 709/203 |
| 2012/0022777 A1* | 1/2012 | James | 701/201 |
| 2013/0030849 A1* | 1/2013 | Bongiorno | 705/6 |

OTHER PUBLICATIONS

"Guideport in Practice," <http://www.guideport.com/sennheiser/guideport_eng.nsf/root/audio-guided-system.html>, 1 page., printed Jan. 18, 2011 (see bottom of page timestamp printed).

\* cited by examiner

PROVIDING INTERACTIVE SERVICES TO ENHANCE INFORMATION PRESENTATION EXPERIENCES USING WIRELESS TECHNOLOGIES

TECHNICAL FIELD

The subject specification generally relates to communication services, and, more particularly, to systems, methods, and devices for providing interactive services to enhance information presentation experiences using wireless technologies.

BACKGROUND

People can sometimes participate in group experiences, such as, for example, guided tours of museums, historical locations, or other places or items of interest. Such group experiences can occur, for instance, in relation to family excursions (e.g., while on vacation), research trips or projects, school-related field trips, etc. During a group experience, one or more persons (e.g., tour guides, presenters, persons in the group with questions or comments, etc.) can be speaking or otherwise presenting information to the group of people. However, often there can be impediments that interfere with at least some people in the group being able to hear or receive the information being presented. For example, a tour guide may be leading a group of people in a tour of a point of interest, wherein the tour guide is speaking to the group to provide informative information or other desired information to the group while walking with the group through the point of interest. For a variety of reasons, such as the distance of the tour guide from certain persons in the group (e.g., certain persons are at the end of a long line of people in the group, and the tour guide is at the head of the line), the volume of the tour guide's voice, ambient noise in the area of the group, others in the group speaking at the same time as the tour guide, etc., certain persons in the group are not able to hear or receive the presentation by the tour guide, or at least have difficulty in hearing or receiving the presentation, sometimes even if the tour guide is shouting.

As another example, a tour may involve a number of points of interest over a relatively large area (e.g., a tour of Wall Street or other region of New York City), wherein the tour group attempts to follow the tour guide, who can be holding an umbrella or flag for all in the group to see so that the people in the group can stay with the group, and not fall behind the group or become lost. Here again hearing the tour guide speak over the noise of the city can be difficult, particularly if the person is towards the back of the group away from the tour guide. Further, there can be a number of different tour groups visiting the same landmark at the same time, which can make it even more difficult to hear the tour guide of a person's particular group, as the tour guides of the tour groups can be speaking loudly at the same time. Also, if there are a number of different tour groups with a number of different flags, it can be difficult for a person to identify to which group the person belongs.

Still another issue is that various tour members may come from different countries having different languages, and such tour members may not speak the same language as the tour guide. Often a tour member will only speak one language and the tour guide does not speak that language. Further, even if the tour guide is able to speak more than one language, it can take extra time for the tour guide to repeat the same information in multiple languages.

In other instances, a person may be participating in an individual tour of a point of interest (e.g., museum, aquarium, landmark, etc.). The person typically can have limited choices in such tour experience. For example, the person can have a brochure and/or map, which the person can study, and the person can tour or browse through the point of interest based on the information in the brochure, or the person can rent a wireless device (e.g., wireless device with earphones) that can act as an electronic tour guide and can guide the person through the point of interest. In the case of the latter, the wireless device may provide background explanations, historic illustrations, directions relating to the point of interest (e.g., directions to guide the person through a building), or other information relating to the point of interest. In both of these instances, there is no interaction feature provided to enable the person to solicit information, provide feedback, or otherwise actively interact with the tour experience. The tour experience is essentially uni-directional.

Yet another issue is that, during a tour, even with conventional wireless devices being employed as part of the tour, a tour guide may desire to provide additional description of a point of interest beyond what is being provided by the wireless device of the tour member, or the tour member may desire to personalize the tour by taking notes relating to the tour. However, as stated, the conventional wireless devices are essentially uni-directional in that such devices only provide predefined information to the person.

Another issue is that a person taking part in a tour (e.g., individually or as part of a group) may have particular reasons for taking part in the tour or may have certain time constraints in taking the tour. However, again, conventional wireless devices are essentially uni-directional and static in that such devices only provide predefined information to the person.

When taking a tour or engaging in another activity, wherein presentations are made, people can desire an enjoyable and informative experience. However, the aforementioned drawbacks of today's presentations (e.g., tour presentation) to a group or an individual can result in a less enjoyable experience for the person(s) participating in the presentation experience (e.g., tour). Today, there is no way to provide a desirable interactive experience during a presentation and to enhance the presentation experience of a person or group participating in the presentation experience.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

Systems, methods, and devices that can provide interactive services relating to an information presentation to user equipment (UE) are presented. In an aspect, a presentation management component (PMC) can provide at least a portion of the information presentation (e.g., tour of one or more points of interest, wherein the tour can be an indoor or outdoor tour, an individual or a group tour) to one or more UEs, which can be integrated with the PMC, to facilitate enabling one or more UE users to use interactive services in relation to the information presentation associated with the PMC. The interactive services can include, for example, broadcast communications to desired UEs in a tour group, uni-cast communications with a desired UE user, UE clustering, customized tour recommendations, whiteboard feature, note-taking functions, "slow down" option, "raise hand" option, and targeted advertisements. In an aspect, respective UEs in a tour group can be configured to be a master UE (e.g., controller UE), sub-master UE (e.g., sub-controller UE), or slave UE (e.g., member UE), wherein the master UE can at least partially control communications of the other UEs in the group, and the sub-master UE can at least partially control communications of UEs in a sub-group of the group.

In accordance with various aspects, the disclosed subject matter can comprise a system that includes a communication device that is configured to communicate with at least one other communication device associated with a communication network. The system can further include a presentation control component (PCC) that is configured to be associated with the communication device, wherein the PCC is further configured to integrate the communication device with at least a PMC, wherein the PMC provides a set of interactive services usable by the communication device in relation to an information presentation.

In accordance with various other aspects, the disclosed subject matter can comprise a method that includes the acts of integrating at least one UE with a PMC to facilitate providing a subset of interactive services to the at least one UE for use in relation to an information presentation; and using at least one interactive service of the subset of interactive services to collaboratively exchange information between the at least one UE and at least the PMC at least during the information presentation.

In accordance with still other aspects, the disclosed subject matter can comprise a system that includes a PMC that is configured to integrate at least one mobile communication device with the PMC to provide at least a portion of an information presentation and a subset of interactive services relating to the information presentation to the at least one mobile communication device and at least one user associated with the at least one mobile communication device. The system can further include at least one application that is configured to be downloadable to the at least one mobile communication device, wherein the at least one application is further configured to facilitate integration of the at least one mobile communication device with the PMC and access of the subset of interactive services by the at least one mobile communication device.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
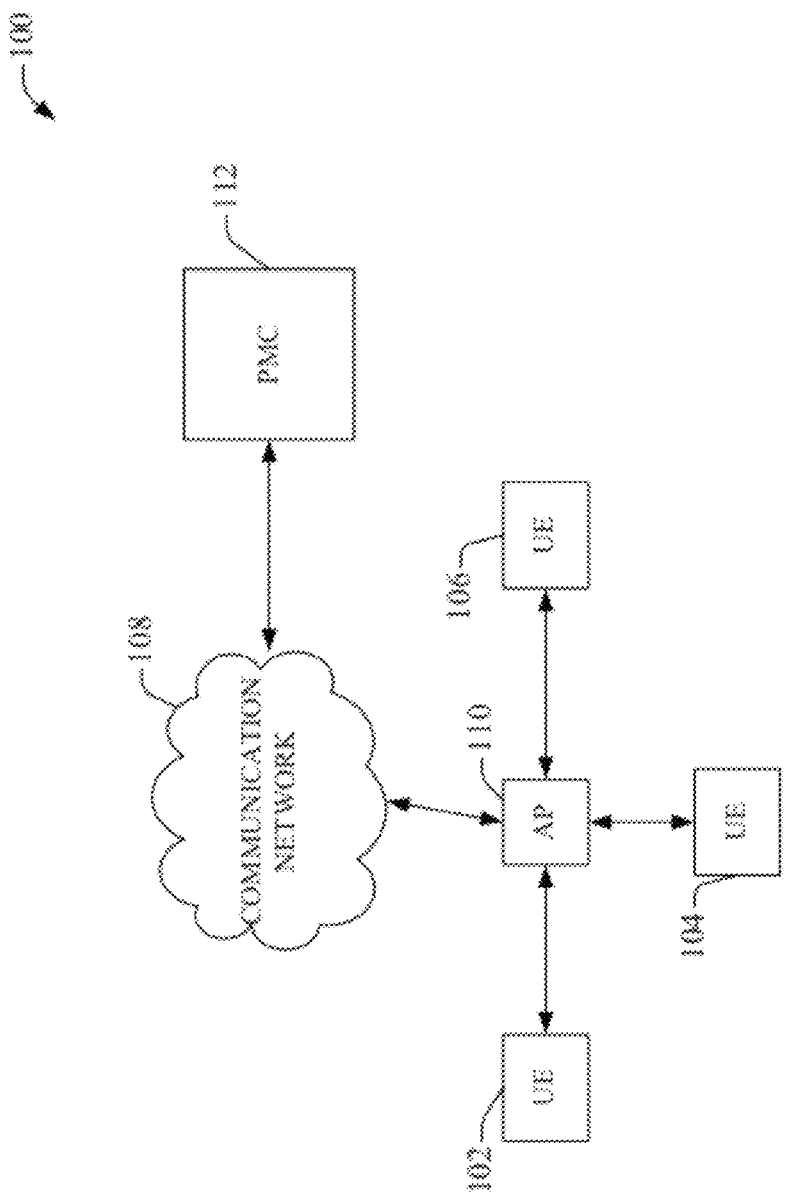
FIG. 1 is a block diagram of an example system that can enhance communications relating to information presentations in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box (STB), Internet Protocol Television (IPTV), electronic watch with communication capabilities, electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream, or, in an embodiment, a wired (e.g., landline) communication device that has mobile messaging functionality and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.
2G Second Generation
3G Third Generation
3GPP Third Generation Partnership Project
4G Fourth Generation
AGPS Assisted GPS
AP Access Point
ADSL Asymmetric Digital Subscriber Line
AWS Advanced Wireless Services
BRAS Broadband Remote Access Server
BTA Basic Trading Area CDMA Code Division Multiple Access
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Many people take tours of museums, aquarium, or other facilities, or other points of interest, which can be outdoors or indoors. Typically, if a person is doing a tour individually, the person only has limited options for the tour experience, as the person can use a brochure or map as a guide to taking the tour, or the person can rent a wireless receiver with earphones that can be used to receive information regarding points of interest along the tour or directions to guide the person through the tour. However, such a tour experience is uni-directional and not interactive. During group tours, a tour guide can lead a tour group of people to show exhibits, landmarks, and other points of interest, wherein the tour guide can give background or historical information, or other information, along the tour. Some problems with a group tour is that some people in the group can sometimes fall behind the tour group and/or are not able to hear the tour guide when the guide is speaking due to the distance away from the tour guide and/or noise (e.g., other people speaking, traffic noise, other tour groups, etc.). Thus, currently, there are these and other drawbacks in individual and group tour experiences.

To that end, systems, methods, and devices that provide interactive services relating to an information presentation to a UE(s) are presented. A presentation management component (PMC) can provide at least a portion of the information presentation to one or more UEs, which can be integrated with the PMC, to facilitate enabling one or more UE users to use interactive services in relation to the information presentation (e.g., tour of one or more points of interest) associated with the PMC. The interactive services can include, for example, broadcast communications to desired UEs in a tour group, uni-cast communications with a desired UE user, UE clustering, customized tour recommendations, whiteboard feature, note-taking functions, "slow down" option (e.g., modify-tour-pace request option), "raise hand" option (e.g., communication request option), and targeted advertisements. In an aspect, respective UEs in a tour group can be configured to be a master UE (e.g., controller UE), sub-master UE (e.g., sub-controller UE), or slave UE (e.g., member UE), wherein the master UE can at least partially control communications of the other UEs in the group, and the sub-master UE can at least partially control communications of UEs in a sub-group of the group.

Referring to the drawings, FIG. 1 is a block diagram of an example system 100 that can enhance communications relating to information presentations (e.g., tour presentations, convention presentations, etc.) in accordance with various aspects and embodiments of the disclosed subject matter. In an aspect, the system 100 can include a desired number of UEs (e.g., mobile and/or wireless communication device, such as a mobile phone (e.g., 3GPP UMTS phone), personal digital assistant (PDA), computer, electronic notebook, portable electronic gaming device, wearable communication device (e.g., an electronic watch with communication capabilities that can be strapped to a user, such as a child), etc.), comprising, for example, UE 102, UE 104, and UE 106, in a communication network environment, wherein UE 102, UE 104, and UE 106 can be connected via respective wireless communication connections to a communication network 108 via an AP 110, for example. It is to be appreciated and understood that, while only one AP 110 is shown in FIG. 1, this is only for reasons of brevity and clarity, and it is to be appreciated and understood that, in accordance with other embodiments, there can be more than one AP, wherein respective UEs can be connected with respective APs (e.g., one or more UEs can be connected to a first AP, one or more other UEs can be connected to another AP, . . . ). It is also to be appreciated and understood that, while three UEs are shown in FIG. 1, the disclosed subject matter is not so limited as, in accordance with various other embodiments of the disclosed subject matter, there can be less than three UEs or more than three UEs. For example, if an individual is taking a tour by himself or herself, the disclosed subject matter can comprise one UE that is used by that individual during the interactive tour.

In an aspect, as a UE (e.g., 102, 104, 106) moves through a wireless communication network environment, at various times, the UE (e.g., 102, 104, 106) can be connected (e.g., wirelessly connected) to one of a plurality of APs (e.g., macro AP, femto AP, pico AP, Wi-Fi AP, Wi-Max AP, etc.), such as an AP 110, that can operate in the wireless communication network environment. An AP (e.g., 110) can serve a specified coverage area to facilitate communication by the UE (e.g., 102, 104, 106) in the wireless communication network environment. The AP 110 can serve a respective coverage cell (e.g., macrocell, femtocell, picocell, etc.) that can cover a respective specified area, and the AP 110 can service mobile wireless devices, such as UE (e.g., 102, 104, 106), located in the respective area covered by the respective cell, where such coverage can be achieved via a wireless link (e.g., uplink (UL), downlink (DL)). When an attachment attempt is successful, the UE (e.g., 102, 104, 106) can be served by the AP 110 and incoming voice and data traffic can be paged and routed to the UE (e.g., 102, 104, 106) through the AP 110, and outgoing voice and data traffic from the UE (e.g., 102, 104, 106) can be paged and routed through the AP 110 to other communication devices (e.g., another UE) in the communication network environment. In an aspect, the UE (e.g., 102, 104, 106) can be connected and can communicate wirelessly using virtually any desired wireless technology, including, for example, cellular, Wi-Fi, Wi-Max, wireless local area networks (WLAN), etc.

In another aspect, the communication network 108 (e.g., 2G, 3G, 4G, or xG network, where x can be virtually any desired integer or real value) can facilitate wireless connection with the UEs 102, 104, and 106 connected to the AP 110 and facilitate communication by or between a UE (e.g., 102) and another UE(s) (e.g., 104, 106) or other communication device(s) associated with the communication network 108 in the communication network environment. The communication network 108 (e.g., a core network, or network comprising a core network, and/or IP-based network) can facilitate routing voice and data communications between a communication device(s) (e.g., UE 102) and other communication devices (e.g., UE, communication device associated with the PMC, landline phone, computer, email server, STB, multimedia server, audio server, video server, news server, financial or stock information server, other communication devices, etc.) associated with the communication network 108 in the communication network environment. The communication network 108 also can allocate resources to the UEs (e.g., 102, 104, 106) in the communication network 108, convert or enforce protocols, establish and enforce Quality of Service (QoS) for the UEs, provide applications or services in the communication network 108, translate signals, and/or perform other desired functions to facilitate system interoperability and communication in the communication network 108 (e.g., wireless portion of the communication network 108 or wireline portion of the communication network 108). The communication network 108 further can include desired components, such as routers, nodes, switches, interfaces, controllers, etc., that can facilitate communication of data between communication devices in the communication network environment.

In accordance with various aspects, the UEs can be employed to facilitate interactive presentation of information, for example, in relation to a tour presentation, a convention presentation, or other desired type of information presentation. For instance, in one aspect, the UE 102 can be configured to be a master UE, and the UEs 104 and 106 can be configured to be slave UEs to the UE 102, wherein the UE 102, as the master UE, can control the presentation of information to, and receipt of information from, the slave UEs, such as UEs 104 and 106. The presentation of information can relate, for example, to a tour, a convention, or a business meeting, or other event, wherein it is desired to present information via the UEs. As another example, the UE 102 can be configured to be a master UE, UE 104 can be configured as a sub-master UE, and the UE 106 can be configured as a slave UE, wherein the UE 102, as master UE, can control presentation of information to, and receipt of information from, UEs 104 and 106, and UE 104, as sub-master UE, can at least partially control presentation of information to, and receipt of information from, UE 106, the slave UE, while the UE 104 also can be considered a slave UE to the UE 102. This arrangement of master UE, sub-master UE(s), and slave UE(s) can be desirable, for example, when a family, a school class, or a group of employees are taking part in the information presentation, as the presenter (e.g., tour guide) can utilize the master UE, the head of the group or sub-group (e.g., the parent of a family, the teacher or chaperone of a school class, or the boss or manager of a group of employees) can utilize the sub-master UE, and the others in the group or sub-group (e.g., the children of a family, the students of a class, or the employees) can utilize the slave UEs.

In another aspect, the system 100 can comprise a PMC 112 that can control provisioning of respective UEs (e.g., 102, 104, 106) with the PMC 112 based at least in part on the respective UE identifiers (e.g., MSISDNs) of the respective UEs; presentation of information to the UEs 102, 104, and 106; receipt of information from the UE 102, UE 104, UE 106, and other communication devices associated with the system 100; recording and storing of information presented or obtained in relation to the information presentation (e.g., information presented to the UEs and associated users; information, such as comments, questions, pictures, video, etc., received from users, via their UEs, in relation to the information presentation; and other desired operational aspects of the system 100.

Figure 11:
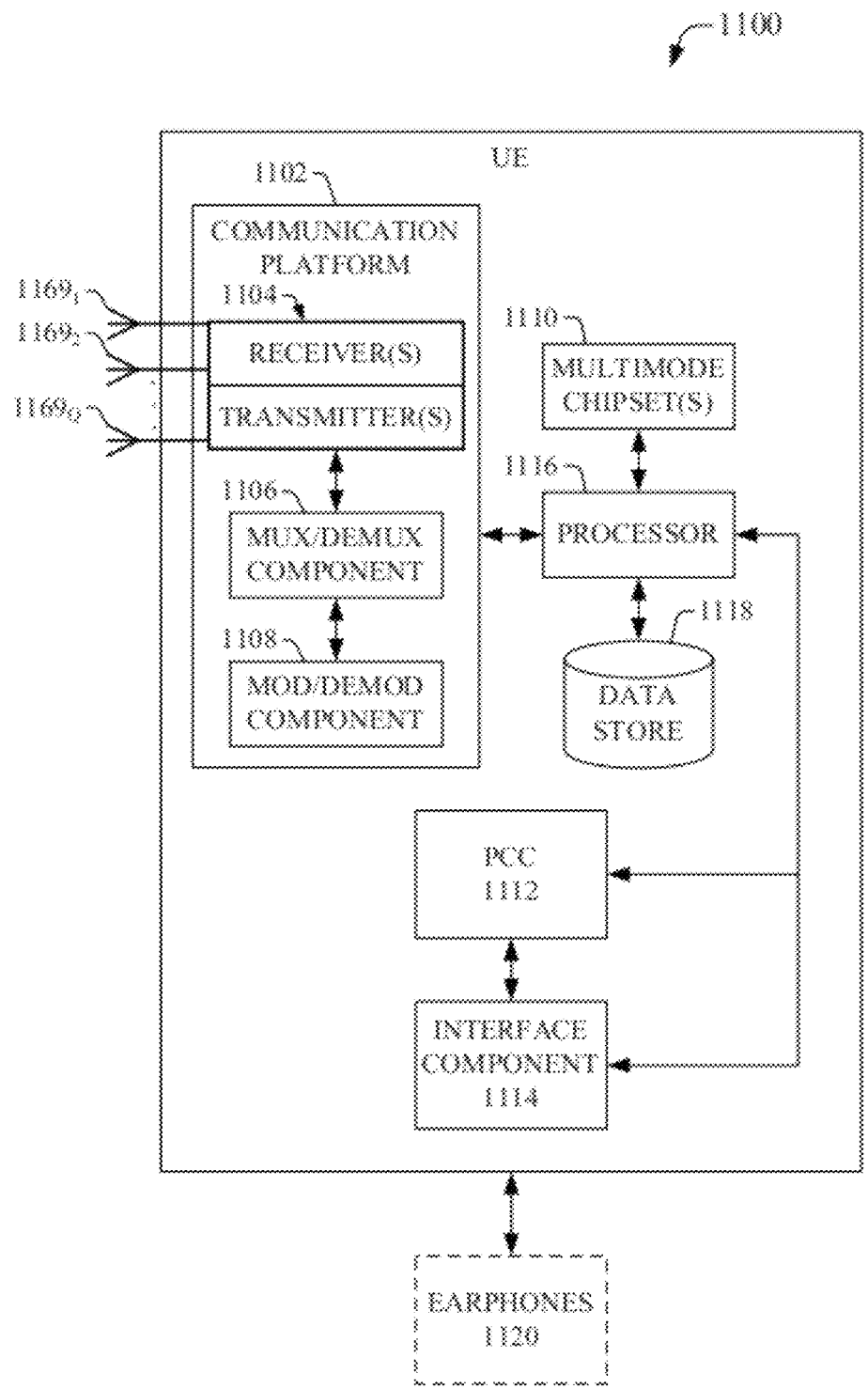
FIG. 11 illustrates a block diagram of an example UE in accordance with various aspects of the disclosed subject matter.

In accordance with various aspects, the UEs can be communication devices that are preconfigured, or at least partially preconfigured, for use in the interactive information presentation (e.g., UE can be preconfigured to be integrated or integrable with the PMC 112 and other associated components of the system), wherein, for example, users can rent or lease the preconfigured UEs for use during the information presentation, or a user's UE can be configured at or near the time the user is preparing to take part in the interactive information presentation (e.g., user's UE can be configured at a desired time to be integrated or integrable with the PMC 112 and other associated components of the system). As desired, the preconfigured UEs and the user's UE can be configured to operate the same or at least substantially the same in relation to the information presentation, or the preconfigured UEs can be configured differently than the user's UE in relation to the information presentation to facilitate further information control (e.g., if desired, the user's UE can be provided a subset (e.g., a subset less than a full set) of the functionality of the preconfigured UEs). The PMC 112 can be employed to facilitate registering and configuring a user's UE (e.g., 104) to be used as part of the information presentation, wherein a tour guide or an administrator can facilitate registering and configuring UEs for use in the information presentation. The UEs (e.g., 102, 104, 106), when configured, can be used to transmit and/or receive broadcast communications and uni-cast communications, and can be used for interactive communication activities, such as more fully disclosed herein. As desired, UE users can be provided and/or can use earphones (not shown in FIG. 1; e.g., as shown in FIG. 11) that can be connected with their UEs via a wired or wireless connection (e.g., Bluetooth wireless connection) to facilitate receiving audio portions of the information presentation or can utilize the speaker(s) on the UE to receive audio portions of the information presentation. In an embodiment, for APs (e.g., femto APs) that employ whitelists, when a UE (e.g., 102, 104, 106) is provisioned by the PMC 112, the PMC 112 can communicate information (e.g., UE identifier) regarding the provisioned UE to the APs (e.g., 110) associated with the PMC 112, and the APs can add the provisioned UE to the whitelist to facilitate enabling the UE to connect with and communicate via the APs, while the UE is provisioned with the PMC 112 (e.g., while the UE is in active mode).

In an aspect, with regard to grouping UEs and broadcast communications between UEs in a group, the system 100 can enable a larger number of UEs (and associated UE users) to be grouped together (e.g., 5, 10, 25, 50, or more UEs and associated users in a tour group) than typical "family plans" or bundles. To facilitate such grouping and communications, the communication network 108 and/or the PMC 112 can be configurable and operable to dynamically group UEs together to form a group (e.g., add UEs to the group as the respective UEs are provisioned and integrated with the PMC 112) in relation to an information presentation, and de-group UEs at the end of the information presentation or when it is desired to remove a UE(s) from the group, wherein group information can be updated and synchronized between the communication network 108, PMC 112, and UEs (e.g., 102, 104, 106) associated with the group, as desired (e.g., real time or near real time modification of a grouping). In another aspect, the communication network 108 (e.g., core network and/or IP-based network) and/or the PMC 112 can be configurable and operable to allocate desired communication resources to facilitate establishing and maintaining communication services between UEs in a group (e.g., establishing and maintaining continuous or substantially continuous communication connections between UEs in a group for all or a desired portion(s) of the time the UEs in the group are grouped together) and desired communications, including broadcast communications (e.g., voice or data communications, such as: portion of an information presentation, such as video, pictures, or audio; comment from the tour guide to group members; comment from a tour group member to other group members and/or the tour guide; etc.), between UEs in the group. For instance, when a broadcast communication is sent from one UE (e.g., 202) to a plurality of UEs (e.g., 204, 206) in the group, the PMC 112 and/or the communication network 108 can be operable to have the broadcast communication (e.g., voice or data communications, such as video, audio, tour guide commentary, etc.) communicated from the sending UE to the plurality of UEs at the same or substantially the same time, so that the UEs and associated UE users in the group can receive the broadcast communication at the same or substantially the same time to facilitate desired presentation of, or communications related to, the information presentation.

Figure 2:
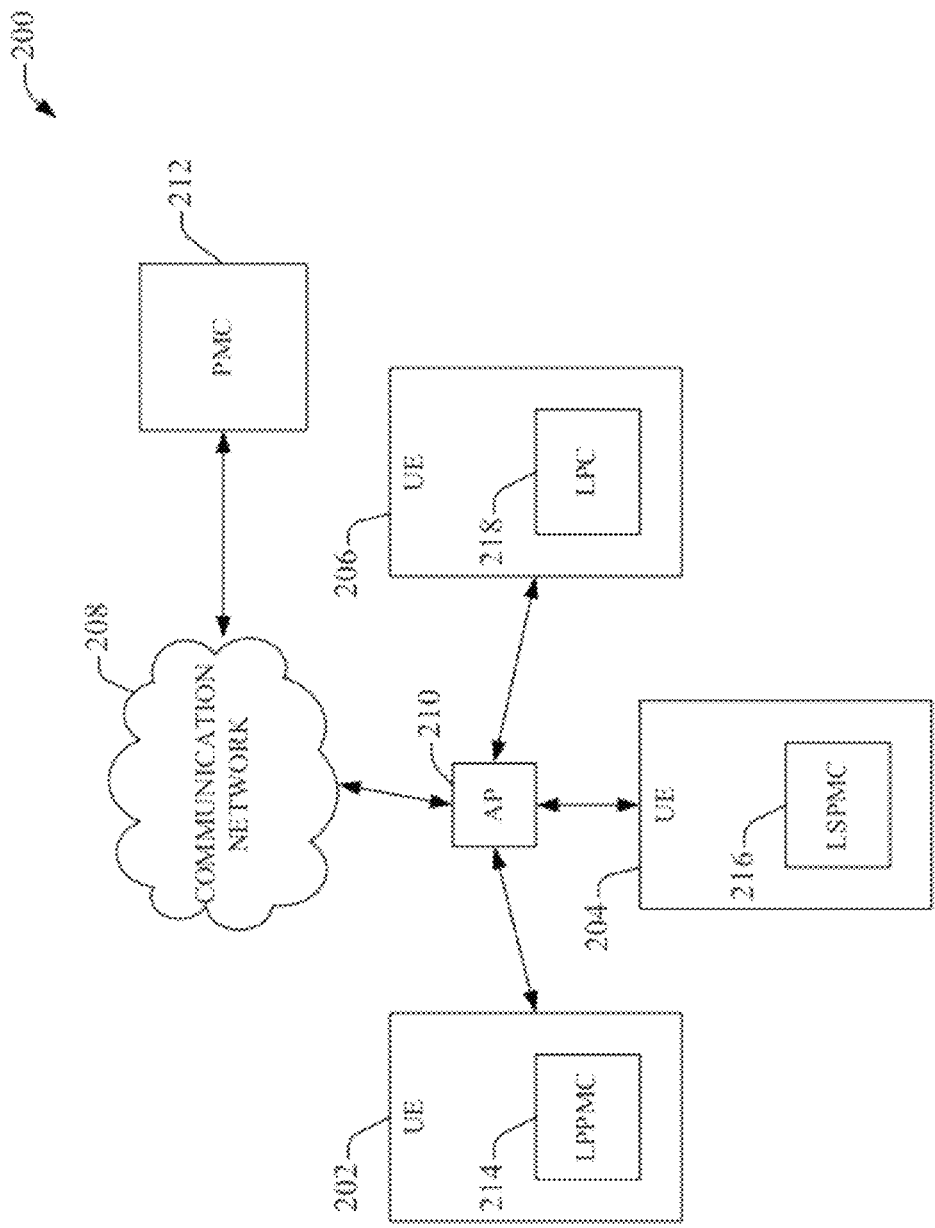
FIG. 2 depicts a diagram of an example system that can enhance communications relating to presentations (e.g., tour presentations, convention presentations, etc.) in accordance with various aspects and embodiments of the disclosed subject matter.

Referring to FIG. 2, is a block diagram of another example system 200 that can enhance communications relating to presentations (e.g., tour presentations, convention presentations, etc.) in accordance with various aspects and embodiments of the disclosed subject matter. The system 200 can include a desired number of UEs, such as UE 202, UE 204, and UE 206, a communication network 208, a desired number of APs, including AP 210, and a PMC 212, wherein these components of the system 200 each can be the same or similar as, and can comprise the same or similar functionality as, respective components (e.g., respectively named components), such as described herein.

In an aspect, the UEs 202, 204, and 206 can be respective configured so that the UEs 202, 204, 206 can be desirably operable (e.g., broadcast capabilities, interactive communication functionality, etc.) for use in an information presentation. For instance, one or more respective applications, such as an interactive presentation application(s) (e.g., master interactive presentation application, sub-master interactive presentation application, slave interactive presentation application), can be downloaded to the respective UEs 202, 204, 206, wherein the respective application(s) can be used to configure the respective UEs to be a master UE, a sub-master UE, or a slave UE, in relation to the information presentation. For instance, the UE 202 can be configured to be a master UE, UE 204 can be configured to be a sub-master UE that can be a slave UE in relation to UE 202 and a master UE in relation to UE 206, and UE 206 can be configured to be a slave UE in relation to UEs 202 and 204.

In accordance with various aspects, to facilitate configuring a UE, the UE (e.g., 202, 204, 206) can exchange information with the PMC 212 using near field communication (NFC) (e.g., when the UE is equipped with NFC functionality), using a bar-code scanning mechanism (not shown) associated with the PMC 212 (e.g., the PMC can use a bar-code scanner to scan the desired UE to obtain desired information (e.g., UE identifier, such as MSISDN identifier, available functionalities of the UE, etc.) from the UE), or via a wired or wireless (e.g., cellular, Wi-Fi, etc.) connection with the PMC 212.

In accordance with various other aspects, a UE can be configured to contain a desired type of presentation control component (PCC) (e.g., local primary PMC (LPPMC), local secondary PMC (LSPMC), local presentation component (LPC)) to facilitate providing the UE user with a desirable interactive information presentation experience. In an aspect, when a UE is configured as a master UE, the UE 202 can comprise a LPPMC 214 that can be employed to control presentation of information to and receipt of information from UEs (e.g., 204, 206) that are slave UEs in relation to the UE 202, as more fully disclosed herein. When configured as a sub-master UE, the UE 204 can comprise a LSPMC 216 that can be employed to at least partially control presentation of information to and receipt of information from UEs (e.g., 206) that are slave UEs in relation to the UE 202, and other communications with UEs (e.g., collaborative communication sessions, comments, private chats, etc.), as more fully disclosed herein. When configured as a slave UE, the UE 206 can comprise a LPC 218 that can be employed to facilitate receiving information from UEs (e.g., 202, 204) that serve as master UEs in relation to the UE 206, and other communications with UEs (e.g., collaborative communication sessions, comments, private chats, etc.), as more fully disclosed herein.

In accordance with various aspects, the LPPMC 214 of the UE 202, the LSPMC 216 of the UE 204, and/or the LPC 218 of the UE 206 can be employed to select a respective desired language option (e.g., English, Spanish, French, Italian, Japanese, etc.) for the presentation (e.g., textual presentation, audio presentation) of information to the respective users on their respective UEs 202, 204, 206. The PMC 212, LPPMC 214, LSPMC 216, and/or LPC 218 can translate and/or provide a translation of information for presentation to a UE and associated UE user. For instance, the PMC 212 and/or the LPPMC 214 can provide information, which is pre-translated to a desired language, to a desired UE, and/or the PMC 212, LPPMC 214, LSPMC 216, and/or LPC 218 can perform real-time translation of information (e.g., answers to questions from UE users, comments, other information outside of the standard information presentation, etc.) from one language to a desired language(s) for presentation to/on a desired UE and associated UE user.

Figure 7:
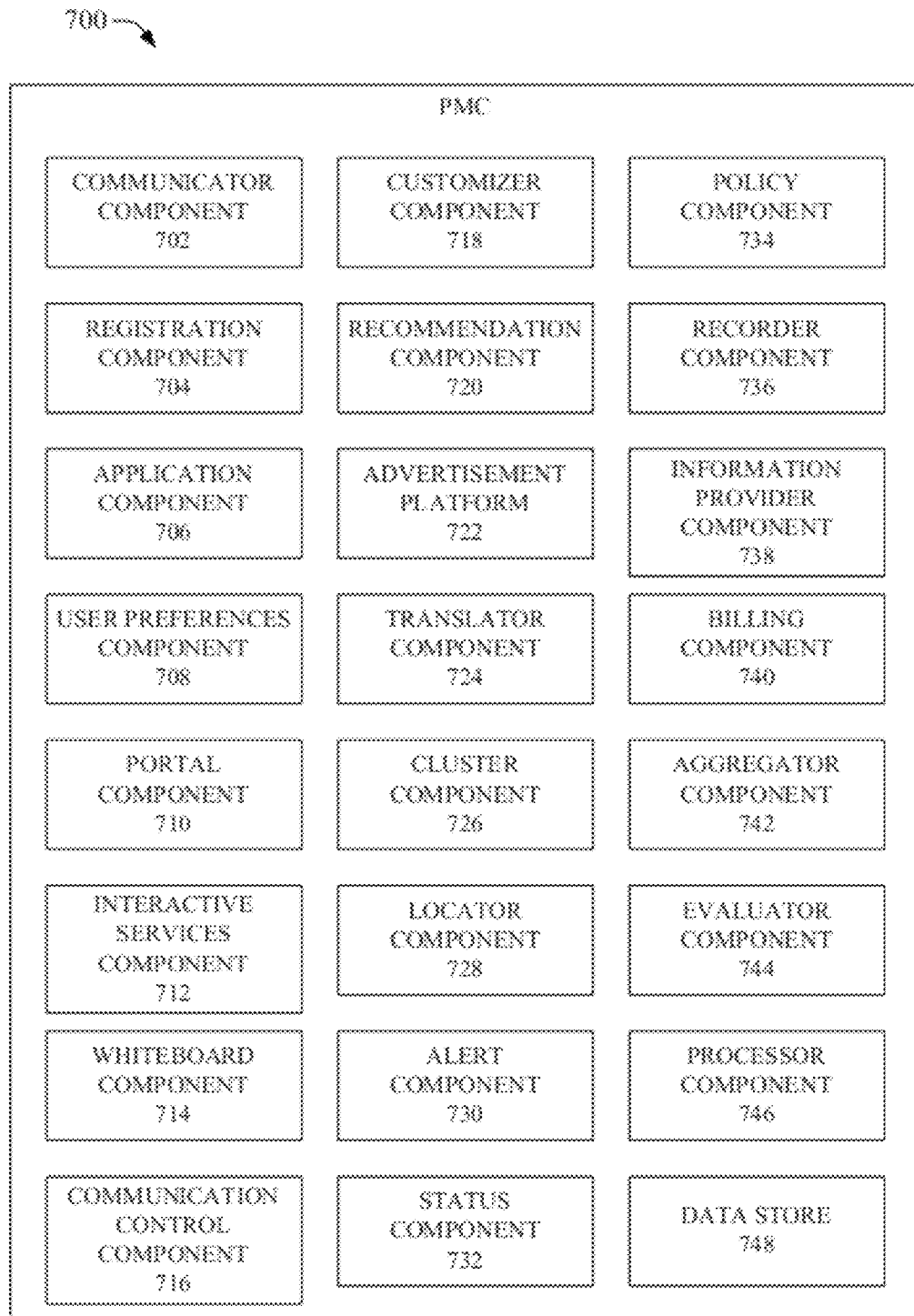
FIG. 7 illustrates a block diagram of an example an example presentation management component (PMC) that can facilitate providing interactive services to UEs in relation to information presentations in accordance with various aspects and embodiments of the disclosed subject matter.

In another aspect, the PMC 212 can comprise a whiteboard component (not shown in FIG. 2; e.g., as shown in FIG. 7) (e.g., including whiteboard display) that can be available to the UEs 202, 204, and 206 to allow the associated to interact with each other by using their respective UEs 202, 204, or 206 to compose and send comments or questions regarding a particular topic, wherein the respective UEs 202, 204, and 206 can access the whiteboard component the comments or questions can be viewed on the whiteboard component in a language desired by a respective UE user using the respective UE.

In still another aspect, the PMC 212 can record all interactions and communications of the respective UEs 202, 204, and 206 (e.g., communications of the UEs, while the respective UEs are in active mode) in a centralized server (not shown in FIG. 2) associated with the PMC 212. In yet another aspect, at a desired time (e.g., after the information presentation is finished) the PMC 212 can generate a copy of the information presentation, the recorded interactions and communications, and/or other associated information, which can be provided to the UE user in a desired format (e.g., digital versatile disc (DVD), compact disc (CD), downloadable file, etc.), as desired (e.g., available as a purchase). In an aspect, at a desired time (e.g., during the information presentation), a UE user can use a UE (e.g., 202, 204, 206) to replay or review a desired portion of an information presentation or other information related thereto. If a next portion of information relating to the information presentation is being sent to the UE while the UE is being used to replay or review another portion of the information presentation or other related information, the next portion of information can be recorded by the PMC 212 for later presentation to the UE and/or a notification that the next portion of information is being presented can be sent by the PMC 212 (and/or controller UE) to the UE, wherein the UE user can decide whether to continue reviewing or replaying the previous information or perceive the next portion of information. After a UE user is finished reviewing a previous portion of the information presentation, or information relating thereto, the UE can be employed to control the speed of the information presentation (e.g., speed up the presentation of information) to allow the UE user to view any portion of the information presentation or other related information (e.g., group comments) that the UE user may have missed while reviewing or replaying the previous portion of the information presentation, for example, until the information presented on the UE is back to the current point of the information presentation.

In still another aspect, the respective UE 202, 204, and 206 can include location-indicating functionality (e.g., global positioning system (GPS)) that can facilitate identifying the respective locations of the respective UEs 202, 204, and 206. Based at least in part on location-related information of the respective UEs sensed by the PMC 212, the PMC 212 can sense and identify the respective locations of the respective UEs 202, 204, and 206. The PMC 212 can provide the respective locations of the respective UEs 202, 204, and/or 206, wherein the locations of respective UEs, 202, 204, and/or 206 (e.g., icons respectively associated with the respective UEs) can be displayed on the respective display screens of the UEs 202, 204, and/or 206, to facilitate enabling the respective UE users to identify the location of the other members of the group so that the members can find or stay with their group, which can be useful, for example, when touring a large area (e.g., Wall Street, movie studio, amusement park, etc.).

In an aspect, users, utilizing the respective UEs 202, 204, and/or 206, and employing their respective LPPMC 214, LSPMC 216, or LPC 218, can cluster and/or sub-cluster desired UEs (e.g., icons that represent the desired UEs), and, when a cluster is selected for display on a particular UE (e.g., 202, 204, and/or 206), the respective locations of respective UEs in that selected cluster can be displayed on a display screen of the particular UE (e.g., location clustering display can be presented on the particular UE) to facilitate identifying the respective locations of the UE users associated with the UEs in the cluster, based at least in part on one or more specified preferences (e.g., clustering preferences). For example, UE user of UE 204 can desire to have a first cluster comprising all of the UEs in the group, and, in response to instructions and preferences received by the UE 204 from the UE user, the LSPMC 216 can facilitate creating the first cluster, and when that first cluster is selected, the UE 204 can display the respective locations of all of the respective UEs in the group, when desired (e.g., when the cluster is selected for display); the UE user of UE 204 also can desire to have a sub-cluster that includes only members (e.g., family members) of the UE user's sub-group (e.g., family), and, in response to instructions and preferences received by the UE 204 from the UE user, the LSPMC 216 can create a sub-cluster comprising only the UEs of members in the sub-group, wherein the respective locations of the respective UEs in the sub-group can be displayed by the UE 204, when desired (e.g., when the sub-cluster is selected for display).

In yet another aspect, the clusters also can be used to filter the UEs to which communications are sent or broadcast, or to filter the display of content from respective UEs, for example, as displayed on the whiteboard component. For instance, the UE user of UE 204 can desire that a particular communication only go to members of the sub-cluster, and not to all UE users in the group, which are part of the first cluster. The UE user can use the UE 204, employing the LSPMC 216, to select the sub-cluster and the UE 204 can broadcast the desired information (e.g., via voice communication, textual communication, etc.) to the UEs in the sub-cluster, and the UEs (e.g., 206) in the sub-cluster can receive and present the desired information to the respectively associated UE users, and the other UEs that are not in the sub-cluster will not receive that information.

As another example, the LPC 218 of the UE 206 can create a sub-cluster comprising only members (e.g., family members) of that UE users sub-group (e.g., family), wherein the sub-cluster can include UE 204 (e.g., UE associated with the parent of that UE user of UE 206). The UE user of UE 206 can desire to display only the information on the whiteboard component that was posted by UEs (e.g., 204, 206) in the sub-cluster. The UE user of UE 206 can use the UE 206 to select the sub-cluster in relation to selection of the whiteboard component, and, in response the selections of the UE user, the PMC 212 and/or LPC 218 can filter the information displayed on the whiteboard component so that only the information posted on the whiteboard by the members of the sub-cluster (e.g., information posted using UEs 204 or 206) are displayed on the UE 206.

In still another aspect, a sub-master UE (e.g., 204) can be employed to facilitate controlling communications between the UEs in the sub-master UE's sub-group and another sub-group of UEs controlled by another sub-master UE. When permitted by the sub-master UE (e.g., 204) (and associated user) of a first sub-group to which a slave UE (e.g., 206) belongs and the sub-master UE (and associated user) of a second sub-group to which another UE (e.g., slave UE, sub-master UE), the user of the slave UE (e.g., 206) of the first sub-group that desires to communicate with the UE that is part of the second sub-group can include the other UE in a cluster (provided the other UE does not have a preference parameter set to prevent that UE from being included in the cluster).

In an aspect, a UE (e.g., 202, 204, 206), using the available LPPMC 214, LSPMC 216, or LPC 218, can set various user preferences by setting respective user preference parameters in relation to communications between the UE and other UEs in the group of UEs. The user preferences can relate to, for example, information presentation or tour customization (e.g., information presentation or tour can be customized to meet the UE user's desires), clustering of UEs, controlling communications between subordinate UEs (e.g., when the UE is a master UE or sub-master UE), broadcast communications associated with UEs, uni-cast communications associated with UEs, volume preferences, language translation services, UE location preferences, direction preferences (e.g., shortest distance, shortest time, best tour route, handicap accommodations, etc.), whiteboard preferences, information preferences (e.g., types of additional information relating a topic the UE user desires, advertisement preferences, etc.), etc.

In accordance with yet another aspect, the PMC 212 can customize the information presentation (e.g., tour presentation) that the UE user experiences using the UE (e.g., 202, 204, 206), based at least in part on current location of the UE user and associated UE, preferences specified by the UE user, time constraints of the UE user (e.g., the amount of time the UE user desires to spend taking part in the information presentation), current state of the facility, programs, or exhibits (e.g., number of persons occupying respective areas of the facility, respectively how busy respective areas of the facility are, what exhibits or programs are currently available for access and what programs are not currently available for access, what exhibits or programs will be available for access during the period of time specified by the UE user, and/or other desired factors.

For example, a UE user employing a UE (e.g., 202, 204, 206), and associated available LPPMC 214, LSPMC 216, or LPC 218 can specify desired user preferences, selections, or requests (e.g., certain programs or exhibits the UE user desires to see during the tour; types of subject matter in which the UE user is interested; shortest distance for tour route; shortest time for tour route; best tour route; handicap accommodations; etc.) and that the UE user only has from 1:00 p.m. to 3:00 p.m. to take the tour, wherein the user preferences and time constraints of the UE user can be sent from the UE to the PMC 212. The PMC 212 can receive the preferences and time constraints, and also can identify the current location of the UE and the current status of the facility, programs, exhibits, etc., related to the tour. The PMC 212 can analyze the user preferences, time constraints, UE location, and current status of the facility, programs, exhibits, etc., related to the tour, and can generate a customized tour itinerary (e.g., optimized tour itinerary recommendation) for the UE user, based at least in part on the results of the analysis, wherein the customized tour itinerary can comprise information, such as, for example, information identifying the programs, exhibits, or other items that will be part of the customized tour, the respective times of the programs, exhibits, or other items, directions to guide the UE user to the programs, exhibits, or other items, summaries of the programs, exhibits, or other items, and/or other desired information. The PMC 212 also can generate a customized information presentation that can be sent to the UE for presentation to the UE user while the UE user proceeds through the tour. The PMC 212 can send the customized tour itinerary to the UE of the UE user, and, as desired, the UE user can use the customized tour itinerary to take the tour.

If for some reason, while taking the tour, the UE user desires to adjust the user's preferences or time constraints, the UE user can use the UE to send the desired changes to the preferences or time constraints to the PMC 212, and the PMC 212 can analyze the desired changes, current UE location, and current status of programs, exhibits, items, etc., of the tour, and can automatically and dynamically modify and update the customized tour itinerary, and the updated customized tour itinerary can be sent to the UE for use by the UE user, as desired. The PMC 212 also can automatically and dynamically generate an updated information presentation that can correspond to the updated customized tour itinerary and associated updated customized tour route, wherein the updated information presentation can be transmitted (e.g., streamed) to the UE of the user as the user proceeds along the tour route associated with the updated customized tour itinerary. In an aspect, the PMC 212 can synchronize or substantially synchronize the transmission of the information presentation to the UE for presentation to the user, based at least in part on the location of the UE along the tour route.

In still another aspect, the PMC 212 can coordinate with more than one UE and associated UE users in a particular to automatically generate a customized tour itinerary for all of the UEs in that group, based at least in part on an analysis of preferences of these UE users, time constraints of the UE users, location of the UEs, and current status of the programs, exhibits, items, etc., of the tour; or the PMC 212 can automatically generate respective customized tour itineraries that respectively cover respective portions of the tour, based at least in part on an analysis of preferences of these UE users, time constraints of the UE users, location of the UEs, and current status of the programs, exhibits, items, etc., of the tour (e.g., customized tour itineraries for four students who want to split up the tour into four separate portions, so the students can split up and take the respective portions of the tour in order to finish the tour faster but still cover the desired parts of the tour). In another aspect, the PMC 212 and the respective UEs of the UE users can operate to provide collaborative services, wherein, for instance, the respective UEs can communicate with each other using broadcast or uni-cast communications, and the PMC 212 can store such communications, wherein those communications and/or other information associated with the tour can be provided to the UE users, as desired, as more fully disclosed herein.

In an aspect, while a UE user proceeds through the facility or other area associated with the information presentation, the PMC 212, employing sensors (not shown in FIG. 2) can sense and identify the current location of a UE, and/or movement of the UE or associated UE user, and, when the UE or UE user is in proximity to (e.g., within a predefined distance away from) an exhibit (e.g., display item), the PMC 212 can automatically present, or automatically send a notification to the UE to notify the user of, information relating to the exhibit, based at least in part on the user's preferences (e.g., user preference to have information relating to display items automatically streamed to the UE; user preference to receive a notification that a presentation regarding the display item is available, and to stream the presentation in response to an indication from the UE that the user desires to receive the presentation). As desired, when the UE is part of a group, and the UE is a slave UE (e.g., 206), the master UE (e.g., 202) or sub-master UE (e.g., 204) can control the presentation of information relating to the exhibit to the slave UE and/or the triggering of the presentation of such information, or notification of the availability of such information, can be based at least in part on the master UE's or sub-master UE's proximity to the exhibit, rather than the slave UE's proximity to the exhibit.

In accordance with various aspects, the respective UE users can use their respective UEs (e.g., 202, 204, 206), employing the respectively associated available LPPMC 214, LSPMC 216, or LPC 218, to generate notes, comments, or other information (e.g., voice data, textual data, visual content, audio content, multimedia content, etc.) that can be communicated from the respective UEs to the PMC 212, which can aggregate and store the received information, generate and/or maintain an association of respective portions of information to respective UEs (and associated UE users), generate and/or maintain contextual information relating to the respective portions of information (e.g., time the information portion was created, the destination to which the information portion is directed, the exhibit or portion of the presentation that was occurring when the information portion was created, etc.), etc. For instance, for each UE user, the PMC 212 can create a user file that can include information relating to the information presentation, wherein the information can comprise, for example, notes or comments associated with the UE user, information presentation information, whiteboard information, other public, semi-public or private (e.g., private to the UE user or other desired associated UE users) information relating to the information presentation, contextual information, visual content, audio content, multimedia content, information (e.g., URL(s), book(s), or other information) relating to other sources of information related to the information presentation, etc. As desired, the information, or a portion thereof, contained in the user file of the UE user can be provided to the user (e.g., at a desired cost) in a desired format (e.g., DVD, CD, file download, etc.).

In an aspect, as desired, when a UE (e.g., 202, 204, 206) is in active mode (e.g., while the UE is integrated with the PMC 112), the PCC (e.g., LPPMC 214, LSPMC 216, LPC 218) of the UE can control information (e.g., pictures, video, audio, etc.) captured by the UE so that such information is not locally stored on the UE, but rather can be communicated to the PMC 212 to be stored by the PMC 212. This can enable the entity (e.g., museum, aquarium) associated with the PMC 212 having control over the members of the tour group taking pictures or video, or otherwise recording portions of the tour. This can facilitate inducing a member of the tour group to purchase the DVD, CD, or file of the tour experience from the entity, which can thereby increase revenue for the entity.

In still other aspects, the PMC 212 can identify targeted information (e.g., targeted information that can provide other information relating to the information presentation, targeted advertisements for products or services, etc.) that can be based at least in part on contextual information, and/or current or historical information, relating to the UE (e.g., 202, 204, 206) and the associated UE user. The PMC 212 can generate such targeted information during the time when the UE is in active mode with regard to the PMC 212 (e.g., when the UE and UE user are taking part in the information presentation), or at a future time (e.g., at or after the time the UE and UE user are finished with the information presentation), and the targeted information can be provided to the UE of the user or another communication device of the user (e.g., home personal computer) in a desired format (e.g., email, text message, computer-readable media, hard copy printed document, etc.). As desired, the targeted information can be provided by the PMC (on behalf of an entity that desires the targeted information to be sent to the UE) in exchange for a desired amount of compensation (e.g., monetary compensation) or for no compensation from the entity. In an aspect, the UE of the user can be employed to act as a charge card (e.g., credit card), or employed in another desired manner to facilitate payment of any amount due, if any, for the purchase of the targeted information. For instance, the UE can be associated with a charge account of the UE user, and the charge account of the UE user can be charged with any amount due in relation to the purchase of the targeted information.

In another aspect, the PMC 212 and/or the master UE (e.g., 202) also can comprise an information push option (e.g., push component), wherein, in response to a push command (e.g., push command received by the UE 202 from the tour guide), the PMC 212 and/or master UE (e.g., 202) can push certain information (e.g., information relating to the information presentation; recommendations for products or services, tour itinerary, voting button relating to voting for items relating to the tour (wherein a future portion of the itinerary of the tour can be determined based at least in part on the votes of the respective UE users in the tour group), an available meal menu provided in relation to the information presentation, a customized tour map that was requested by a UE user(s) (e.g., in a group or sub-group), a game relating to the tour group, etc.) to the UEs (e.g., sub-master UE(s) or slave UE(s)) of a group or a subset of UEs of a group (e.g., UEs in a sub-cluster), based at least in part on preferences or requests of a UE user associated with a UE, agreed exchange of information between the PMC 212 and/or the master UE (e.g., 206) and/or other UEs in the group (if any) (e.g., information agreed to be exchanged when a UE registers with the entity associated with the PMC 212 and enters active mode), etc. For instance, with regard to a master UE (e.g., 202) or a sub-master UE (e.g., 204), such master or sub-master UE can push information to one or more desired UEs (e.g., 204, 206) in a group or sub-group, in accordance with preferences of UE users, and/or the agreed exchange of information relating to the information presentation, etc.

In yet another aspect, if the UEs (e.g., 202, 204, 206) in the group have been pre-provisioned with the PMC 212, the PMC 212 and/or the master UE (e.g., 202) can be employed to provide a wake-up call service, wherein the PMC 212 and/or master UE (e.g., 202) can send a wake-up call or alert to the UEs in the group at a desired time to notify the UE users that it is time to wake up or take other action, in response to the wake-up call or alert. The PMC 212 and/or master UE (e.g., 202) also can send other types of alerts to the other UEs (e.g., 204, 206) in the group, wherein an alert can relate to, for example a start time for a program, lecture or other event, a meeting time (e.g., time for the members of a group to meet up with each other), an end time of a tour or portion thereof, etc.

The following non-limiting example of various aspects of the disclosed subject matter relates to how UEs can be used in relation to an interactive tour of an outdoor location (e.g., Wall Street). For instance, a tour guide company has 20 tourists in a group (called Joy Tour group) which is composed of 5 families. This company contacts a store that provides communication devices and leases 21 tour-ready UEs (including UEs 202, 204, 206) that are pre-provisioned with the PMC 212. One UE (e.g., 202) is configured as the master UE or controller that includes a LPPMC 214. Five UEs (e.g., 204) are configured as sub-masters or sub-controllers that each can comprise respective LSPMCs 216. The remaining UEs (e.g., 206) are configured as slaves or group members and can have respective LPCs 218. Some families have small children and therefore the member UEs comprise a variety of different types of communication devices, such as, for example, smartphones, pendant-like communication devices that can be worn on the user's body, watch-like communication devices that can be strapped to the wrist of the user, etc. All (or at least a desired portion) of the UEs also have a pair of Bluetooth enabled earphones that can be used to wirelessly communication information from the respective UEs to the respective earphones. All of the UEs are respectively associated with respective unique UE identifiers and also include GPS functionality.

At the start of the tour, all of the UEs are distributed to the tourists in the group. Two of the adult tourists from two different families request to use their own smart phones which are accepted by the tour guide and provisioned with the PMC 212. The tour guide assists the tourists to configure their smart phones to become sub-controllers, comprising respective LSPMCs 216, for their respective sub-groups (e.g., respective families). Also, one family is from China and does not understand English. The tour guide assists them to set their UEs (using LSPMC 216 or LPC 218 on the respective UEs) with the Chinese language option. As a result, all interactions with those UEs during the tour will be translated from Chinese to English when being transmitted from the UEs to the other UEs in the group, and English to Chinese when information is being received from other UEs, in real time or near real time, and pre-recorded portions of the tour presentation can be pre-translated to Chinese for transmission and presentation to the UEs of that family. This language translation feature can enable this non-English speaking family to enjoy the tour without feeling left out.

The tour group is visiting the Wall Street District. There are at least 40 tourist groups in the financial district that day. As a result, without the use of the earphones, no one can quite hear what the tour guide is talking about. Members follow the tour guide person in a long line. After a few minutes, a few of the group members who walk behind cannot even see the tour guide anymore.

Fortunately, the Joy Tour group is well prepared. Each tourist puts the earphones on. The GPS Location Panel on the controller UE (e.g., 202) is automatically on to facilitate identifying the respective locations of the UEs in the group. The tour guide selects "display all options" on the touch screen of the display screen on the controller UE, and this results in the controller UE displaying all of the sub-controller UEs and/or members' respective locations in a few clusters. The respective users of the respective sub-controller UEs each select "controller" and their "own members display option" which displays the controller UE's cluster location and respective locations of all of their respective member UEs. As a result, the tour guide can use the controller UE to perceive and identify the respective locations of the sub-controller UEs, and, as desired the controller UE also can display the respective locations of the member UEs; and the five family heads can use the respective sub-controller UEs to perceive and identify the location of the controller UE, and each family head can use his or her sub-controller UE to perceive and identify the respective locations of the member UEs in that family head's sub-group.

Since one particular family head and some of his family members have fallen behind the rest of the group, that family head can select a "slow down option" on the sub-controller UE, which causes the controller UE to suspend the information presentation and notifies the tour guide to temporarily stop the tour and wait for the family head and members to catch up with the rest of the tour group.

When all people in the tour group are gathered around the Merrill Lynch Bull Sculpture location, the tour guide starts to explain the history of the financial district. However, there are at least 100 visitors near-by with some taking pictures and some talking about what they have seen in various languages. The high noise level prevents a normal person from hearing what the tour guide person is saying. To overcome the noise, the Joy Tour guide activates the broadcast intercom feature on the controller UE, and speaks into the controller UE to broadcast the information to all of the UEs in the group. As a result, all group members can hear the tour guide's fascinating stories clearly with the earphones via their respective UEs.

At one point during the tour, one group member decides to ask a question of the tour guide and that group member selects (e.g., touches) the "raise hand" tab (e.g., "raise hand" button) on the touch screen display of his UE and also requests a private reply, and a raise-hand indicator and request for a private reply are transmitted from that UE to the controller UE. The controller UE receives those communications, and the tour guide selects the uni-cast option on the controller UE and provides a response to the question that is only communicated to the requesting UE.

The following is another non-limiting example of various aspects of the disclosed subject matter in relation to a tour of an indoor location. The Joy tour company gets a small tour group of 8 college students from two west coast colleges (college A and college B) visiting a few museums in the Washington D.C. area. The students will need to turn in a final paper for their study trip. The Joy tour guide decides to lease a few tour guide ready wireless devices from the nearby communication device store instead of renting them from the museums to avoid using different UEs in each museum.

The Joy tour group reaches the museum. The museum staff assists them with provisioning and configuring their UEs into two sub-groups. As part of the provisioning and configuration of the UEs, all of the UEs are integrated into the museum's indoor communication infrastructure (note: if this group had rented UEs from the museum, these rented UEs would already be partially configured). Four students from college A are in group A and the other 4 students from college B are in group B. The tour guide's UE (e.g., 202) is configured as a controller UE comprising LPPMC 214, and the students' UEs are all configured as member or slave UEs (e.g., 206) comprising respective LPCs (e.g., 218).

All exhibit rooms are equipped with a plurality of sensors, comprising two types of sensors. The first type of sensor (not shown in FIG. 2) can collect traffic flow information (e.g., how many visitors are currently in this exhibit hall). The second type of sensor (not shown in FIG. 2) is a location sensor that can be integrated with a Femtocell or Wi-Fi gateway (e.g., 210) to calculate a UE's precise indoor location at any given time.

In an aspect, the controller UE (e.g., 202) will have the option to be able to display the respective locations of all of the slave UEs (e.g., 206) of the group A and group B when desired. Each of the slave UEs (e.g., 206) of group A will have the option to be able to display the respective locations of all of the other UEs in group A, also, group B will have the option to be able to display the respective locations of all of the UEs in group B, and each of the slave UEs (e.g., 206) and sub-controller UEs (e.g., 204) will have the option to be able to display the location of the controller UE (e.g., 202), when desired.

Since the two groups of students have some common topics and some different topics to cover, they decide to have the tour guide lead them through the common topic exhibit halls first. The tour guide uses the controller UE (e.g., 202) and its LPPMC 214 to communicate with the PMC 212 to engage the interactive services of the PMC 212 to plan the initial route through the museums to cover the common topics of groups A and B. The PMC can automatically and dynamically generate a tour itinerary (e.g., tour itinerary recommendation) for the common topics portion of the tour, and can send the tour itinerary to the controller UE (e.g., 202). When the controller UE (e.g., 202) receives the tour itinerary, the tour guide can select (e.g., touch or click on) the push tab (e.g., push button), and in response, the controller UE (e.g., 202) can push the tour itinerary and related instructions to all 8 of the slave UEs (e.g., 206), wherein each of the slave UEs (e.g., 206) can access and display the tour itinerary and associated instructions, or a desired portion thereof, on the display screen of the slave UE (e.g., 206).

In an aspect, the PMC 212 associated with the museum executes its direction service and providing directions to the controller UE (e.g., 202) and the slave UEs (e.g., 206) to lead the tour guide, group A, and group B towards the desired destination (via earphone using the broadcast service and/or a dynamic map displayed on the respective UEs). When the destination is reached, the tour guide decides to use the broadcast intercom on the controller UE (e.g., 202) to override the broadcast service from the PMC 212, and pushes a control (e.g., a button) to select the broadcast intercom, and the tour guide can speak into the controller UE (e.g., 202) and the controller UE can broadcast the tour guide's message to all of the slave UEs (e.g., 206). As a result, all of the students in group A and group B now can hear clearly the description and explanations of the tour guide from the tour guide's broadcast intercom service.

One of the students desires to ask the tour guide a question. That student can select the raise hand control on the slave UE (e.g., 206), and the UE can send a raise hand indicator, comprising the UE identifier of the UE from which the indicator is sent, to the controller UE (e.g., 202), and the controller UE can present the raise hand indicator to the tour guide to notify the tour guide that the UE user desires to ask a question. The tour guide can use the controller UE (e.g., 202) to respond to the slave UE (e.g., 206) and associated student to acknowledge the raise hand indicator and allow the student to ask the question. The student can select the broadcast intercom mode or the uni-cast mode, and can speak the question into the slave UE, and the slave UE can either transmit the question to all of the UEs in the group and the controller UE when in broadcast mode, or transmit the question only to the controller UE when in uni-cast mode, to facilitate allowing interactive participation in the tour experience by the students and the tour guide.

After the two groups complete part of the tour covering the common topics, group A and group B decide to split up and tour separately for the remaining individual topics for 2 hours. The tour guide will meet the students near the entrance in two hours at the end of the tour.

Group A plans to visit as many exhibits as possible and therefore they start planning their tour route. The students of group A use one or more of their respective UEs (e.g., 206) to select their preferred topics (e.g., preferences) using voice recognition or touch screen and enter 2 hours as the time constraint, and this information is sent from the UE(s) to the PMC 212. They also divide group A into 4 groups (e.g., of one student each) so they can use the divide and concur scheme to cover four times the exhibits in the 2 hours, and this information is sent to the PMC 212 as well. The PMC 212 can analyze the information received from the UE(s), identify and use the current locations of the UEs, congestion information relating to the tour exhibits and paths, information relating to exhibits and programs, and/or other tour-related information to identify 4 desirable (e.g., optimal) unique tour itineraries for the 4 respective groups. The PMC 212 can transmit the 4 tour itineraries to the 4 UEs in the 4 groups. The PMC 212 also can create a 4-discussion whiteboard that can allow the 4 UEs to be used by the respective students to communicate messages (e.g., voice recognition, textual, digital images, etc.) to allow the students to collaborate with each other while taking their respective tours and share and discuss desired topics along the way.

A first student of the 4 students visits an exhibit on civil war history. The UE (e.g., 206) of the first student can provide turn-by-turn navigation to assist the first student in navigating the tour route. When the first student is observing a huge oil painting about the North and South fighting in Virginia, the location of the first student's UE (e.g., 206) is detected by a sensor associated with the PMC 212, and the location of the UE (e.g., 206) is identified by the PMC 212. In response to detecting the location of the UE (e.g., 206) being in proximity that oil painting, the PMC 212 can communicate historical information about this painting and stories about the fight are streamed to the first student's UE (e.g., 206). This stream of information includes pictures, text, and voice narratives. The PMC 212 also can store this information in a tour file associated with the first student. The first student also can interactively take notes or use the UE (e.g., 206) to search for more public information on the subject, wherein the search can be communicated to the PMC 212. The PMC 212 can search for more public information on the subject, and can communicate information relating to the search results to the first student's UE (e.g., 206). This search result information also can be stored in the first student's tour file. The search result information can be tagged to associate it with the notes made by the first student, wherein the data tags can be stored in the first student's tour file as well, to facilitate retrieval of the search result information by the first student when reviewing her notes at a later time.

The PMC 212 can continue to monitor the first student's interactions with the tour. At a desired time, after the PMC 212 has learned and identified the first student's interactive behavior in relation to the tour exhibits, the PMC 212 automatically and dynamically identifies a number of recommendations based at least in part on the learned interactive behavior of the first student. The PMC 212 automatically and dynamically generates the recommendations and sends them to the first student's UE (e.g., 206). These recommendations can include, for example, books or articles in a CD format, gift ideas, etc., that may be of interest to the first student in view of the learned interactive behavior of the first student. The first student decides to purchase a few souvenirs via an interactive purchase feature of the PMC 212 that can be accessed by the UE (e.g., 206) using the LPC 218.

One of the recommendations suggests that a rare presentation, which lasts for 20 minutes, will be given by a scholar in Exhibit B for the history topic that the students have to cover. The first student believes that this presentation will be good for the other 3 students to listen to also. The first student selects an option to display a geo map, and her UE displays the geo map showing the respective locations of the other 3 UEs (e.g., 206), and selects the other 3 UEs (e.g., icons representing the other 3 UEs that are displayed on the geo map) to send a message and/or alert to the other 3 students about the event. A second student is near Exhibit B and uses his UE to send a message, which indicates that the second student will attend the event, to the first student's UE. The third and fourth students decide not to attend the event, and use their respective UEs to send a message declining to attend the event to the first student's UE. However, the third student, although declining to participate in the event, decides to post a few comments to one of the team whiteboards relating to the event by speaking into his UE and, using voice recognition, having his comments added to that whiteboard. The first student sees the third student's comments on that whiteboard and asks the presenter at the event to comment on the third student's comments. The response of the presenter is heard by the third student over the streaming session on his UE and is also recorded on that whiteboard. The first student sends that whiteboard information to her notes on the event. The PMC 212 saves all of that information relating to that event.

The PMC 212 or controller UE (e.g., 202) can determine that the 2 hour time constraint is almost up, and can transmit alerts to the UEs of Group A and Group B to indicate to the students of Group A and Group B that it is almost time to leave, wherein the respective UEs associated with Group A and Group B can present the alerts to the respective students. The PMC 212 or controller UE (e.g., 202) also can provide respective directions to each of the UEs associated with Group A and Group B, based at least in part on the respective locations of those UEs, to facilitate leading the students to the entrance of the museum. The first student proceeds to pay her bill and picks up her notes (in CD format) and other tour-related information that was saved in her tour file as well as purchasing some gift items, and then proceeds to the entrance in accordance with the directions displayed on her UE.

While the students of Group A are waiting at the entrance, it is now 10 minutes past the 2 hour duration of the individual portion of the tour, and the Group B students still have not arrived at the entrance. The tour guide can use the controller UE (e.g., 202) to identify the respective locations of the respective UEs (e.g., 206) of Group B student, can select the respective UEs of Group B on the controller UE (e.g., 202), and can send an alert message to the UEs of Group B, wherein the UEs of Group B can present the alert message to the respective UE users to alert the students of Group B that they are to proceed to the entrance of the museum because the tour time deadline has been reached. When all of the students are at the entrance, the museum staff can assist the students in deactivating their UEs from the integrated services of the PMC 212.

The subject specification can allow wireless communication carriers to offer new and differentiated group communication service for specific vertical market segments, which can provide enhanced service opportunities to the wireless communication carriers, increase revenue generation, and improve customer satisfaction. The subject specification also can offers UE vendors the opportunity to enhance existing UE design and/or introduce a set of improved UEs that can be targeted for special vertical market segment, which can thereby provide product flexibility that can meet different customer needs or desires. The subject specification can allow vendors of existing UEs to take part in software-related business relating to aspects of the subject specification, which can thereby provide new revenue opportunities to those vendors.

The subject specification also can offer efficiency to the tourist industry and bring the touring services to an improved level of experience, which can result in productivity improvement and improved customer satisfaction. The subject specification can provide new revenue streams to the indoor locations, such as museums, landmark buildings, etc., via UE rentals and interactive services, thereby providing improved differentiated services and increased revenue generation. The subject specification can provide individual tourists with an improved tour experience and can allow them to record what they see or comment on with immediate and interactive collaborated information. The subject specification can enrich the usage of smart devices, as, for example, a user can configure his UE (e.g., smart phone) to become a smart touring device, which can enhance customer experiences, increase reusability of smart telecommunication devices, and increase revenue generation to service providers.

The subject specification, by enabling UEs to be grouped into larger groupings (e.g., 10, 25, 50, or more UEs and associated users in a tour group) than the typical "family plans" or bundles, can result in improved and increased opportunities for service provides to create other group features based on the features of the subject specification. For instance, the subject specification can be employed in social networking, wherein a social networking system can be utilized in conjunction with the UE grouping features, as disclosed herein, of the subject specification. Also, the subject specification can provide new revenue sources for service providers, as service providers and/or other entities (e.g., businesses that have information, goods or services that are related to the information presentation, businesses that are along or in proximity to given points of the tour route, etc.) can realize increased revenue from online advertising both from online advertisements relating to offering the interactive information presentation services (e.g., interactive tour) and from the online advertisements (e.g., targeted or general advertisements) that can be presented to the UE users prior to, during or after participating in the interactive information presentation experience (e.g., online advertising can be pushed or otherwise presented to a UE prior to the information presentation so that the UE user can be made aware of information related to the information presentation that the UE user can access or purchase online or at a physical place of business). For instance, educators at almost all levels (e.g., grade school through college) can find the interactive information presentation services desirable (e.g., for field trips) and online advertising can be focused on educators, students, or others persons or groups that are expected to have an interest in such services.

Figure 3:
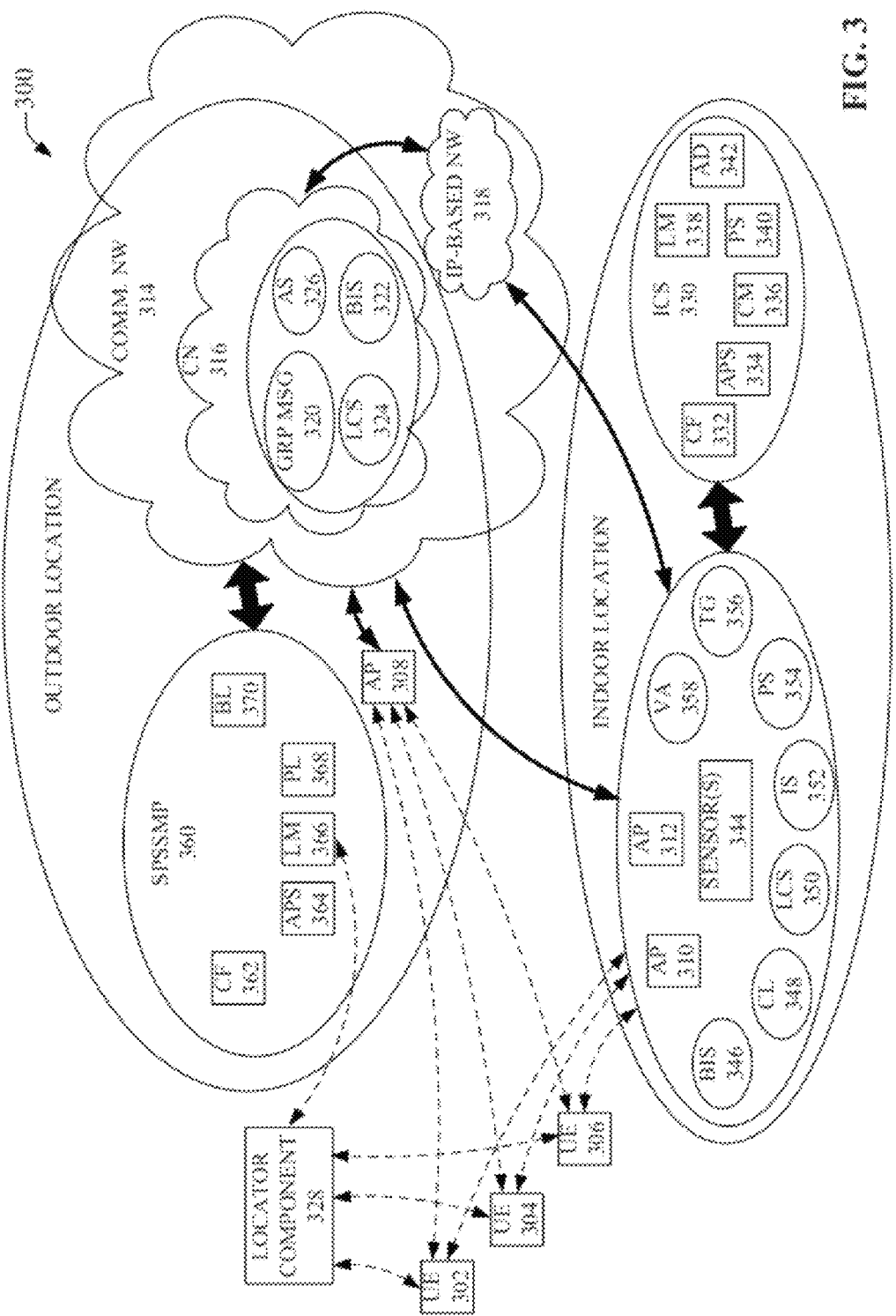
FIG. 3 illustrates a block diagram of an example system that can enhance communications relating to presentations at indoor locations and outdoor locations in accordance with various aspects and embodiments of the disclosed subject matter.

FIG. 3 depicts a diagram of an example system 300 that can enhance communications relating to presentations (e.g., tour presentations, convention presentations, etc.) at indoor locations and outdoor locations in accordance with various aspects and embodiments of the disclosed subject matter. The system 300 can include a desired number of UEs, such as UE 302, UE 304, and UE 306, that can be used to transmit and receive voice and data communications, including communications relating to an information presentation, among other types of communications for which they can be used. With regard to outdoor locations (and indoor locations), the system 300 can include a desired number of APs (e.g., macro or cellular base stations), such as AP 308, that can be employed to facilitate wireless communications by the UEs (e.g., when served by the AP 308). With regard to the indoor locations (or outdoor areas associated with an indoor location), system 300 also can include a desired number of APs, such as AP 310 (e.g., femto AP) and AP 312 (e.g., Wi-Fi AP), that can be employed to facilitate wireless communications by the UEs (e.g., when served by such an AP).

The system 300 also can contain a communication network 314 (COMM. NW 314) that can facilitate wired and wireless communication between communication devices (e.g., UE 302, UE 304, UE 306) associated with the communication network 314. In an aspect, the communication network 314 can comprise a core network 316 (CN 316) (e.g., mobile core network) that can be employed to facilitate communication by UEs associated (e.g., wirelessly connected) with the core network 316 and other communication devices associated with the communication network 314. The core network 316 can be associated with APs, such as AP 308 and AP 310 (e.g., femto AP), to facilitate wireless communication of voice and data associated with communication devices, such as UE 302, UE 304, and/or UE 306, in the communication network 314. The core network 316 can facilitate routing voice and data communications between UEs and/or other communication devices (e.g., phone, computer, email server, multimedia server, audio server, video server, news server, financial or stock information server, other servers, other communication devices associated with an IP-based network 318 (IP-BASED NW 318) (e.g., Internet, intranet, etc.) associated with the communication network 314. The core network 316 also can allocate resources to the UEs (e.g., 302) in the communication network 314, convert or enforce protocols, establish and enforce Quality of Service (QoS) for the UEs, provide applications or services in the network, translate signals, and/or perform other desired functions to facilitate system interoperability and communication in the wireless communication network. The core network 316 further can include desired components, such as routers, nodes (e.g., SGSN, GGSN, etc.), switches, interfaces, controllers, etc., that can facilitate communication of data between communication devices associated with the communication network 314.

In accordance with various aspects, the core network 316 can facilitate the providing a variety of services, in addition to voice and data services, wherein the services can comprise, for example, group messaging services 320 (GRP MSG 320), broadcast intercom services 322 (BIS 322), location clustering services 324 (LCS 324), and alert services 326 (AS 326). The group messaging services 320 can that allow the UEs (e.g., UE 302, UE 304, and/or UE 306) in a group (e.g., tour group) to send messages (e.g., voice, data) to other members of the group, wherein, as desired, all of the members can see all or a desired portion of messages (e.g., public group messages, private group messages) between UEs of group members. The broadcast intercom services 322 can allow UE users in a group or sub-group of the group to use their UE to transmit a broadcast communication simultaneously to multiple other UEs in the group or sub-group. The location clustering services 324 can be employed by UEs to facilitate clustering of UEs in a group into desired sub-groups and identifying respective locations of respective UEs in a particular cluster, the location of a sub-controller UE (e.g., UE of a parent of a family) of a particular cluster (e.g., family cluster), or the location of a controller UE (e.g., tour guide's UE). The alert services 326 that can provide desired alerts (e.g., wake-up alerts or calls, reminder alerts, alerts, alerts from other UEs, etc.) to the UEs associated with the communication network 314.

The communication network 314 also can include the IP-based network 318 that can be associated with the core network 316 and can facilitate communications by communication devices associated with the communication network 314 at least in part via communication of data packets (e.g., IP-based data packets) between communication devices that are associated with the communication network 314 using a wired or wireless communication connection in accordance with specified IP protocols.

In an aspect, a wired communication connection between a communication device (e.g., UE 302) and the IP-based network 318 can be a communication connection that can communicate voice or data, and/or can be a DSL-type or broadband connection facilitated via an Ethernet connection, and/or a wireless communication connection can be facilitated via a connection of the UE to an AP (e.g., 312). The UE (e.g., 302) can transmit messages via a wired or wireless connection through the IP-based network 318, the core network 316, or other communication networks, to other UEs.

The system 300 also can contain a locator component 328 that can employ desired components (e.g., satellites, processors, etc.) to facilitate detecting and identifying respective locations of respective UEs. For instance, the locator component 328 can comprise a global positioning system (GPS) to facilitate identifying a location of a UE.

The system 300 can further include an indoor computing system 330 (ICS 330), which can be hosted or un-hosted, and can comprise a desired number of servers, such as, for example, one or more configuration servers 332 (CF 332), one or more application servers 334 (APS 334), one or more communication servers 336 (CM 336), one or more location/mapping servers 338 (LM 338), one or more portal servers 340 (PS 340), and one or more add-on download servers 342 (AD 342), etc., to facilitate desirably providing interactive information presentations to UEs that are used in relation to information presentations at the indoor location. A configuration server 332 can be employed to facilitate configuring UEs (e.g., UE 302, UE 304, UE 306) to operate interactively with other communication devices (e.g., UEs, servers, etc.) to facilitate providing an enhanced and interactive information presentations to UE users. In another aspect, a configuration server 332 can operate in conjunction with an application server 334 to download one or more applications to a UE that can be used to configure the UE as a controller UE comprising a LPPMC, a sub-controller UE comprising a LSPMC, or a member UE comprising an LPC. The application server 334 also can maintain, provide, or execute other applications, such as applications relating to programs of exhibits that are part of information presentations. In still another aspect, a communication server 336 can be utilized to facilitate voice and data communications between communication devices (e.g., UEs, communication devices associated with the PMC, etc.) associated with the indoor computing system 330 or communication network 314. A location/mapping server 338 can be associated with the locator component 328, the APs (e.g., AP 308, AP 310, AP 312), and/or one or more sensors 344 associated with the indoor location, wherein the location/mapping server 338 can detect, identify, or track respective locations of respective UEs associated with the indoor computing system 330. A portal server 340 can facilitate providing UEs access to portal services associated with (e.g., provided by or on behalf of) the indoor computing system 330 and entity operating or managing the indoor location. An add-on download server 342 that can provide desired add-on services to UEs associated with (e.g., integrated with or connected to the PMC associated with) the indoor location.

As disclosed, the system 300 comprises a desired number of sensors 344. The sensors 344 can comprise different types of sensors, including, for example, a location sensor that can facilitate identifying a location of a UE, such as a UE within a predefined distance of the location sensor, and/or a traffic sensor that can facilitate tracking the amount of traffic (e.g., people, UEs, etc.) associated with a particular physical area (e.g., room, portion of a room, etc.). In an aspect, a location sensor can be associated with (e.g., connected to or integrated with) an exhibit or an AP, such as AP 310 or AP 312. In another aspect, a traffic sensor can facilitate identifying the number of people or UEs that are in a particular area of the indoor location to facilitate determining tour itineraries for respective tourists, scheduling of programs or services for tourists, determining the popularity of a particular exhibit or program, etc.

In still another aspect, the system 300 can comprise a desired number of services, such as for example, broadcast intercom services 346 (BIS 346), collaborative services 348 (CL 348), location clustering services 350 (LCS 350), interactive services 352 (IS 352), portal services 354 (PS 354), tour guide services 356 (TG 356), and/or value added services 358 (VA 358). Similar to the broadcast intercom services (e.g., 322) disclosed herein, the broadcast intercom services 346 can allow UE users in a group or sub-group of the group to use their UE to transmit a broadcast communication simultaneously to multiple other UEs in the group or sub-group. The collaborative services 348 can be employed to facilitate enabling UE users to use their UEs to communicate and collaborate with each other, as desired, for example, to exchange information (e.g., notes, comments, images, audio, etc.) regarding subjects related to information presentations, exhibits, or programs. The collaborative services 348 also can allow a UE user to use the UE (e.g., 302) to determine whether any one else in other groups has been making comments or providing other information regarding a certain topic of interest to the UE user, wherein such comments or information can be posted on a whiteboard or other data location available to be accessed by the UE. Similar to the location clustering services disclosed herein, the location clustering services 350 can be employed by UEs to facilitate clustering of UEs in a group into desired sub-groups and identifying respective locations of respective UEs in a particular cluster, the location of a sub-controller UE of a particular cluster, or the location of a controller UE. The interactive services 352 can enable a UE user taking part in an information presentation to use a UE to interact with the tour guide, other tour group members, exhibits, lecturers on the tour, tour programs, etc.

The portal services 354 can include, for example, services relating to registering for a tour, sale and purchase of products or tour tickets from a business entity associated with an information presentation, providing instructions relating to an information presentation, providing information relating to programs, lectures, exhibits, etc., configuring of UEs to be used for interactive participation in an information presentation, etc. The tour guide services 356 can enable a tour guide to provide an enhanced interactive tour experience. The tour guide services 356 can allow a controller UE, used by the tour guide, to identify respective locations of UEs and associated tour group members to facilitate locating tour group members or keeping the tour group together, cluster UEs into desired clusters, push information (e.g., tour instructions, information regarding exhibits or programs, recommendations, etc.) to UEs of group members, identify when a tour member desires the tour guide to slow down so that the tour member can catch up to the group (e.g., when a UE user uses the UE to select the "slow down" option), identify when a tour member desires to ask a question (e.g., when a UE user uses the UE to select the raise-hand option), etc. The value-added services 358 can include, for example, recording and storing information, comments, notes, pictures, video, etc., relating to a tour, and allowing a tour member to purchase a copy of the information, comments, notes, pictures, video, etc., in a desired format (e.g., DVD, CD, downloadable file, etc.); dynamic pop-up recommendations sent to the UE of a tour member wherein the recommendations can be, for example, gift ideas, lectures, programs, or presentations that may be of interest to the tour member and/or advertisements, coupons, or specials for a restaurant, gift shop, or other business entity; electronic gaming or activity service that can provide electronic games or activities (e.g., activities that can be performed using a UE), music service that can provide music to a UE, video service that can provide videos to a UE, information provider service(s) that can provide desired information to a UE (e.g., an information provider service can be a service that can provide information relating to the information presentation, news provider service, entertainment provider service, etc.), etc., wherein a UE user can enjoy any such value-added services 358 at desired times (e.g., during idle time on a tour, such as when the tour group is on a tour bus going from one point of interest to another point of interest). With regard to value-added services 358, for example, a service provider (e.g., communication service providers) can work with or team up with entities (e.g., museums, tour guide businesses, convention-related businesses, etc.) to provide at least a portion of the value-added services 358. This can result in increased revenue for both the service provider and the entities (e.g., museum-related business, aquarium-related business, convention-center-related business, tour guide business, gift shop or other store associated with or in proximity to a museum, an aquarium, a convention center, etc.).

With regard to the outdoor location, a service provider support system management platform 360 (SPSSMP 360) can be employed to facilitate enabling UEs to be used to provide an enhanced interactive information presentation experience. The SPSSMP 360 can comprise one or more one or more configuration servers 362 (CF 362), one or more application servers 364 (APS 364), one or more location/mapping servers 366 (LM 366), one or more policy servers 368 (PL 368), and one or more billing servers 370 (BL 370), etc., to facilitate desirably providing interactive information presentations to UEs that are used in relation to information presentations at the indoor location. A configuration server 362 can be employed to facilitate configuring UEs (e.g., UE 302, UE 304, UE 306) to operate interactively with other communication devices (e.g., UEs, servers, etc.) to facilitate providing an enhanced and interactive information presentations to UE users. In another aspect, a configuration server 362 can operate in conjunction with an application server 364 to download one or more applications to a UE that can be used to configure the UE as a controller UE comprising a LPPMC, a sub-controller UE comprising a LSPMC, or a member UE comprising an LPC. The application server 364 also can maintain, provide, or execute other applications, such as applications relating to programs of exhibits that are part of information presentations. In another aspect, a location/mapping server 366 can be associated with the locator component 328 and/or the APs (e.g., AP 308, AP 310, AP 312), wherein the location/mapping server 366 can be used to detect, identify, or track respective locations of respective UEs associated with the SPSSMP 360. A policy server 368 can be employed to identify and enforce desired policies, including, policies relating to providing enhanced interactive information presentations. A billing server 370 can track use or consumption of billable items or services by UE users, for example, in relation to an information presentation, and can generate respective billings for respective UE users for the use or consumption of billable items or services.

It is to be appreciated and understood that desired portions of the system 300 can be part of or associated with a PMC. For instance, the PMC can comprise or be associated with, for example, the SPSSMP 360, indoor computing system 330, APs (e.g., AP 310, AP 312), sensors 344, and/or variety of services disclosed herein.

Figure 4:
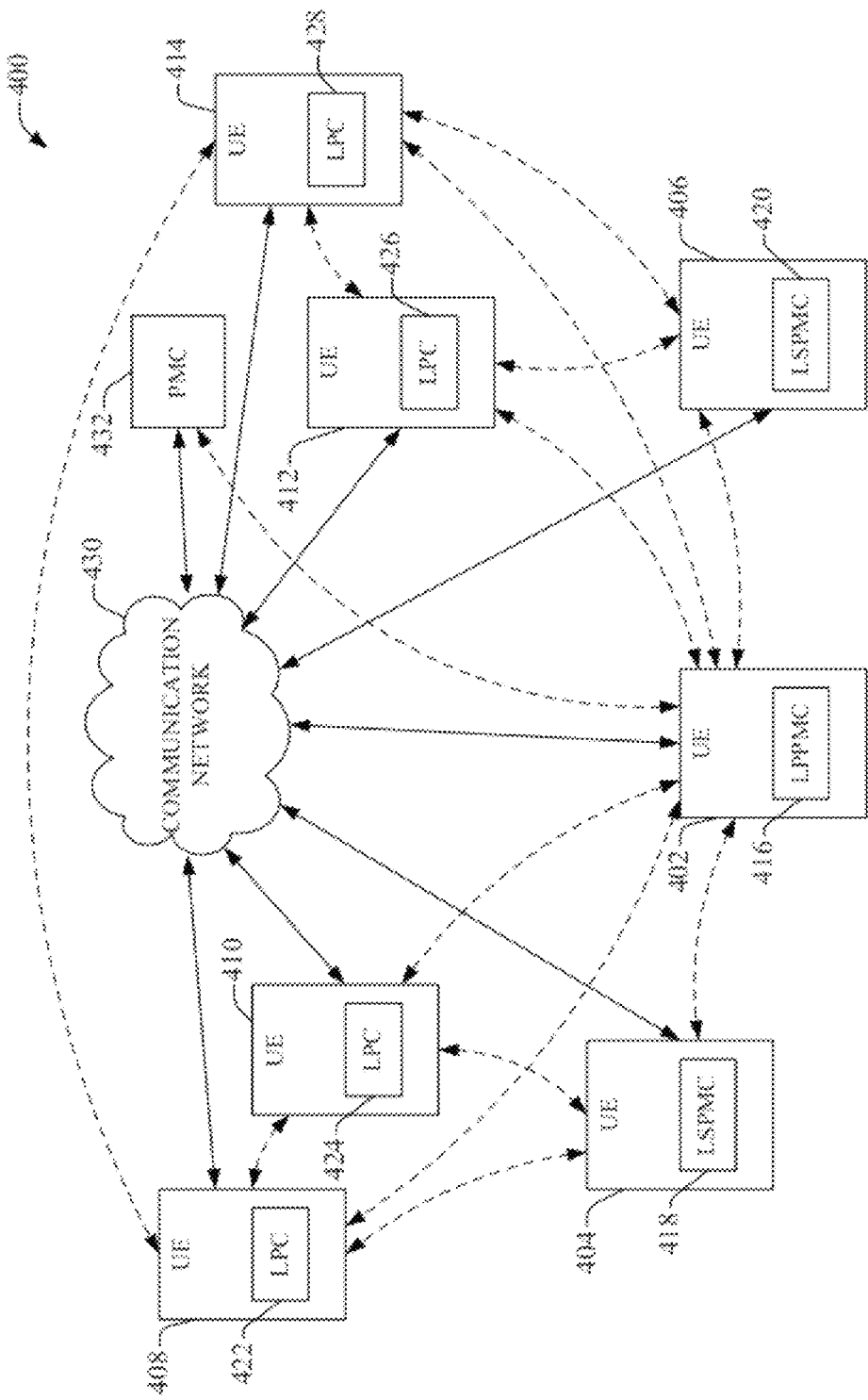
FIG. 4 depicts a block diagram of an example system that can facilitate interactive communication between communication devices to enhance communications relating to presentations in accordance with various aspects and embodiments of the disclosed subject matter.

Referring to FIG. 4, depicted is a block diagram of an example system 400 that can facilitate interactive communication between UEs to enhance communications relating to presentations (e.g., tour presentations, convention presentations, etc.) in accordance with various aspects and embodiments of the disclosed subject matter. In accordance with various aspects, the system 400 can comprise a desired number of UEs, such as UE 402, UE 404, UE 406, UE 408, UE 410, UE 412, and UE 414, which can be respectively associated with UE users that are members of a tour group. The UE 402 can be configured to be a controller UE for use by, for example, a tour guide, wherein the UE 402 can comprise a LPPMC 416 that can function as disclosed herein. UE 404 and UE 406 each can be sub-controller UEs for use by, for example, a first parent of a first family and a second parent of a second family, wherein the UEs 404 and 406 can respectively comprise LSPMC 418 and LSPMC 420 that can function as disclosed herein. UE 408, UE 410, UE 412, and UE 414 can be configured to be member or slave UEs for use by, for example, the respective children of the first family and the second family, wherein the respective UEs 408, 410, 412, and 414 can respectively contain LPC 422, LPC 424, LPC 426, and LPC 428, which can function as disclosed herein. UE 408 and UE 410 can be slave UEs to UE 404, and these UEs and associated family members of the first family can be a first sub-group, and UE 412 and UE 414 can be slave UEs to UE 406, and these UEs and associated family members of the second family can be a second sub-group, wherein all of these UEs can be controlled, at least in part, by the controller UE 402.

The UEs 402 through 414 can be respectively connected to a communication network 430 (e.g., via one or more APs, which are not shown in FIG. 4 for reasons of brevity and clarity) that can function as disclosed herein to facilitate communications between UEs and other UEs or other communication devices associated with the communication network 430. The system 400 also can include a PMC 432 that can function as disclosed herein to facilitate providing desirably enhanced interactive information presentations to the UE users that are participating in the interactive information presentations.

In accordance with various aspects, the UE users can use their respective UEs to interact with each other, for example, in relation to the information presentation. In FIG. 4, the dotted lines between the various UEs depict communication interactions between the UEs, wherein the communication paths between the UEs can be via the communication network 430. For instance, the controller UE 402 can be used to push or present information (e.g., presentation information, tour instructions, or other information from the PMC 432) to the sub-controller UEs 404 and/or 406 and the slave UEs 408, 410, 412, and/or 414. The sub-controller UE 404 can communicate with the slave UEs 408 and 410 in the first sub-group and can control, at least in part, communications by the slave UEs 408 and 410. Similarly, the sub-controller UE 406 can communicate with the slave UEs 412 and 414 in the second sub-group and can control, at least in part, communications by the slave UEs 412 and 414. The UEs 404, 406, 408, 410, 412, and 414 can communicate (e.g., transmit voice or data communications) with the controller UE 402, although the UE 402 can control, at least in part, reception of communications from UEs 404 through 414. For instance, when desired, the controller UE 402 can control communications from the UEs (e.g., UE 404, UE 408) in the group by allowing those UEs to send a raise hand indicator, a "slow down" indicator, or other type of desired communication to the controller UE 402, but not allowing other types of communications, which are not desired by the tour guide, to be received by the controller UE 402.

Also, the sub-controller UEs 404 and 406 can respectively control, at least in part, communications from their respective slave UEs (e.g., UE 408 and 410 of the first sub-group, and UEs 412 and 414 of the second sub-group) to the controller UE 402 (e.g., to facilitate controlling how often a child interrupts the tour guide). If a user of a slave UE, such as UE 408, of the first sub-group desires to communicate with another user of a slave UE, such UE 414, in the second sub-group, the respective sub-controllers 404 and 406 can control inter-group communications by those slave UEs to allow or not allow such inter-group communications, as desired by the respective users of the sub-controllers 404 and 406 (e.g., inter-group communications between slave UEs of different groups or sub-groups can be permission based and controlled by the respective sub-controllers associated with the slave UEs).

Figure 5:
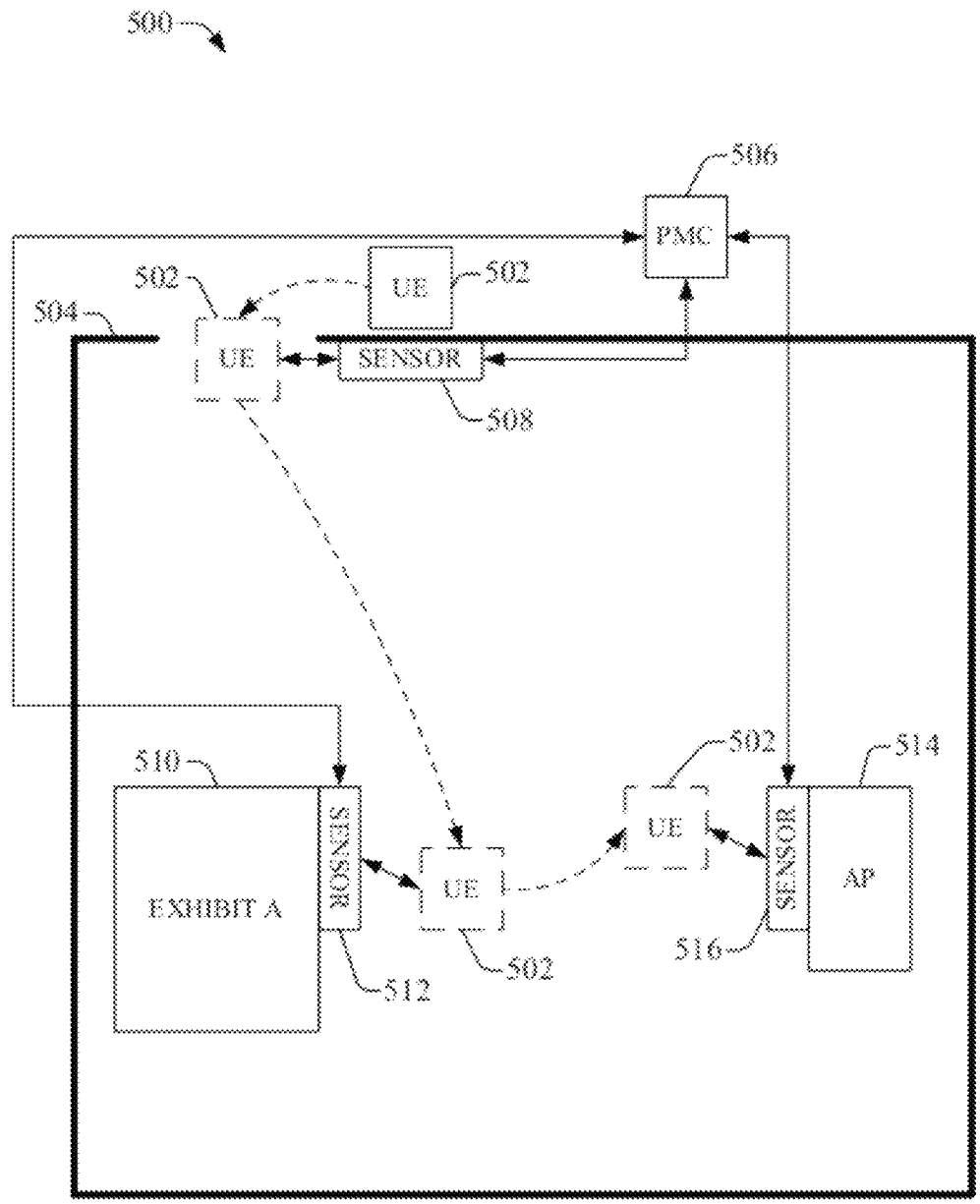
FIG. 5 illustrates a block diagram of an example system that can employ desired types of sensors to facilitate enhancing information presentations to user equipment (UE) users in accordance with various aspects and embodiments of the disclosed subject matter.

Referring to FIG. 5, depicted is a block diagram of an example system 500 that can employ desired types of sensors to facilitate enhancing information presentations (e.g., tour presentations, convention presentations, etc.) to UE users in accordance with various aspects and embodiments of the disclosed subject matter. In accordance with various aspects, a UE 502 can enter a desired physical area 504 (e.g., a room(s)) associated with an entity, such as a museum, an aquarium, or other entity that can have items on display, information presentations, or other desired points of interest. The system 500 also can include a PMC 506 that can facilitate providing UE users with an enhanced interactive information presentation, as disclosed herein.

In an aspect, the system 500 can include a sensor 508 (e.g., communication device sensor and/or movement sensor) that can be located at a desired position near or within the physical area 504, wherein the sensor can facilitate detecting and tracking UEs, such as UE 502, and/or associated users as they enter or leave the physical area 504. The sensor 508 can be associated with the PMC 506, wherein the PMC 506 can receive information relating to detection of UEs and/or associated users, and can track and maintain current counts of the number of UEs (e.g., UEs integrated with the PMC 506) and/or UE users to facilitate dynamically determining customized tour itineraries and tour routes, allocating system resources, or tracking popularity of respective exhibits, programs, lectures, etc. As the UE 502 and associated user enter the physical area 504, the sensor 508 can sense or detect the UE 502 and/or the associated user, and can communicate information regarding the detected UE 502 and/or the associated user to the PMC 506, which can utilize that information to identify the current amount of traffic flow in that physical area 506.

The physical area 504 can include a desired number of exhibits, such as Exhibit A 510, for example. The system 500 can comprise a sensor 512 that can be associated with and/or integrated with the Exhibit A 510, wherein the sensor 512 can sense or detect when a UE, such as UE 502, and associated user are in proximity to (e.g., within a predefined distance away from) the Exhibit A 510. The UE user and associated UE 502 can proceed to Exhibit A, and when they are in proximity to the sensor 512, the sensor 512 can detect the UE 502 and/or user, and can communicate information indicating detection of the UE 502 and/or user to the PMC 506. In response, the PMC 506 can automatically transmit (e.g., stream) an information presentation relating to Exhibit A 510 to the UE 502, or can automatically transmit a notification regarding that information presentation to the UE 502 to notify the user of the information presentation and ask whether the UE user desires to view and/or listen to the information presentation, wherein the user can use the UE 502 to communicate a message to the PMC 506 indicating that the user desires or does not desire to view or listen to the information presentation. In another aspect, the sensor 512 also can be used to facilitate identifying location of UEs, such as UE 502, with a desired fine level of granularity, wherein information relating to the detection or location of UEs can be sent from the sensor 512 to the PMC 506 for processing to identify respective locations of UEs. In an alternative embodiment, the Exhibit A 510 can have an information presentation locally stored with the Exhibit A 510, and the information presentation or notification of the information presentation can be automatically sent to the UE 502 when the sensor 512 detects the UE 502 in proximity to Exhibit A 510.

In still another aspect, the system 500 can include a desired number of APs, such as AP 514 (e.g., femto AP, pico AP, Wi-Fi AP), that can be employed to facilitate wireless communication by UEs connected thereto. In yet another aspect, the AP 514 can have integrated therein or associated therewith a sensor 516 that can be used to facilitate identifying location of UEs, such as UE 502, with a desired fine level of granularity, wherein information relating to the detection or location of UEs can be sent from the sensor 516 to the PMC 506 for processing to identify respective locations of UEs. When the UE 502 and associated user proceed through the physical area 504, the sensor 516 can detect the UE 502 when UE 502 is located within a predefined distance of the sensor 516. The sensor 516 can transmit detection or location information relating to UE 502 to the PMC 506 for further processing to facilitate identifying the location of the UE 502. In another aspect, as more than one sensor (e.g., 508, 512, 516) can or may sense the UE 502 at a given time, the PMC 506 can evaluate respective detection or location information from the sensors that sensed the UE 502 at that given time to facilitate identifying location of the UE 502 (e.g., a stronger detection signal of a first sensor relative to that of a second sensor can indicate that the UE 502 is closer to the first sensor).

Figure 6:
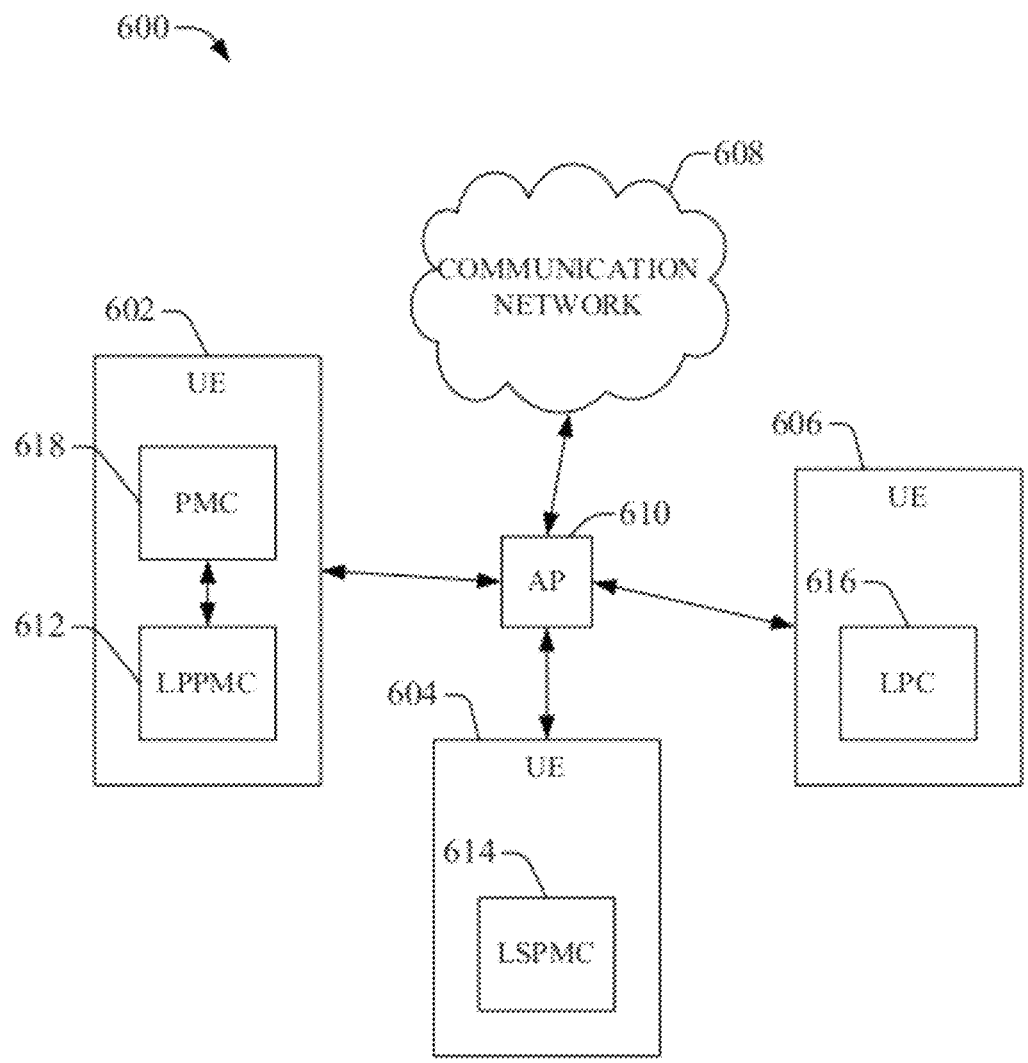
FIG. 6 depicts a block diagram of an example system that can enhance communications relating to information presentations in accordance with an embodiment.

Turning to FIG. 6, illustrated is a block diagram of an example system 600 that can enhance communications relating to information presentations (e.g., tour presentations, convention presentations, etc.) in accordance with an embodiment. The system 600 can include a desired number of UEs, such as UE 602, UE 604, and UE 606, that can be utilized to communicate with communication devices associated with the communication network 608 via AP 610. In another aspect, UE 602 can be configured to be a controller UE and can comprise a LPPMC 612 that can be employed to enable the UE 602 to perform the desired functions of the controller UE, as disclosed herein. In still another aspect, the UE 604 can be configured to be a sub-controller UE and can contain a LSPMC 614 that can be employed to enable the UE 604 to perform the desired functions of a sub-controller UE, as disclosed herein. In yet another aspect, the UE 606 can be configured to be a slave UE and can comprise a LPC 616 that can be employed to enable the UE 606 to perform the desired functions of the slave UE, as disclosed herein.

In accordance with an embodiment, the UE 602 also can comprise a PMC 618 that can include all or a desired portion of the functions disclosed herein with regard to a PMC to facilitate providing enhanced communications in relation to information presentations. Employing the PMC 618 within the controller UE 602 can facilitate enabling a tour guide using the PMC 618 to present a desired information presentation(s) to desired UEs, such as UE 604 and UE 606, in the tour group, customize information presentations using the UE 602, provision UEs, such as UE 604 and UE 606, to integrate them with the PMC 618, download desired applications (e.g., sub-controller application, slave application) to facilitate configuring UEs to operate interactively with the controller UE 602 to provide enhanced communications with regard to information presentations, etc.

In an embodiment, as desired, the system 600 can include a remote or an external PMC (not shown in FIG. 6; e.g., as shown in FIG. 1) that can comprise all or a desired portion of the functions disclosed herein with regard to a PMC, and can operate in conjunction with the PMC 618 to facilitate presentation of information presentations to the UEs (e.g., UE 604, UE 606).

FIG. 7 depicts a block diagram of an example PMC 700 that can facilitate providing interactive services to UEs in relation to information presentations in accordance with various aspects and embodiments of the disclosed subject matter. In an aspect, the PMC 700 can comprise a communicator component 702 that can be employed to facilitate communications (e.g., voice or data communications) between the PMC 700 and other communication devices, such as UEs associated with the PMC 700. The communicator component 702 can be associated with (e.g., connected to) a desired number of APs (e.g., femto AP, Wi-Fi AP) that can be distributed throughout a facility (e.g., museum, convention center, etc.) in which the PMC 700 is operating to facilitate wireless communications by UEs.

In another aspect, the PMC 700 can include a registration component 704 that can be used to register a UE with the PMC 700 and/or provision the UE. The registration component 704 can be employed to obtain information (e.g., name, address, UE identifier(s) (e.g., phone number(s)), billing information, etc.) regarding the UE user and associated UE that are registering with the PMC 700, and obtain and/or provide information regarding the registration of the persons with the service entity. The information relating to the registration of the UE and UE user can be stored in a data store 748 (e.g., user file) associated with the PMC 700.

In an aspect, the PMC 700 also can include an application component 706 that can comprise one or more applications (e.g., data processing applications, communications applications, registration applications, interactive services applications, security applications, etc.) that can be employed to facilitate operation of the PMC 700. The application component 706 also can include one or more applications, such as a controller-UE configuration application, sub-controller-UE configuration application and/or slave-UE configuration application, that can be provided (e.g., downloaded) to respective UEs to facilitate configuring the UEs to operate as a controller UE, sub-controller UE, or slave UE, such as disclosed herein.

In another aspect, the PMC 700 can comprise a user preferences component 708 that can provide a UE and associated UE user with available user preferences (e.g., via one or more menus of available user preferences relating to interactive services, information presentation options, interactive services options, etc.) or default user preferences to facilitate enabling the UE user to select (e.g., using the UE) desired user preferences in relation to the information presentation, interactive services, or other services that are available for use by the UE and associated UE user. The user preferences component 708 can facilitate storing the respective set of user preferences of a respective UE user in a respective user file of the UE user.

In another aspect, the PMC 700 can contain a portal component 710 that can employ one or more portal servers to facilitate maintaining and providing desired portal services (e.g., ticket reservation services; schedule services relating to exhibits, programs, lectures, etc.; gift shop information; etc.) associated with the entity (e.g., museum operator, convention center operator) to communication devices (e.g., UEs) associated with the PMC 700.

In still another aspect, the PMC 700 can include an interactive services component 712 that can provide or make available desired interactive services relating to information presentations to UEs associated with the PMC 700. The interactive services can include, for example, whiteboard services, communication control services (e.g., "slow down" option, "raise hand" option), services that can generate customized information presentations, services that can generate customized tour itineraries, broadcast intercom services, targeted advertisement or recommendation services, language translation services, clustering services, UE locator services, alert presentation services, add-on services, etc.

The PMC 700 can include a whiteboard component 714 that can operate in conjunction with the interactive services component 712 to provide whiteboards to respective groups of users, wherein the whiteboards can be used for posting comments or other information to be viewed or perceived by other users in the group associated with a particular whiteboard or other authorized users. The PMC 700 also can contain a communication control component 716 that can operate in conjunction with the interactive services component 712 to facilitate controlling communications in relation to an information presentation. For instance, the communication control component 716 can make communication options, such as a "slow down" option and "raise hand" option available to UE users via their UEs, to facilitate controlling communications, wherein the "slow down" option can be selected by a UE user using a UE to communicate a "slow down" indicator to the controller UE of the group to notify the leader (e.g., tour guide) of the group that the UE user desires the leader to slow down the tour and/or associated information presentation because the UE user has fallen behind the group or for another desired reason, and the "raise hand" option can be selected by the UE user using the UE to communication a "raise hand" indicator to the controller UE to notify the group leader that the UE user has a question or comment that the UE user desires to make to the group or the group leader.

In another aspect, the PMC 700 can contain a customizer component 718 that can operate in conjunction with the interactive services component 712 to generate customized tour itineraries or routes and customized information presentations for UE users based at least in part on user preferences, UE user time constraints, the respective status (e.g., current or future status) of respective exhibits, programs, lectures, etc., location of the UE user, or other desired factors. The PMC 700 also can employ a recommendation component 720 that can generate and provide one or more recommendations relating to the information presentation or UE user to the UE of the UE user, wherein the recommendations can be customized tour itineraries or routes, customized information presentations, location-based recommendations, gift ideas, advertisements (e.g., general advertisements, targeted advertisements), etc. The PMC 700 can further contain an advertisement platform 722 that can identify one or more advertisements to provide to one or more UEs, wherein the advertisement can be a general advertisement or a targeted advertisement, which can be identified based at least in part on current or historical information relating to the UE user (e.g., interactions or other observed activity of the UE or UE user while registered with the PMC 700), current location of the UE user, or other desired factors.

In still another aspect, the PMC 700 can comprise a translator component 724 that can facilitate generating and providing information (e.g., portions of an information presentation, portal services, advertisements, etc.) that has been pre-translated to one or more desired languages for presentation (e.g., textual presentation, audio presentation) to the UEs of UE users, and performing and providing real-time or near-real-time language translation of information (e.g., portions of an information presentation, comments or other information from a group leader or group member) to UEs of UE users. The translator component 724 can identify the language used in a communication and identify the desired language for a particular UE user, and if the language of the communication is different from the desired language, the translator component 724 can translate the communication to the desired language and present the translated communication to the UE of the UE user.

In yet another aspect, the PMC 700 can employ a cluster component 726 that can facilitate enabling UE users to use UEs to create, manage, and use clusters of group members. Information relating to the clusters can be stored in the user file of a UE user, and if changes to a cluster are made, the cluster component 726 can update the cluster information in the user file. The cluster component 726 also can utilize location information identifying respective locations of UEs, wherein the location information can be provided by a locator component 728 that can receive information from a GPS, location sensors, or location services to facilitate identifying the location of a UE at a given time.

In an aspect, the PMC 700 can contain an alert component 730 that can generate and present one or more types of alerts (e.g., visual alert indicator, audio alert indicator, vibrational alert indicator) to a UE in accordance with user preferences. The PMC 700 also can include a status component 732 that can monitor and identify a current or future (e.g., expected future) status of exhibits, programs, lectures, facility rooms, etc. associated with a facility operated by an entity. The status component 732 can obtain information from sensors, schedule information, ticket sales information, user-provided information, or other information to facilitate identifying a status of an exhibit, a program, a lecture, a facility room, etc.

The PMC 700 can further employ a policy component 734 that can utilize one or more policy servers to facilitate maintaining, updating, and enforcing desired policies relating to the operations of the PMC 700 and communication devices associated with the PMC 700. In another aspect, the PMC 700 can comprise a recorder component 736 that can record all or a desired portion of communications relating to an information presentation (e.g., portions of the information presentation, comments made by UE users in the group, pictures, video, whiteboard postings, etc.) to facilitate providing the recorded communications to a UE user when desired. The PMC 700 also can include an information provider component 738 that can generate and provide a copy of all or a desired portion of the recorded communications relating to a particular information presentation in a desired format (e.g., DVD, CD, downloadable file) to a UE user (e.g., for a specified cost).

In still another aspect, the PMC 700 can employ a billing component 740 that can comprise one or more billing servers that can track, update, and generate billings for products and services that are used, purchased, or received by persons, such as UE users in relation to an information presentation or other products or services provided by the entity. The billing component 740 can generate and provide a billing in a desired form (e.g., paper or electronic document) to the purchaser.

In yet another aspect, the PMC 700 can contain an aggregator component 742 that can aggregate information (e.g., scheduling information, UE location information, comments by group members, language to be translated, clustering information, user preferences, etc.) received by the PMC 700 and also can classify or categorize the information for further processing or evaluation. The PMC 700 also can utilize an evaluator component 744 that can analyze and evaluate information, for example, to facilitate identifying the location of a UE at a given time, generating a customized information presentation, tour itinerary or tour route, identifying a recommendation (e.g., advertisement), performing language translation, etc.

The PMC 700 also can comprise a processor component 746 that can work in conjunction with the other components (e.g., communicator component 702, registration component 704, application component 706, user preferences component 708, etc.) to facilitate performing the various functions of the PMC 700. The processor component 746 can employ one or more processors, microprocessors, or controllers that can process data, such as information relating to managing information presentations, managing communications between communication devices associated with the PMC 700, information relating to other operations of the PMC 700, and/or other information, etc., to facilitate operation of the PMC 700, as more fully disclosed herein, and control data flow between the PMC 700 and other components (e.g., UEs, other communication devices associated with the communication network, etc.) associated with the PMC 700.

The PMC 700 also can include a data store 748 that can store data structures (e.g., user data, metadata), code structure(s) (e.g., modules, objects, hashes, classes, procedures) or instructions, information relating to managing information presentations, managing communications between communication devices associated with the PMC 700, information relating to other operations of the PMC 700, etc., to facilitate controlling operations associated with the PMC 700. In an aspect, the processor component 746 can be functionally coupled (e.g., through a memory bus) to the data store 748 in order to store and retrieve information desired to operate and/or confer functionality, at least in part, to the components of the PMC 700 (e.g., communicator component 702, registration component 704, application component 706, user preferences component 708, etc.), and/or substantially any other operational aspects of the PMC 700.

Figure 8:
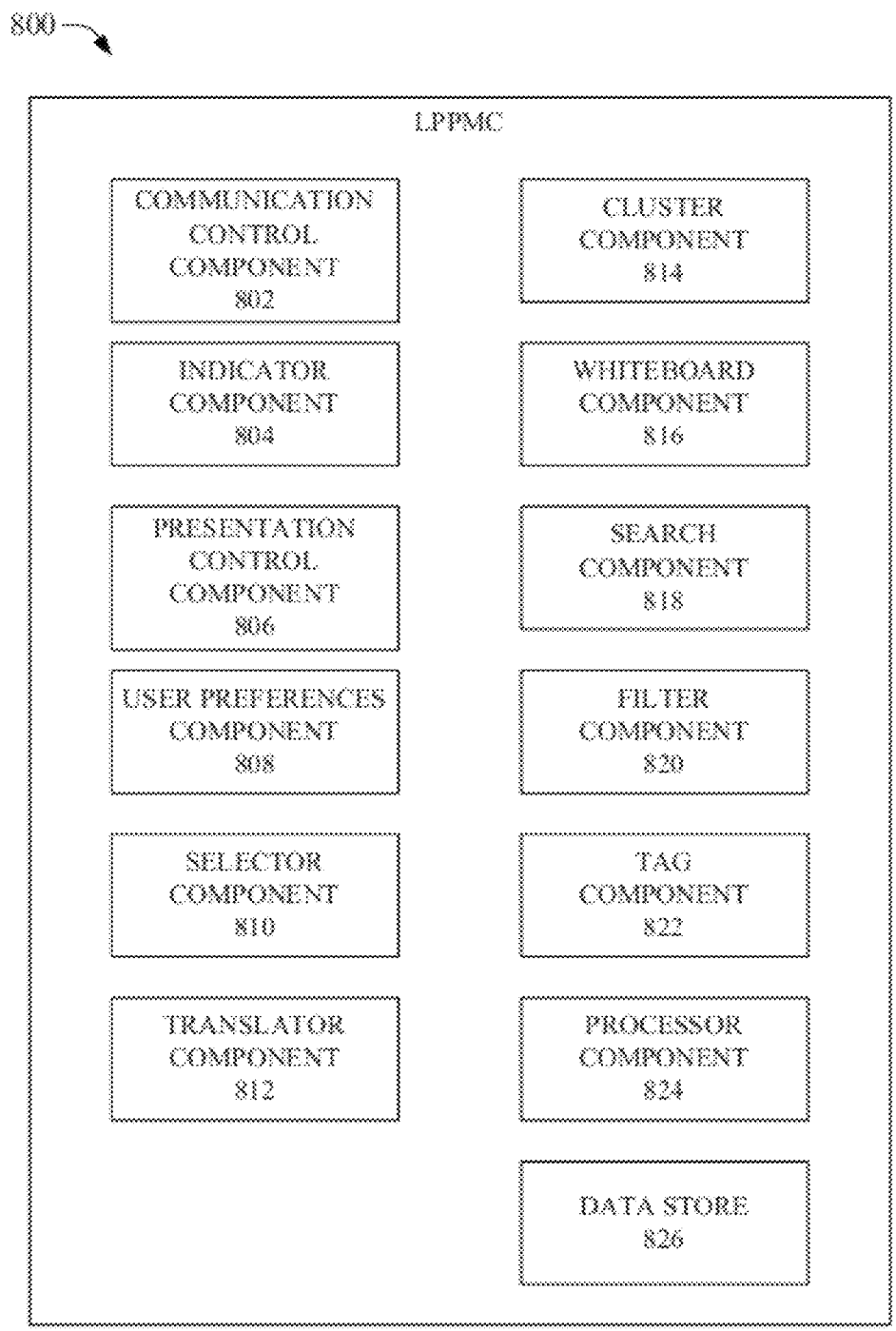
FIG. 8 depicts a block diagram of an example local primary presentation management component (LPPMC) in accordance with various aspects and embodiments of the disclosed subject matter.

FIG. 8 illustrates a block diagram of an example LPPMC 800 in accordance with various aspects and embodiments of the disclosed subject matter. The LPPMC 800 can be employed in a UE to enable the UE to be used as a controller UE in relation to a group of UEs associated with a group of UE users. In an aspect, the LPPMC 800 can comprise a communication control component 802 that can be employed to facilitate controlling communications (e.g., voice or data communications) between the UE associated with the LPPMC 800 and other communication devices, such as other UEs associated with the a PMC associated with an entity (e.g., museum operation, convention center operator, etc.). The communication control component 802 can control communications by UEs in the group, for example, to allow the controller UE to be the only UE that can broadcast communications to other UEs in the group for a given period of time (e.g., when the group leader is providing information to others in the group), to allow another UE in the group to broadcast communications to all or a desired portion of the group (e.g., in response to a "raise hand" indicator received from a UE in the group), or to override all other communications between UEs of group members (e.g., even uni-cast communications between group members) so that the leader can use the controller UE to make an announcement or facilitate presentation of other information to the UEs of group members.

The LPPMC 800 also can comprise an indicator component 804 that can receive one or more different types of indicators from other UEs, such as other UEs in the group. The indicators can comprise, for example, a "slow down" indicator that indicates that a group member desires the group leader to slow down the presentation or a "raise hand" indicator that can indicate that a UE user desires to make a comment to or ask a question of the group leader or others in the group.

In another aspect, the LPPMC 800 can include a presentation control component 806 that can be employed to control the presentation of information, such as information being presented by the PMC, to the controller UE and other UEs in the group. For instance, the presentation control component 806 can suspend or override presentation of an information presentation to UEs in the group for a desired period of time (e.g., in response to a received "slow down" indicator or a "raise hand" indicator).

In still another aspect, the LPPMC 800 can comprise a user preferences component 808 that can be employed to provide available user preferences to the UE user via the UE and receive selections of desired user preferences from the UE user via the UE to facilitate configuring the UE in accordance with the desired user preferences and/or providing desired user preferences to the PMC to facilitate providing the UE user with information in relation to the information presentation in accordance with the desired user preferences. The available user preferences can be displayed or presented to the UE user via one or more menus, for example.

The LPPMC 800 can include a selector component 810 that can enable the UE user to select desired user preferences, parameters, controls, etc., in response to received input information (e.g., from the UE user) to facilitate desired operation of the UE and a desirable interactive experience in relation to an information presentation. In another aspect, the LPPMC 800 can contain a translator component 812 that can facilitate generating and providing information (e.g., portions of an information presentation, portal services, advertisements, etc.) that has been pre-translated to one or more desired languages for presentation (e.g., textual presentation, audio presentation) to the UEs of UE users, and performing and providing real-time or near-real-time language translation of information (e.g., portions of an information presentation, comments or other information from a group leader or group member) to UEs of UE users. In one aspect, the translator component 812 can identify the language used in a communication and identify the desired language for a particular UE user, and if the language of the communication is different from the desired language, the translator component 812 can translate the communication to the desired language and present the translated communication to the UE of the UE user. Alternatively, or additionally, the translator component 812 can operate in conjunction with the PMC to facilitate language translation functions, wherein the PMC can perform all or a desired portion of the desired language translations.

In an aspect, the LPPMC 800 can include a cluster component 814 that can facilitate creation, modification, and accessing of one or more clusters, wherein a cluster can comprise an entire group of UEs and associated UE users, or a desired portion of UEs of a group (e.g., first cluster comprising a first sub-controller UE and member UEs of a first sub-group, a second cluster comprising a second sub-controller UE and member UEs of a second sub-group, etc.). The cluster component 814 can be used, for example, in conjunction with the selector component 810, to select a desired cluster to display the respective locations of respective UEs in the cluster on the display screen of the UE (e.g., on a map in relation to location of the controller UE).

In still another aspect, the LPPMC 800 can comprise a whiteboard component 816 that can enable the UE user to post comments or other information on the whiteboard to be viewed or perceived by other users in the group associated with that whiteboard or other authorized users. In yet another aspect, the LPPMC 800 can include a search component 818 that can be employed to enable the UE user to search for desired information. For example, the UE user can desire to find information on the whiteboard that was posted by the UE user and another UE user in the group, and the search component 818 can be employed to search for information that was posted on the whiteboard by the UE user and the other UE user. In another aspect, the LPPMC 800 can contain a filter component 820, which can operate in conjunction with the search component 818, and can filter information in accordance with one or more desired filters (e.g., based at least in part on search criteria) to facilitate providing a desired subset of information to the UE user. For example, the filter component 820 can filter information posted on the whiteboard to present only information posted by the UE user and the other UE user.

In another aspect, the LPPMC 800 can include a tag component 822 that can be used to tag information (e.g., on a whiteboard), and/or to associate tagged information with other tagged information, to facilitate identification and/or retrieval of tagged information. The search component 818 and/or filter component 820 can be employed to facilitate identifying, retrieving, and/or presenting the tagged information on the UE to the UE user.

The LPPMC 800 also can comprise a processor component 824 that can work in conjunction with the other components (e.g., communication control component 802, indicator component 804, presentation control component 806, user preferences component 808, etc.) to facilitate performing the various functions of the LPPMC 800. The processor component 824 can employ one or more processors, microprocessors, or controllers that can process data, such as information relating to managing information presentations, managing communications between communication devices associated with the LPPMC 800, information relating to other operations of the LPPMC 800, and/or other information, etc., to facilitate operation of the LPPMC 800, as more fully disclosed herein, and control data flow between the LPPMC 800 and other components (e.g., UEs, other communication devices associated with the communication network, etc.) associated with the LPPMC 800.

The LPPMC 800 also can include a data store 826 that can store data structures (e.g., user data, metadata), code structure(s) (e.g., modules, objects, hashes, classes, procedures) or instructions, information relating to managing information presentations, managing communications between communication devices associated with the LPPMC 800, information relating to other operations of the LPPMC 800, etc., to facilitate controlling operations associated with the LPPMC 800. In an aspect, the processor component 824 can be functionally coupled (e.g., through a memory bus) to the data store 826 in order to store and retrieve information desired to operate and/or confer functionality, at least in part, to the components of the LPPMC 800 (e.g., communication control component 802, indicator component 804, presentation control component 806, user preferences component 808, etc.), and/or substantially any other operational aspects of the LPPMC 800.

Figure 9:
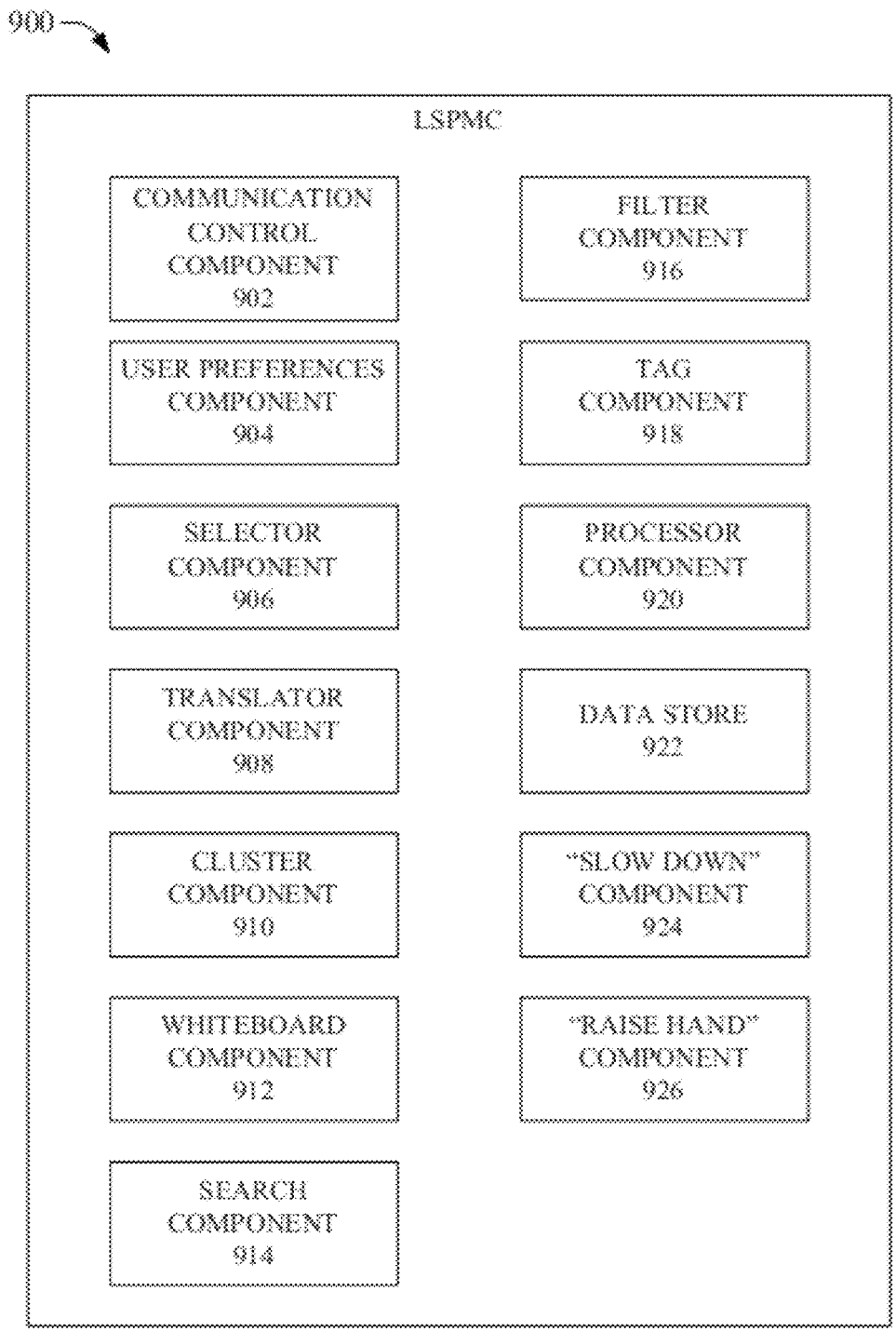
FIG. 9 illustrates a block diagram of an example local secondary presentation management component (LSPMC) in accordance with various aspects and embodiments of the disclosed subject matter.

FIG. 9 depicts a block diagram of an example LSPMC 900 in accordance with various aspects and embodiments of the disclosed subject matter. In accordance with various aspects, the LSPMC 900 can comprise a communication control component 902, a user preferences component 904, a selector component 906, a translator component 908, a cluster component 910, a whiteboard component 912, a search component 914, a filter component 916, a tag component 918, a processor component 920, and a data store 922, wherein these respective components can be the same or similar as, or can comprise all or at least some of the functionality as, respectively named components, such as, for example, the respectively named components disclosed herein with regard to the LPPMC 800. It is noted that, with regard to the communication control component 902, while the communication control component 902 can be employed by a sub-controller UE to facilitate controlling communications (e.g., intra-sub-group communications, inter-sub-group communications) by a subordinate UE, such as a slave UE, the communication control component 902 of the sub-controller UE cannot control the communications of a controller UE.

In another aspect, the LSPMC 900 also can include a "slow down" component 924 that can allow the UE user of the sub-controller UE to select a "slow down" option (e.g., using the selector component 906), and in response, the "slow down" component 924 can generate a "slow down" indicator that can be transmitted to the controller UE and/or PMC to facilitate slowing down or temporarily suspending the information presentation, wherein the controller UE and associated user and/or the PMC can take a desired action in response to the received "slow down" indicator (e.g., the tour guide using the controller UE can slow down or stop the rest of the group and/or can slow down or temporarily suspend the information presentation to allow the UE user that sent the "slow down" indicator to catch up and join the rest of the group; with regard to an individual tour, for example, the PMC can temporarily suspend the information presentation until the UE user sends a "resume" or "start" indicator (e.g., using the communication control component 902) to the PMC, wherein the UE user may desire to temporarily suspend an information presentation due to receiving a phone call or needing a break from the presentation for another desired reason).

In still another aspect, the LSPMC 900 can contain a "raise hand" component 926 that can allow the UE user of the sub-controller UE to select a "raise hand" option (e.g., using the selector component 906), for example, when the UE user has a question or comment, and in response, the "raise hand" component 926 can generate a "raise hand" indicator that can be transmitted to the controller UE and/or PMC to facilitate notifying the controller UE and associated user (e.g., tour guide) and/or PMC (and a representative (e.g., a customer support specialist) associated with the entity) that the UE user has a question or comment. In response, the user of the controller UE or a representative associated with the PMC, using the controller UE or PMC, can send an indicator to the UE of the UE user to notify the UE user that the UE is enabled to communicate (e.g., via broadcast intercom communication or uni-cast communication) with the controller UE, PMC, or other UEs associated with the group, and the UE user can use the sub-controller UE to send the desired communication (e.g., question, comment, etc.).

Figure 10:
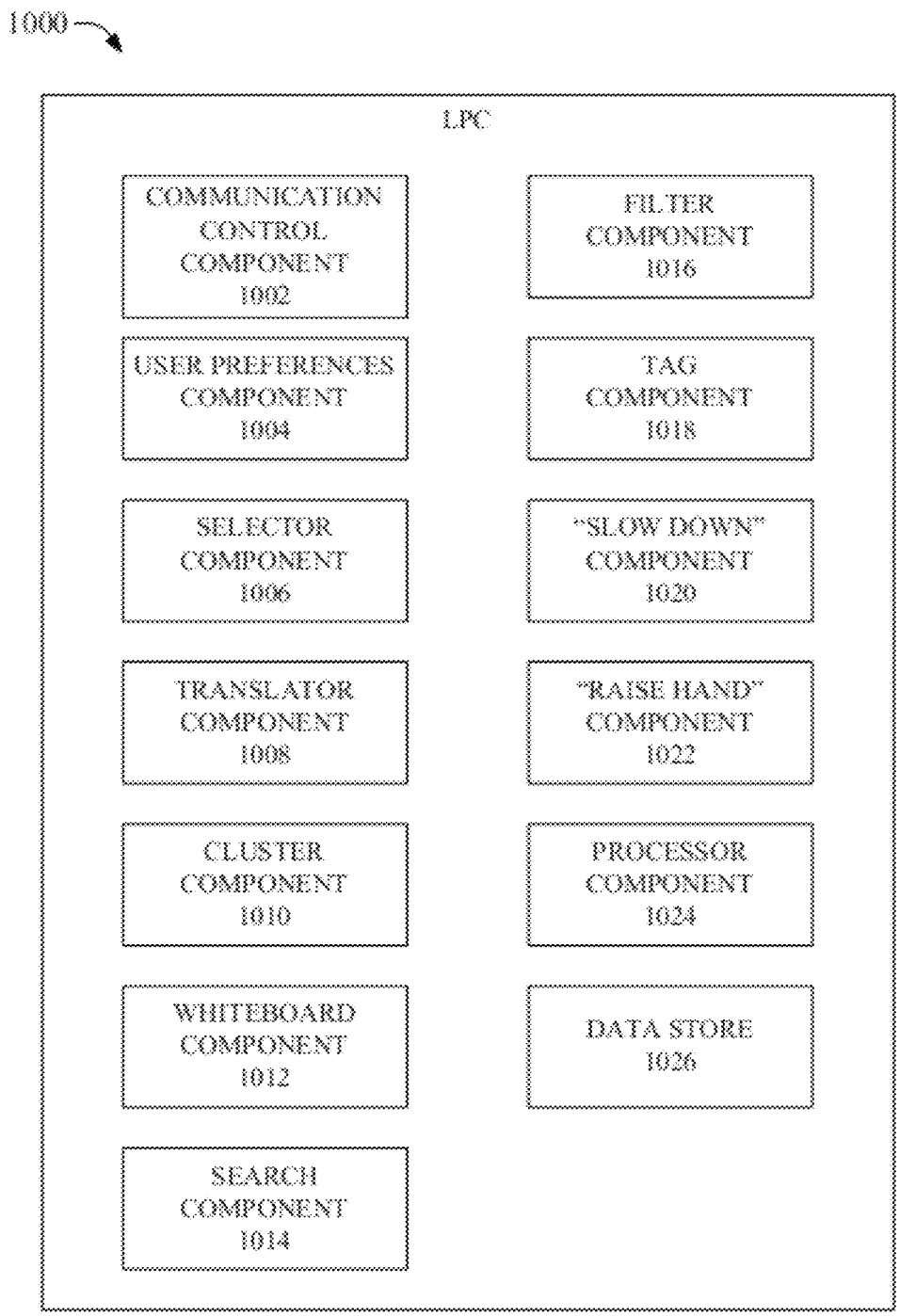
FIG. 10 depicts a block diagram of an example local presentation component (LPC) in accordance with various aspects and embodiments of the disclosed subject matter.

FIG. 10 illustrates a block diagram of an example LPC 1000 in accordance with various aspects and embodiments of the disclosed subject matter. In accordance with various aspects, the LPC 1000 can comprise a communication control component 1002, a user preferences component 1004, a selector component 1006, a translator component 1008, a cluster component 1010, a whiteboard component 1012, a search component 1014, a filter component 1016, a tag component 1018, a "slow down" component 1020, a "raise hand" component 1022, a processor component 1024, and a data store 1026, wherein these respective components can be the same or similar as, or can comprise all or at least some of the functionality as, respectively named components, such as, for example, the respectively named components disclosed herein with regard to the LPPMC 800 and the LSPMC 900. It is noted that, with regard to the communication control component 1002, while the communication control component 1002 can be employed by a slave UE to facilitate controlling communications (e.g., intra-sub-group communications,) by the slave UE vis-à-vis other slave UEs in the sub-group, the communication control component 1002 of the slave UE cannot control the communications of a controller UE or sub-controller UE.

In accordance with an embodiment of the disclosed subject matter, a design platform (not shown), for example, comprising an application programming interface(s) (API) (not shown), can be employed to enable application developers to develop additional add-on features or services for each of the vertical market offerings. For instance, a third party developer can utilize an API to interact with one or more of the disclosed systems to create additional applications or services (e.g., relating to interactive information presentations) that can be utilized in conjunction with one or more of the disclosed systems, which can thereby further enhance usability and desirability of the systems disclosed herein.

In accordance with another embodiment of the disclosed subject matter, one or more components (e.g., UE, PMC, LPPMC, LSPMC, LPC, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); a current or future state of conditions relating to an exhibit, program, lecture, area (e.g., room) of a facility, etc., associated with an information presentation; a language translation of a word or phrase; a recognition of a spoken word or phrase during a voice-to-text translation of the word or phrase; identifying a current location or an expected future location of a UE; a recommendation or a targeted advertisement that is or may be of interest to a UE user; a customized tour itinerary, a customized tour route; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

FIG. 11 depicts a block diagram of an example UE 1100 in accordance with various aspects and embodiments of the disclosed subject matter. In an aspect, the UE 1100 can be a multimode access terminal, wherein a set of antennas $1169_1$-$1169_Q$ (Q is a positive integer) can receive and transmit signal(s) from and to wireless devices like access points, access terminals, wireless ports and routers, and so forth, that operate in a radio access network. It should be appreciated that antennas $1169_1$-$1169_Q$ are a part of communication platform 1102, which comprises electronic components and associated circuitry that provide for processing and manipulation of received signal(s) and signal(s) to be transmitted; e.g., receivers and transmitters 1104, multiplexer/demultiplexer (mux/demux) component 1106, and modulation/demodulation (mod/demod) component 1108.

In another aspect, the UE 1100 can include a multimode operation chipset(s) 1110 that can allow the UE 1100 to operate in multiple communication modes in accordance with disparate technical specification for wireless technologies. In an aspect, multimode operation chipset(s) 1110 can utilize communication platform 1102 in accordance with a specific mode of operation (e.g., voice, GPS, etc.). In another aspect, multimode operation chipset(s) 1110 can be scheduled to operate concurrently (e.g., when Q>1) in various modes or within a multitask paradigm.

In still another aspect, the UE 1100 can comprise a presentation control component (PCC) 1112 (e.g., LPPMC, LSPMC, LPC) that can facilitate controlling presentation of information relating to an information presentation to the UE user and communications with other communication devices, as more fully described herein. In accordance with various embodiments, the PCC 1112 can facilitate using the UE 1100 as a controller UE (e.g., master UE), a sub-controller UE (e.g., sub-master UE), or a member UE (e.g., slave UE), as more fully described herein.

The UE 1100 can contain an interface component 1114 that can comprise one or more interfaces (e.g., display screens, touch screens, buttons, controls, switches, adapters, connectors, speakers, etc.) that can be utilized to facilitate presentation of information to a UE user or receiving data input from a UE user. In an aspect, the interface component 1114 can present information presentations, voice communications, data communications (e.g., messages, pictures, video, audio, etc.), indicators (e.g., "slow down" indicator, "raise hand" indicator, etc.), notifications, etc. For example, the interface component 1114 can operate in conjunction with the PCC 1112 to facilitate presentation of buttons, controls, or menus to facilitate selecting or setting desired user preferences (e.g., user preference parameters), communication options or controls, search criteria, filters, etc. In an aspect, the interface component 1114 can receive input, via manipulation of buttons, controls, or menus by the UE user to facilitate selecting or setting desired user preferences (e.g., user preference parameters), communication options or controls, search criteria, filters, etc., and the UE 1100 can be configured and/or can operate in accordance with the such received input and/or information relating to such received input can be communicated to the PCC 1112 or other desired component in the UE 1100 or to other communication devices (e.g., another UE, PMC) associated with the communication network.

In still another aspect, the UE 1100 also can include a processor(s) 1116 that can be configured to confer functionality, at least in part, to substantially any electronic component within the UE 1100, in accordance with aspects of the disclosed subject matter. For example, the processor(s) 1116 can facilitate enabling the UE 1100 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 1116 can facilitate enabling the UE 1100 to process data relating to messaging, voice calls, or other services (e.g., Internet services or access, interactive services relating to an information presentation, etc.). In accordance with other examples, the processor(s) 1116 can facilitate using the UE 1100 as a controller UE, sub-controller UE, or member UE.

The UE 1100 also can contain a data store 1118 that can store data structures (e.g., user data, metadata); code structure(s) (e.g., modules, objects, classes, procedures) or instructions; message hashes; neighbor cell list; one or more lists (e.g., whitelist, etc.); information relating to configuring the UE 1100 as a controller UE, sub-controller UE, or member UE; information relating to interactive services relating to an information presentation; UE identifier; voice calls, messaging, or other services associated with the UE 1100; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 1116 can be functionally coupled (e.g., through a memory bus) to the data store 1118 in order to store and retrieve information (e.g., neighbor cell list; information relating to messaging, voice calls, or other services (e.g., interactive services); frequency offsets; desired algorithms; security code; UE identifier; etc.) desired to operate and/or confer functionality, at least in part, to communication platform 1102, multimode operation chipset(s) 1110, PCC 1112, interface component 1114, and/or substantially any other operational aspects of the UE 1100.

In an embodiment, a pair of earphones 1120 optionally can be provided for use with the UE 1100. The earphones 1120 can be connected to the UE 1100 via a wired communication connection, wherein the cord of the earphones 1120 can be connected or plugged into a communication port (not shown) on the UE 1100, or a wireless communication connection (e.g., Bluetooth connection). The earphones can be utilized by the UE user to allow the user to hear a tour guide or other audio information being provided to the UE 1100 as part of the information presentation, while also being able to view the display screen on the UE 1100 so that the user can view other information (e.g., video, pictures, textual information) being provided to the UE user as part of the information presentation.

Figure 12:
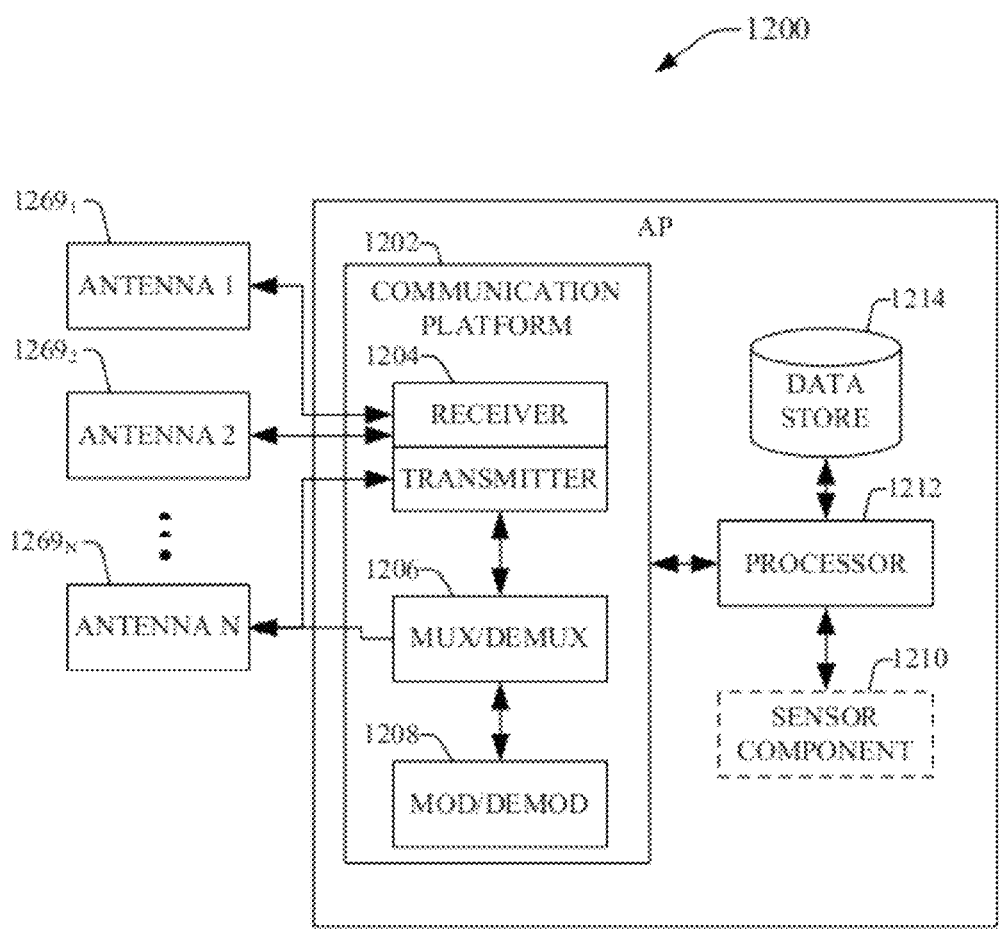
FIG. 12 illustrates a block diagram of an example access point (AP) in accordance with various aspects of the disclosed subject matter.

FIG. 12 illustrates a block diagram of an example AP 1200 (e.g., femto AP, pico AP, Wi-Fi AP, Wi-Fi-direct AP, macro base station, etc.) in accordance with an aspect of the disclosed subject matter. The AP 1200 can receive and transmit signal(s) from and to wireless devices like access points (e.g., femtocells, picocells, base stations, etc.), access terminals (e.g., UEs), wireless ports and routers, and the like, through a set of antennas $1269_1$-$1269_N$. In an aspect, the antennas $1269_1$-$1269_N$ are a part of a communication platform 1202, which comprises electronic components and associated circuitry that can provide for processing and manipulation of received signal(s) and signal(s) to be transmitted. In an aspect, the communication platform 1202 can include a receiver/transmitter 1204 that can convert signal from analog to digital upon reception, and from digital to analog upon transmission. In addition, receiver/transmitter 1204 can divide a single data stream into multiple, parallel data streams, or perform the reciprocal operation.

In an aspect, coupled to receiver/transmitter 1204 can be a multiplexer/demultiplexer (mux/demux) 1206 that can facilitate manipulation of signal in time and frequency space. The mux/demux 1206 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1206 can scramble and spread information (e.g., codes) according to substantially any code known in the art, e.g., Hadamard-Walsh codes, Baker codes, Kasami codes, polyphase codes, and so on. A modulator/demodulator (mod/demod) 1208 also can be part of the communication platform 1202, and can modulate information according to multiple modulation techniques, such as frequency modulation, amplitude modulation (e.g., M-ary quadrature amplitude modulation (QAM), with M a positive integer), phase-shift keying (PSK), and the like.

In an embodiment, the AP 1200 optionally can include a sensor component 1210 (e.g., integrated or otherwise associated with the AP 1200), comprising one or more sensors, wherein, the sensors can include one or more types of sensors that can sense or detect a UE when the UE is in proximity to (e.g., within a predefined distance of) the sensor component 1210 to facilitate identifying the location of the UE or enabling the UE and associated user to interact with an exhibit in proximity to the sensor, and/or can track UE or UE user traffic associated with a physical area to facilitate generation of information presentation itineraries or tracking of popularity of exhibits, programs, points of interest, etc.

The AP 1200 also can comprise a processor(s) 1212 that can be configured to confer and/or facilitate providing functionality, at least partially, to substantially any electronic component in or associated with the AP 1200. For instance, the processor(s) 1212 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 1212 also can facilitate other operations on data, for example, to sense or detect UEs or to facilitate managing or maintaining a white list that includes information, such as communication device identifiers associated with communication devices that can connect to the AP 1200 to communicate voice or data, etc.

In another aspect, the AP 1200 can include a data store 1214 that can store data structures; code instructions; rate coding information; information relating to measurement of radio link quality or reception of information related thereto; information relating to establishing a communications connection between a communication device (e.g., UE) and other communication devices, information relating to sensing or detecting UEs, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1212 can be coupled to the data store 1214 in order to store and retrieve information (e.g., information, such as algorithms, relating to multiplexing/demultiplexing or modulation/demodulation, information relating to radio link levels, information relating to establishing communication connections associated with a UE(s) served by the AP 1200, information relating to the white list, etc.) desired to operate and/or confer functionality to the communication platform 1202, the optional sensor component 1210, and/or other operational components of AP 1200.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methodologies that can be implemented in accordance with the disclosed subject matter can be better appreciated with reference to flowcharts in FIGS. 13-24. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 13:
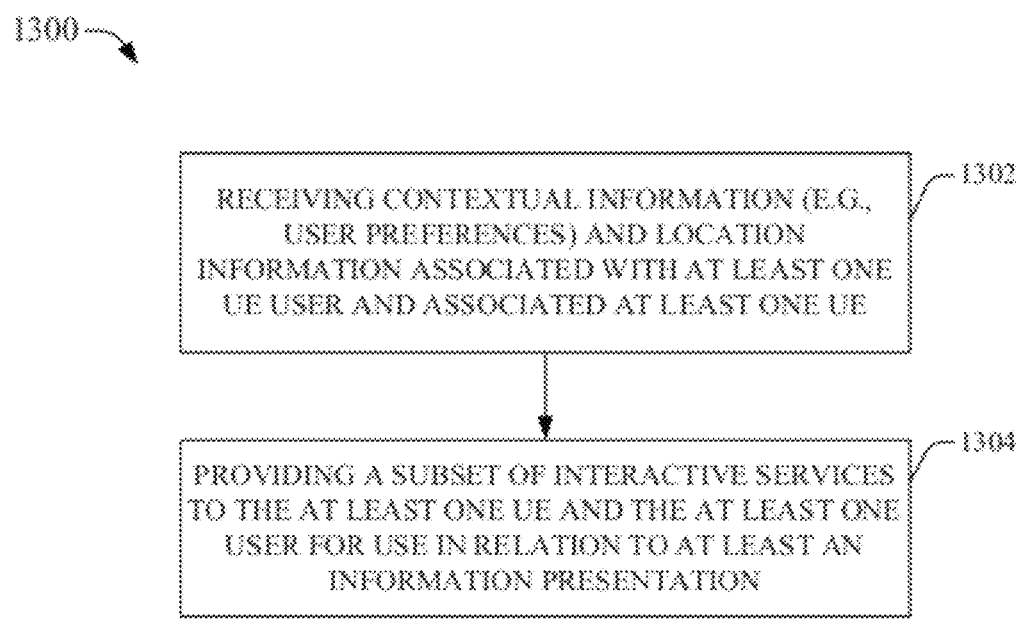
FIG. 13 illustrates a flowchart of an example method that can provide interactive services relating to an information presentation to a UE and associated user in accordance with various aspects and embodiments of the disclosed subject matter.

FIG. 13 presents a flowchart of an example method 1300 that can provide interactive services relating to an information presentation to a UE and associated user in accordance with various aspects and embodiments of the disclosed subject matter. At 1302, contextual information (e.g., user preferences) and location information associated with at least one UE user and associated at least one UE can be received. For instance, a UE user can provide one or more user preferences to a PMC (e.g., using the user's UE) in relation to an information presentation (e.g., tour presentation) in which the UE user is participating. The user preferences can be or relate to the time constraints of the user in participating in the information presentation, the topics, exhibits, programs, lectures, etc., the UE user desires to experience (e.g., see, hear) during the information presentation, other information that can facilitate identifying a desired tour route and information presentation itinerary (e.g., customized information presentation itinerary recommendation and tour route recommendation) for the information presentation, desired clustering of UE users and associated UEs (e.g., when the UE user is part of a group), desired display of clusters on the display screen of the UE, permitted interactions between UEs associated with the group (e.g., UE of first sub-group can communicate with UE of a second sub-group, UE of first sub-group is not permitted to communicate with UE of a second sub-group), desired interactions with a whiteboard associated with the information presentation, desired note taking features, desired advertisement controls (e.g., allow pop-up recommendations or advertisements, do not allow pop-up recommendations or advertisements, allow specified types of pop-up recommendations or advertisements, etc.), desired alert services, type of UE, resources and features available on the UE, etc.

At 1304, a subset of interactive services can be provided to the at least one UE and the at least one user for use in relation to at least an information presentation. In an aspect, the PMC and/or controller UE can generate and provide a subset of interactive services to the at least one UE to make such interactive services available to the at least one UE user. The interactive services can comprise, for example, a desired tour route, instructions, and information presentation itinerary relating to the information presentation based at least in part on the contextual location and current location of the at least one UE user, whiteboard access to provide comments and notes regarding aspects (e.g., topics, exhibits, programs, etc.) of the information presentation, broadcast intercom service, uni-cast communication service, dynamic pop-up recommendations, etc. If the UE user is the only UE user in the group (e.g., individual tour), the subset of interactive services can be customized (e.g., tailored) based at least in part on the contextual information (e.g., user preferences) associated with the UE user and availability of resources relating to the information presentation (e.g., availability of exhibits, programs, lectures, etc.).

If the UE user is part of a group, certain of the subset of interactive services can be customized based at least in part on the contextual information associated with the UE user and availability of resources relating to the information presentation, and other of the subset of interactive services can be identified and provided based at least in part on the collective contextual information associated with the UE users in the group and availability of resources relating to the information presentation. For instance, the sending of pop-up recommendations to a UE can be respectively customized for respective UE users in a group based at least in part on respective user preferences relating to the sending of pop-up recommendations. The tour route, information presentation itinerary, and instructions can be identified or determined based at least in part on the collective contextual information of the group, the location of the UEs in the group (e.g., controller UE), and availability of resources relating to the information presentation.

Figure 14:
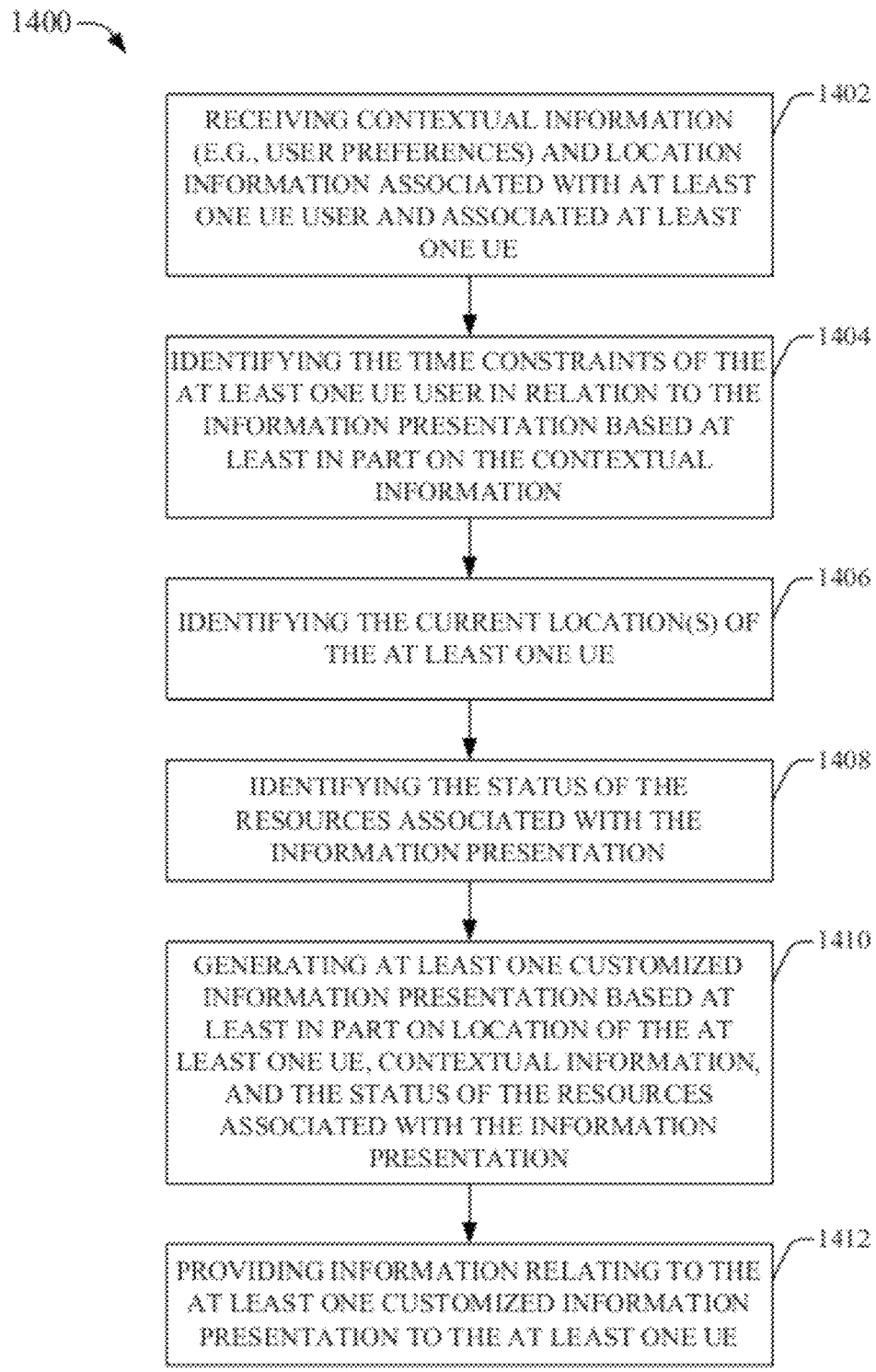
FIG. 14 depicts a flowchart of an example method that can generate a customized information presentation in accordance with various aspects and embodiments of the disclosed subject matter.

FIG. 14 presents a diagram of a flowchart of an example method 1400 that can generate a customized information presentation in accordance with various aspects and embodiments of the disclosed subject matter. At 1402, contextual information (e.g., user preferences) and location information associated with at least one UE user and associated at least one UE can be received. For instance, one or more UE users (e.g., group of UE users comprising one or more users) can respectively provide one or more user preferences to a PMC (e.g., using the user's UE) in relation to an information presentation (e.g., tour presentation) in which the one or more UE users are participating. The user preferences can be or relate to the time constraints of the user(s) in participating in the information presentation, the topics, exhibits, programs, lectures, etc., the UE user(s) desires to experience (e.g., see, hear) during the information presentation, other information that can facilitate identifying a desired tour route and information presentation itinerary (e.g., customized information presentation itinerary recommendation and tour route recommendation) for the information presentation, desired clustering of UE users and associated UEs (e.g., when the UE user is part of a group), desired display of clusters on the display screen of a particular UE, permitted interactions between UEs associated with the group, desired interactions with a whiteboard associated with the information presentation, desired note taking features, desired advertisement controls (e.g., allow pop-up recommendations or advertisements, do not allow pop-up recommendations or advertisements, allow specified types of pop-up recommendations or advertisements, etc.), desired alert services, type of UE of a particular UE, resources and features available on the particular UE, etc.

At 1404, the time constraints of the at least one UE user in relation to the information presentation can be identified based at least in part on the contextual information. For instance, the at least one UE user can provide, to the PMC, the time window or amount of time that that the at least one UE user has to participate in the information presentation. The PMC can identify the time constraints (e.g., length of time or time window available for the information presentation) for the at least one UE user.

At 1406, the current location(s) of the at least one UE can be identified. In an aspect, the PMC can identify the respective current location(s) of one or more UEs of a group based at least in part on location information, such as, for example, GPS information or information obtained from one or more sensors associated with the PMC.

At 1408, the status (e.g., current state, expected state in the future during the time period of the information presentation) of the resources associated with the information presentation can be identified, based at least in part on the time period for the information presentation. The PMC can obtain and analyze information relating to the status of the resources (e.g., exhibits, programs, lectures, other presentations) associated with the information presentation. The status information can relate to the time a particular resource is available or is being presented, the number of persons currently utilizing or experiencing the resource or the number of persons expecting to be utilizing or experiencing the resource at a given time (e.g., based at least in part on current or historical information), the maximum number of persons that can utilize or experience the resource at a given time, time schedule of respective exhibits, programs, lectures or other presentations, etc.

At 1410, at least one customized information presentation can be generated based at least in part on location of the at least one UE (e.g., mobile communication device), contextual information (e.g., user preferences) associated with the at least one user of the at least one UE, and the status of the resources associated with the information presentation. If there is only one UE user in the group (e.g., individual tour), a customized information presentation can be identified and generated for that UE user. If there is more than one UE user in the group, and the UE users in the group have specified that they desire to experience the same information presentation and have the same tour route and itinerary, a customized information presentation can be identified and generated for that group of UE users, based at least in part on the collective contextual information of the group of UE users. If there is more than one UE user in the group, and the UE users in the group have specified that they desire to split the information presentation, the tour route, and itinerary, so that the group members can divide up to cover respective portions of the information presentation, the tour route, and itinerary, a desired number of customized information presentations can be identified and generated for that group of UE users, based at least in part on the collective contextual information of the group of UE users, wherein each of the customized information presentations can cover a respective portion of the entire information presentation that is desired to be covered by the group of UE users.

At 1412, information relating to the at least one customized information presentation can be provided to the at least one UE. The information can include a desired tour route, tour instructions, information presentation itinerary (e.g., program or lecture schedules, time(s) to view or experience a particular exhibit, etc.), portions of information presentations (e.g., streamed video and audio relating to a particular topic), pop-up recommendations or advertisements, etc. As desired, the PMC and/or controller UE can push at least a portion of the information to the UE(s) in the group. If there is more than one UE user in the group, and the UE users are dividing the information presentation into different parts, the PMC can send respective portions of the information relating to the customized information presentation to the respective UEs in the group, although, as desired, the UE users of a group can have information relating to the tour route, instructions, and information presentations for the other members of the group.

Figure 15:
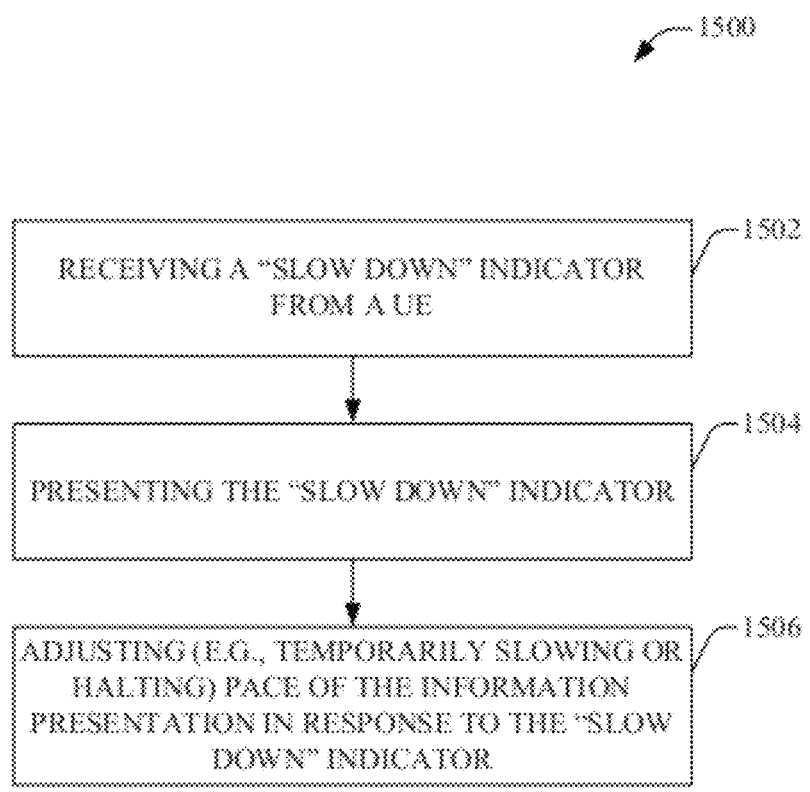
FIG. 15 illustrates a flowchart of an example method that can employ a "slow down" option to facilitate controlling the pace of an information presentation to maintain group continuity in accordance with various aspects and embodiments of the disclosed subject matter.

FIG. 15 presents a diagram of a flowchart of an example method 1500 that can employ a "slow down" option to facilitate controlling the pace of an information presentation to maintain group continuity in accordance with various aspects and embodiments of the disclosed subject matter. At 1502, a "slow down" indicator can be received, for example, from a UE in the group. When a group of UE users are taking part in an information presentation (e.g., tour), for various reasons, one or more UE users can fall behind the other members of the group. A UE user that falls behind the group can use the UE to select a "slow down" option to generate a "slow down" indicator that can be transmitted from the UE to the controller UE, which can be operated by the head (e.g., tour guide) of the group. The controller UE can receive the "slow down" indicator from the UE of the UE associated with the UE user that has fallen behind the group. Other information, such as a UE identifier that can identify the UE that sent the "slow down" indicator, can be transmitted with the "slow down" indicator.

At 1504, the "slow down" indicator can be presented. In an aspect, the UE indicator or information relating thereto can be presented (e.g., via visual and/or audio presentation) via the controller UE to the head of the group. At 1506, as desired, the pace of the information presentation can be adjusted (e.g., temporarily slowed down or halted) in response to the "slow down" indicator. For instance, as desired, the head of the group, using the controller UE and/or PMC, can temporarily pause or slow down the procession of the group through the information presentation and/or temporarily pause or slow down the information presentation (e.g., temporarily pause the streaming of information to the UEs in the group) to allow the UE user that sent the "slow down" indicator to catch up to the rest of the group. As desired, the head of the group also can use the controller UE to notify everyone in the group that the information presentation is being temporarily paused to allow those that have fallen behind the group to catch up to the group, and/or take other desired action, in response to the "slow down" indicator.

Figure 16:
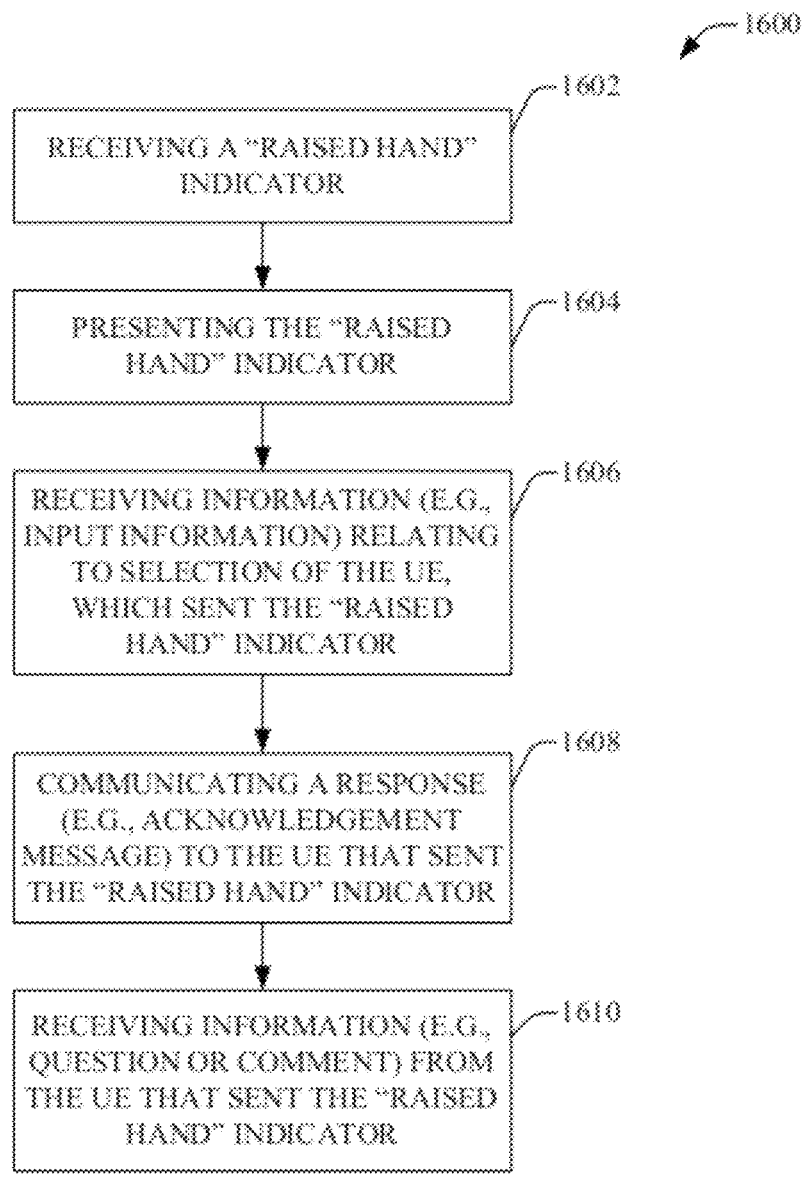
FIG. 16 depicts a flowchart of an example method that can employ a "raise hand" option to facilitate exchange of information during an information presentation in accordance with various aspects and embodiments of the disclosed subject matter.

FIG. 16 illustrates a flowchart of another example method 1600 that can employ a "raise hand" option to facilitate exchange of information during an information presentation in accordance with various aspects and embodiments of the disclosed subject matter. At 1602, a "raise hand" indicator can be received from a UE in the group. In an aspect, when a member of a group desires to ask a question of or make a comment to the leader (e.g., tour guide) or other member of the group, the member can select a "raise hand" option, by selecting a specified button on the UE (e.g., UE interface), to send a "raise hand" indicator to the desired UE (e.g., controller UE or UE of another member). For example, the member of the group can desire to ask the group leader a question or can desire to ask a question of a member of a sub-group (e.g., family) of the group a question.

At 1604, the "raise hand" indicator can be presented. In an aspect, the UE (e.g., controller UE, sub-controller UE, slave UE) that receives the "raise hand" indicator can present the "raise hand" indicator and/or associated information (e.g., the question or comment, or other information relating to the question or comment) to the UE user (e.g., group leader, group member) associated with that UE. At 1606, information (e.g., input information) relating to selection of the UE, which sent the "raise hand" indicator, can be received. For instance, the UE user, who is associated with the UE that received the "raise hand" indicator, can input information to the UE associated with that UE user to facilitate selecting the UE that sent the "raise hand" indicator (e.g., select an icon representative of the UE, which sent the "raise hand" indicator, on a UE display) to facilitate responding to the "raise hand" indicator.

At 1608, a response can be communicated to the UE that sent the "raise hand" indicator. For instance, the UE (e.g., controller UE), which received the "raise hand" indicator, can transmit a response (e.g., acknowledgement message), which acknowledges the "raise hand" indicator and/or requests more information regarding the reason for sending the "raise hand" indicator, to the UE that sent the "raise hand" indicator and/or other desired UEs in the group. At 1610, information, such as the question or comment, can be received from the UE that sent the "raise hand" indicator. For instance, the UE user, who sent the "raise hand" indicator, can use the user's UE to transmit the question or comment and/or other desired information to the desired UE (e.g., controller UE or UE of another group member), and the desired UE can receive the question, comment, and/or other desired information.

Figure 17:
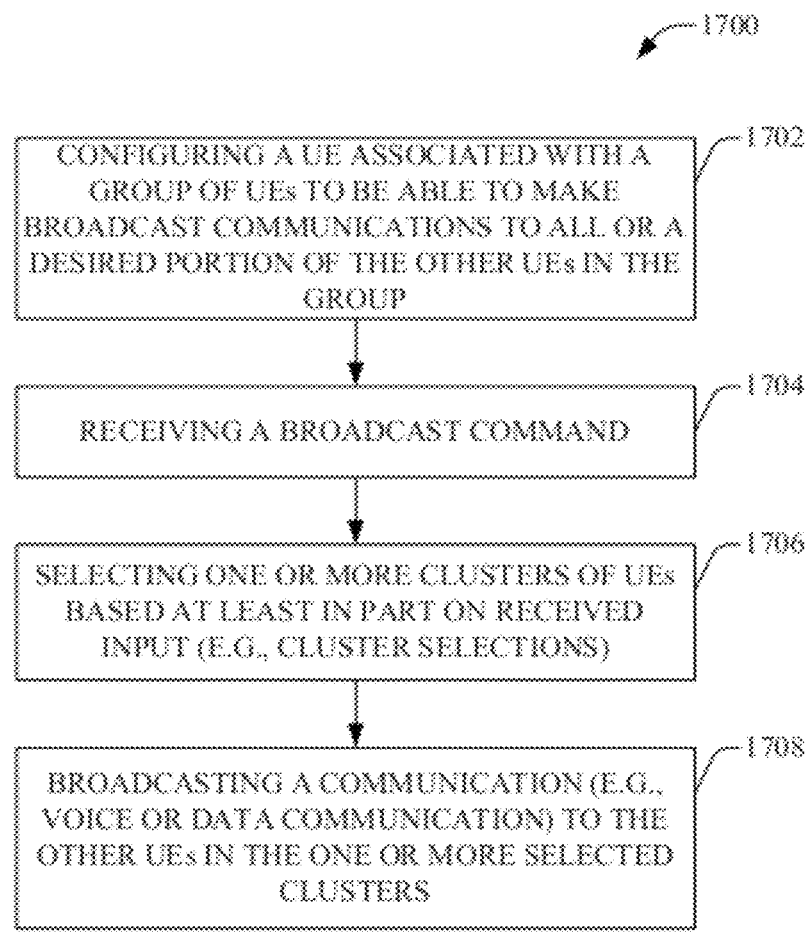
FIG. 17 illustrates a flowchart of an example method that can employ broadcast communications to facilitate group communications associated with an information presentation in accordance with aspects of the disclosed subject matter.

FIG. 17 illustrates a flowchart of an example method 1700 that can employ broadcast communications to facilitate group communications associated with an information presentation in accordance with aspects of the disclosed subject matter. At 1702, a UE associated with a group of UEs can be configured to be able to make broadcast communications to all or a desired portion of the other UEs in the group. At 1704, a broadcast command can be received. In an aspect, the UE user can select the broadcast communication option on the UE. At 1706, one or more clusters of UEs can be selected based at least in part on received input (e.g., cluster selections) from the UE user. The one or more clusters can be selected to facilitate using the UE to make a broadcast communication to the UEs in the selected cluster(s). For example, if the UE has a touch screen that displays the clusters that the UE user has formed, the UE user can touch one or more desired clusters to select them for the broadcast communication. At 1708, a communication (e.g., voice or data communication) can be broadcast to the other UEs in the one or more selected clusters. If the UE user selected one or more clusters that do not include all of the members of the group, the UE will only broadcast the communication to the UEs and associated group members that are in the selected clusters, and the other unselected UEs in the group will not receive the broadcast communication.

Figure 18:
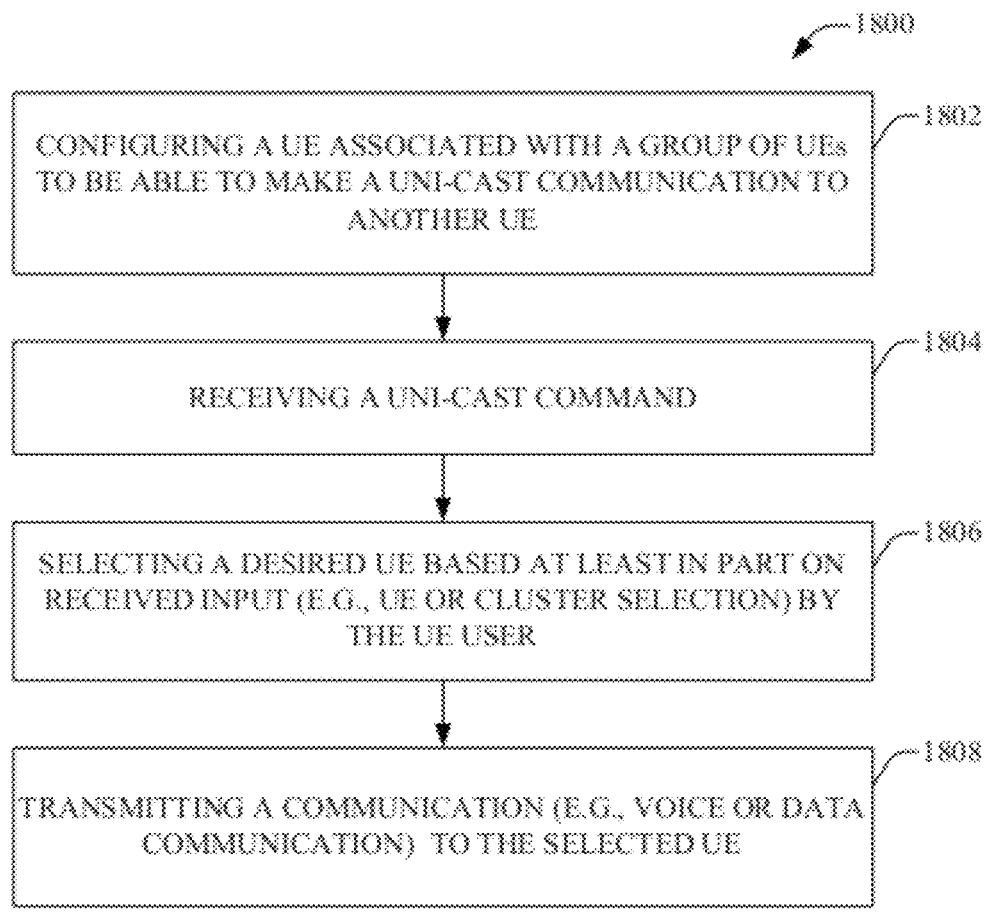
FIG. 18 depicts a flowchart of an example method that can employ uni-cast communications to facilitate communications between group members associated with an information presentation in accordance with aspects of the disclosed subject matter.

FIG. 18 depicts a flowchart of an example method 1800 that can employ uni-cast communications to facilitate communications between group members associated with an information presentation in accordance with aspects of the disclosed subject matter. At 1802, a UE associated with a group of UEs can be configured to be able to make a uni-cast communication to another UE (e.g., UE in the group or a UE that is outside the group but is also integrated with the PMC). At 1804, a uni-cast command can be received. In an aspect, the UE user can select the uni-cast communication option on the UE. At 1806, a desired UE can be selected based at least in part on received input (e.g., UE or cluster selection) by the UE user. The UE or cluster that includes the UE (e.g., cluster with only the UE as a cluster member) can be selected to facilitate using the UE to make a uni-cast communication to the selected UE. For example, if the UE has a touch screen that displays clusters and/or respective UEs, the UE user can touch the UE (e.g., icon representation of the UE) or the desired cluster that includes the UE to select the desired UE for the uni-cast communication. At 1808, a communication (e.g., voice or data communication) can be transmitted to the selected UE. The UE will only transmit the communication to the selected UE, and the other unselected UEs in the group will not receive the uni-cast communication.

Figure 19:
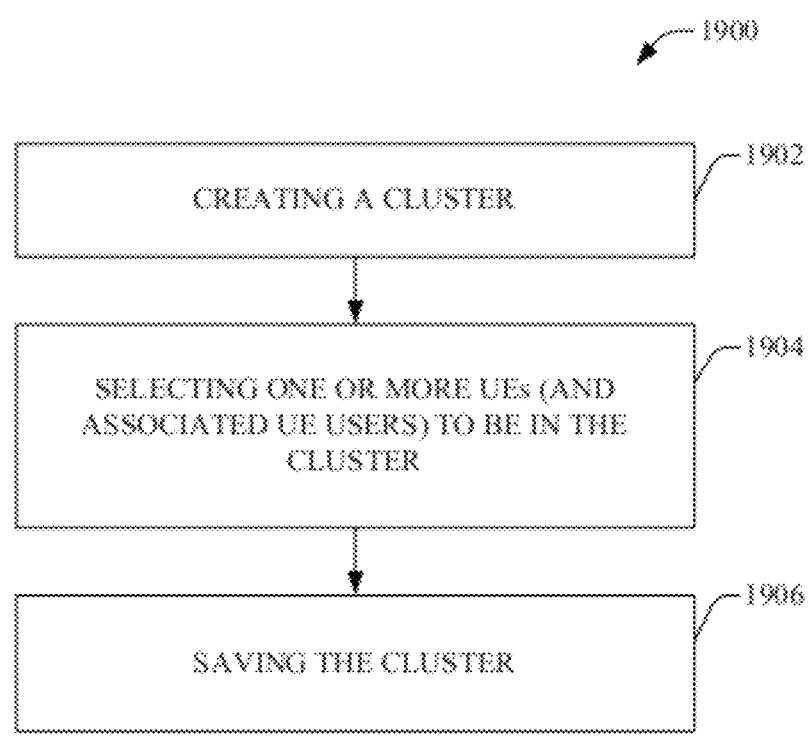
FIG. 19 illustrates a flowchart of an example method that can create one or more clusters of UEs and associated UE users to facilitate group communications associated with an information presentation in accordance with aspects of the disclosed subject matter.

FIG. 19 illustrates a flowchart of an example method 1900 that can create one or more clusters of UEs and associated UE users to facilitate group communications associated with an information presentation in accordance with aspects of the disclosed subject matter. At 1902, a cluster can be created. A UE user can use the UE interface (e.g., touch screen or buttons) to create a cluster in response to a create cluster command received by the UE from the UE user (e.g., user can select a create cluster command on the UE). At 1904, one or more UEs (and associated UE users) can be selected to be in the cluster. Using the UE interface, the UE user can select one or more desired UEs to be included in the cluster. For example, the UE user can create a first cluster than can comprise UEs of members of the family, a second cluster that includes a friend's UE and the UEs of the friend's family members, or another cluster comprising other desired UEs. As desired, other information relating to the UEs in the cluster can be received by the UE, wherein the information can be, for example, a cluster name (e.g., Our Family, Bob's Family, . . . ), respective cluster member names (e.g., cluster can comprise cluster points representing each of the UEs in the group, wherein each of the cluster points can be named corresponding to the UE user associated with the cluster point), respective pieces of information relating to respective cluster members (e.g., phone number, address, interests, etc.), or other information. As desired, the additional information regarding a UE user can remain hidden or partially hidden until the UE user uses the UE to select the control (e.g., button) for displaying the additional information on the display screen of the UE. At 1906, the cluster can be saved. In an aspect, the cluster and associated information can be saved, wherein information relating to the cluster can be stored locally on the UE, and also can be provided to and stored by the PMC.

Figure 20:
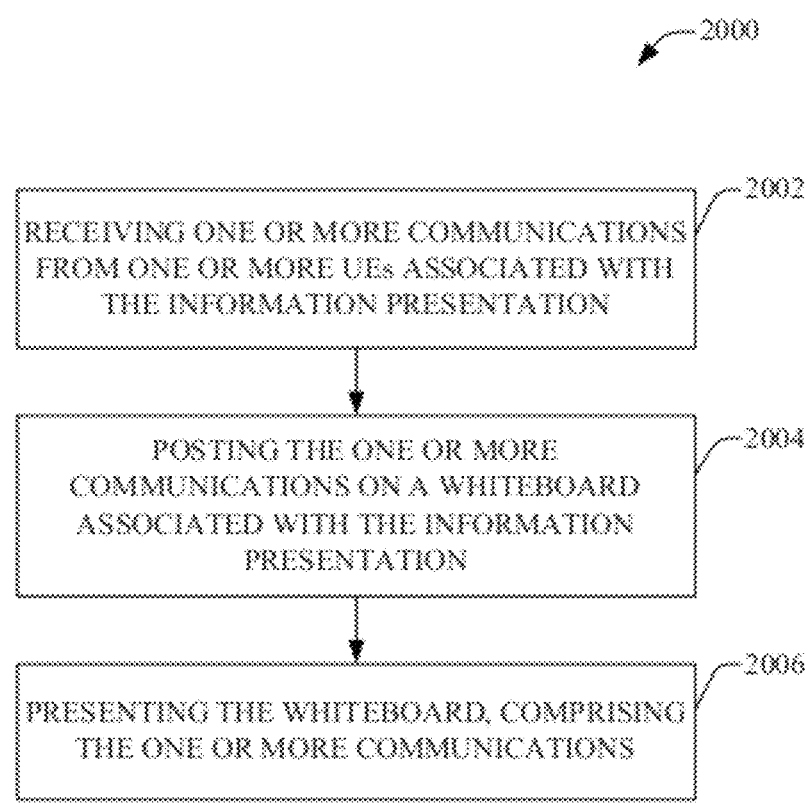
FIG. 20 depicts a flowchart of an example method that can employ a whiteboard to facilitate group communications associated with an information presentation in accordance with aspects of the disclosed subject matter.

FIG. 20 depicts a flowchart of an example method 2000 that can employ a whiteboard to facilitate group communications associated with an information presentation in accordance with aspects of the disclosed subject matter. At 2002, one or more communications (e.g., voice communication, textual message, digital image, audio file, etc.) can be received from one or more UEs associated with the information presentation. At 2004, the one or more communications can be posted on a whiteboard associated with the information presentation. In an aspect, the one or more communications also can be stored in one or more files in a data store associated with the PMC. In another aspect, if the communication is a voice communication, as desired, voice recognition techniques can be employed to convert the voice communication to text, and the text can be displayed on the whiteboard, or a link to the voice communication can be displayed and a UE user can use the UE to select the link to the voice communication to hear it.

At 2006, the whiteboard, comprising the one or more communications, can be presented. In an aspect, the PMC can facilitate transmitting the whiteboard, and the communications thereon, to the UEs of a group, and when a UE user selects to have the whiteboard displayed on the display screen or other interface (e.g., speakers) of the UE, the whiteboard, including the communications (e.g., textual, web site links, video, pictures, audio, etc.), or a desired portion thereof, can be presented to the UE user. In another aspect, the communications can be displayed or otherwise presented on the whiteboard displayed or presented on a UE in a desired language, wherein the whiteboard communications can be translated to the desired language when desired. In still another aspect, as desired, a UE user can filter the communications displayed or otherwise presented on the whiteboard so that only desired communications are presented on the UE of the UE user. The filtering can be based at least in part on, for example, the cluster a communication is associated with (e.g., only present whiteboard communications from UEs in a specified cluster), specified UEs associated with a communication (e.g., only present whiteboard communications by UEs of family members; only present whiteboard communications by the controller UE), type of communication (e.g., only display textual comments, do not display pictures), size of communication (e.g., length of communication, file size of communication, etc.), time or time window (e.g., only show communications that were posted during a specified time period), or another desired filter(s), etc.

Figure 21:
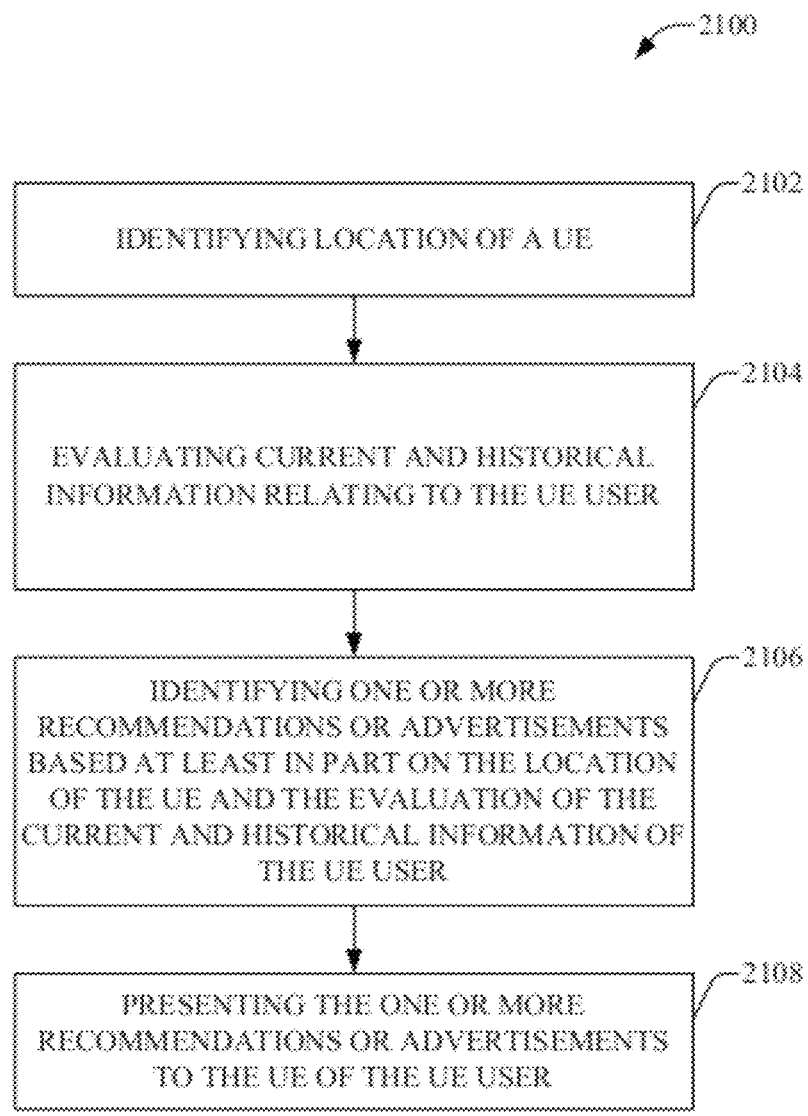
FIG. 21 illustrates a flowchart of an example method that can generate and present targeted advertisements or recommendations to facilitate group communications associated with an information presentation in accordance with aspects of the disclosed subject matter.

FIG. 21 illustrates a flowchart of an example method 2100 that can generate and present targeted advertisements or recommendations to facilitate group communications associated with an information presentation in accordance with aspects of the disclosed subject matter. At 2102, the location of a UE and associated UE user can be identified. For example, the PMC can identify the location of the UE using location information obtained from one or more locator sources, such as GPS component (e.g., GPS satellite), or one or more sensors associated with the PMC, wherein the UE can be identified based at least in part on its UE identifier. At 2104, current and historical information relating to the UE user can be evaluated. The PMC can evaluate the current and historical information associated with the UE user and associated UE, wherein the current and historical information can include, for example, contextual information associated with the UE user, interactions with exhibits, programs, lectures, etc., associated with the information presentation, requests for additional information received from the UE user (e.g., via the UE), user preferences, the direction the UE is currently heading or likely is currently heading (e.g., based at least in part on prior detected locations or interactions or tracking of the location of the UE), etc., to facilitate identifying one or more recommendations or advertisements (e.g., targeted recommendations or advertisements) that may be of interest to the UE user given the current status and history of the user.

At 2106, one or more recommendations or advertisements can be identified based at least in part on the location of the UE and the evaluation of the current and historical information of the UE user. For example, the UE user can be touring a history museum. The PMC identify the location of the UE as being within 200 feet of the exit of the museum and 100 feet of a museum gift shop that sells a wide variety of civil war memorabilia, and also can detect that the current time is within a time window that tourists typically leave the museum to go to lunch. The PMC can evaluate current and historical information associated with the UE user and UE and can learn that the UE user and UE interacted with civil war exhibits for at least a predefined period of time during the tour or for more time than the UE user or UE interacted with other types of exhibits, and, as a result, can determine that the UE user may be interested in civil war memorabilia. Also, the PMC can determine that the UE user may be interested in having lunch given the UE user's location in relation to the exit and the current time. Based at least in part on the evaluation, the PMC can identify an advertisement for civil war memorabilia that will offer a discount on an item of civil war memorabilia at the gift shop, and a recommendation for a restaurant that is located within one block of the museum.

At 2108, the one or more recommendations or advertisements can be presented to the UE of the UE user. For example, the advertisement for civil war memorabilia and the restaurant recommendation can be communicated to the UE of the user. The advertisement, if containing a discount or coupon, can be presented to the store associate, who can view or scan the advertisement to facilitate applying the appropriate discount to the cost of the item being purchased.

Figure 22:
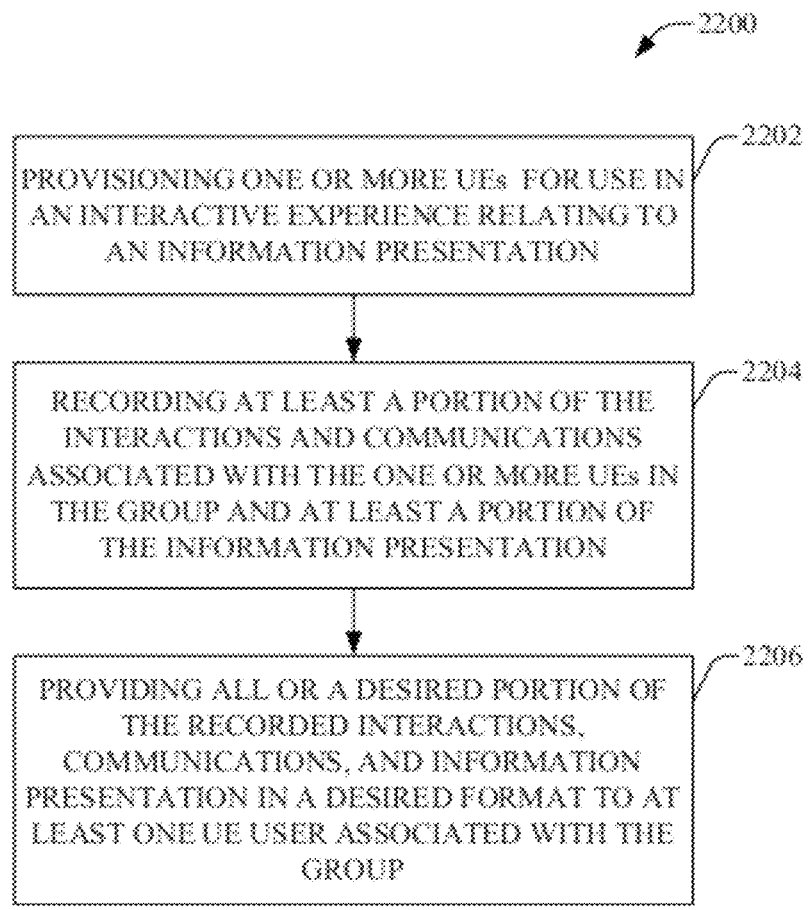
FIG. 22 depicts a flowchart of an example method that records interactions of group members associated with an information presentation in accordance with aspects of the disclosed subject matter.

FIG. 22 depicts a flowchart of an example method 2200 that records interactions of group members associated with an information presentation in accordance with aspects of the disclosed subject matter. At 2202, one or more UEs can be provisioned for use in an interactive experience relating to an information presentation. For instance, the one or more UEs can be provisioned to be able to interact with other UEs, if any, in the group and/or the PMC or exhibits associated therewith, as well as be able to utilize the APs (e.g., femto APs, pico APs, Wi-Fi APs) associated with the PMC. At 2204, at least a portion of the interactions and communications associated with the one or more UEs in the group and at least a portion of the information presentation can be recorded. The PMC can record and store desired portions of the interactions and communications associated with the UE(s) in a group and desired portions of the information presentation. At 2206, all or a desired portion of the recorded interactions, communications, and information presentation can be provided in a desired format (e.g., DVD, CD, downloadable file) to at least one UE user associated with the group.

Figure 23:
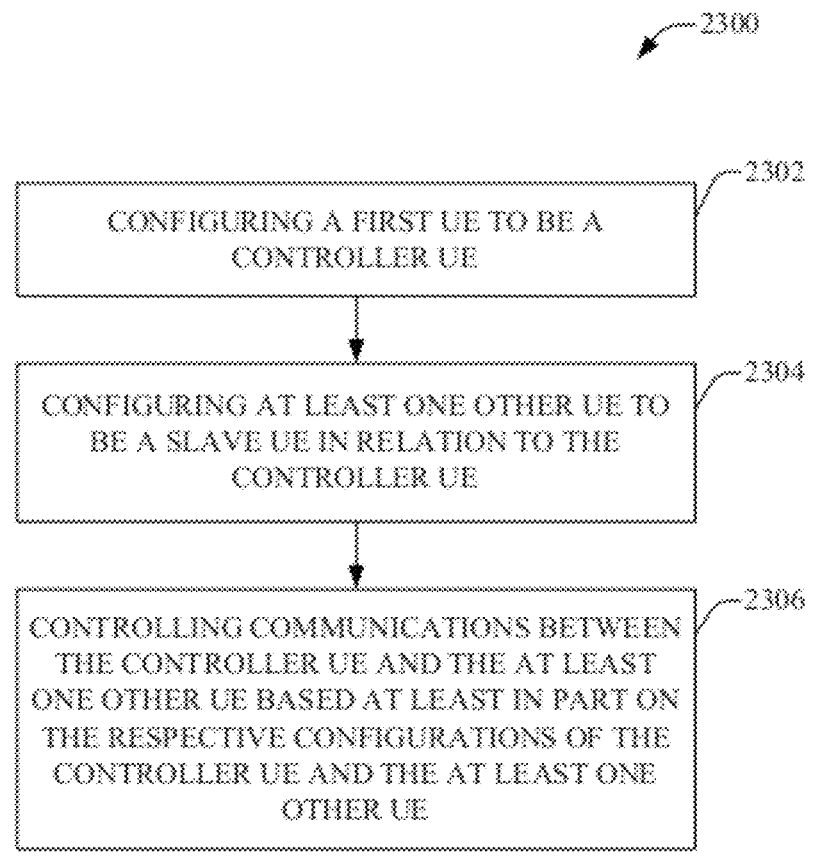
FIG. 23 illustrates a flowchart of an example method for configuring UEs to be used in relation to an information presentation in accordance with aspects of the disclosed subject matter.

FIG. 23 illustrates a flowchart of an example method 2300 for configuring UEs to be used in relation to an information presentation in accordance with aspects of the disclosed subject matter. At 2302, a first UE can be configured to be a controller UE. In an aspect, a controller UE application can be downloaded to the first UE and executed to facilitate configuring the first UE to be a controller UE, wherein the controller UE can comprise a LPPMC. The controller UE can be used, for example, by a tour guide or an individual who is taking a solo or private tour in relation to the information presentation.

At 2304, at least one other UE can be configured to be a slave UE in relation to the controller UE. The at least one other UE can be one UE that is configured to be a slave UE in relation to the controller UE, or, if there is more than one other UEs, the other UEs can be configured as slave UEs, or certain of the UEs can be configured as sub-controller UEs and/or certain of the UEs can be configured as slave UEs. For instance, if there are four other UEs, wherein two UEs are associated with a first family, comprising a father and a son, and two other UEs are associated with a second family, comprising a mother and a daughter, it can be desirable to configure the father's UE as a sub-controller UE and the son's UE as a slave UE in relation to the father's UE and the controller UE, and configure the mother's UE as a sub-controller UE and the daughter's UE as a slave UE in relation to both the mother's UE and the controller UE. The respective sub-controller UEs also can operate as slave UEs in relation to the controller UE, as disclosed herein.

At 2306, communications between the controller UE and the at least one other UE can be controlled (e.g., by the controller UE) based at least in part on the respective configurations of the controller UE and the at least one other UE. For instance, the controller UE can control, at least in part, communications from or to the controller UE to or from subordinate UEs (e.g., sub-controller UEs, slave UEs) in the group, and the sub-controller UE of a sub-group can control, at least in part, communications from or to the sub-controller UE to or from a slave UEs in the sub-group, communications from or to the controller UE to or from the slave UE in the sub-group, and inter-group communications by UEs (e.g., communications between a slave UE in its sub-group and a UE that is part of another sub-group). For example, as desired, a controller UE can be set to allow communications from a subordinate UE in the group when such subordinate UE is selected (e.g., in response to a "raise hand" indicator from the subordinate UE), or to control the times during the information presentation (e.g., during a free discussion period) when subordinate UEs can send broadcast intercom communications. As another example, a sub-controller UE can be set to control inter-group communications of a slave UE in its sub-group to not allow the slave UE to communicate with other UEs outside the sub-group without receiving permission from the user of the sub-controller UE via the sub-controller UE.

Figure 24:
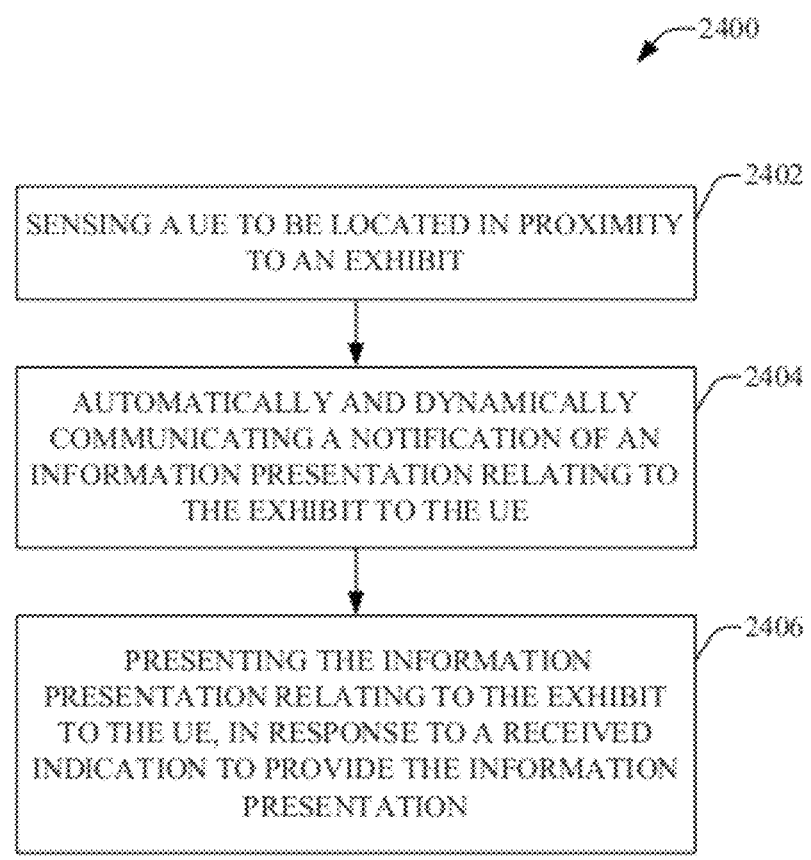
FIG. 24 depicts a flowchart of an example method that can facilitate dynamic information presentations in accordance with aspects of the disclosed subject matter.

FIG. 24 illustrates a flowchart of an example method 2400 that can facilitate dynamic information presentations in accordance with aspects of the disclosed subject matter. At 2402, a UE can be sensed to be located in proximity to an exhibit. For instance, a sensor associated with the exhibit can monitor or scan a predefined area around the exhibit. The sensor can sense or detect UEs, such as the UE, when the UEs are within the predefined area around the exhibit. When the sensor detects the UE located in the predefined area, the sensor can communicate information (e.g., a detection message that can include information, such as a UE identifier of the sensed UE and an indicator that the UE is sensed to be near the exhibit) to the PMC (or a local PMC integrated or associated with the exhibit), which can be associated with the sensor. At 2404, a notification of an information presentation relating to the exhibit can be automatically and dynamically communicated to the UE. In an aspect, the PMC and/or the local PMC associated with the sensor can automatically and dynamically communicate the notification to the UE, in response to sensing the UE being located in proximity to the exhibit.

At 2406, in response to a received indication to provide the information presentation, the information presentation relating to the exhibit can be presented to the UE. For instance, the UE user, using the UE, can respond to the notification of the information presentation relating to the exhibit by selecting a control (e.g., button) indicating that the UE user desires to receive and/or perceive the information presentation on the user's UE, and the PMC or exhibit can communicate (e.g., stream) the information presentation to the UE of the user, and the UE can present (e.g., display, broadcast) the information presentation to the UE user. It is to be appreciated and understood that, in accordance with another embodiment, as desired, the information presentation can be automatically and dynamically presented to the UE of the UE user without a notification being communicated to the UE.

In some aspects the teachings herein can or may be employed in a network that includes macro scale coverage (e.g., a large area cellular network such as a 3G network, typically referred to as a macrocell network) and smaller scale coverage (e.g., a residence-based or building-based network environment). As an access terminal ("AT") moves through such a network, the AT may be served in certain locations by access nodes ("ANs") that provide macro coverage while the AT may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macrocell, a femtocell, or a picocell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femtocell, and so on.

Figure 25:
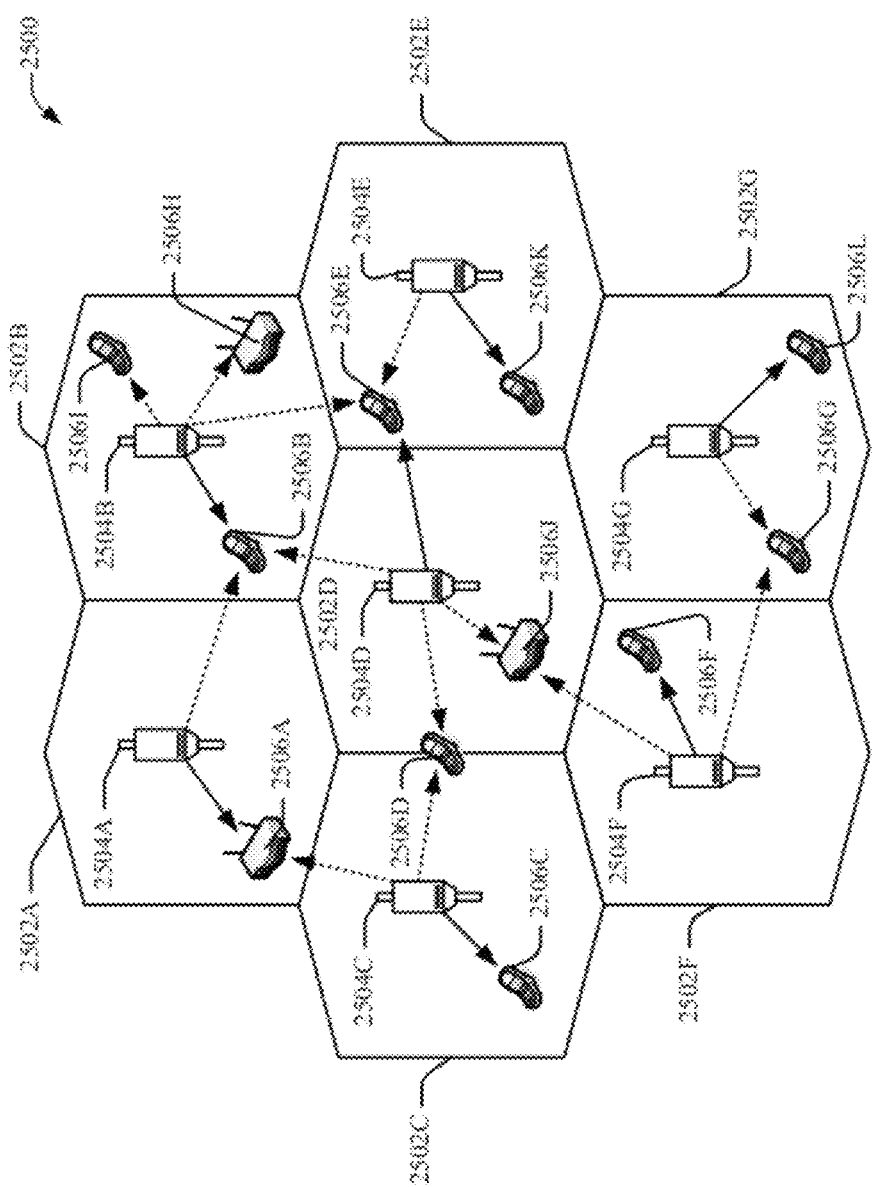
FIG. 25 illustrates an example wireless communication system in accordance with an embodiment of the disclosed subject matter.

FIG. 25 illustrates a wireless communication system 2500, configured to support a number of users, in which the teachings herein may be implemented. The system 2500 provides communication for multiple cells 2502, such as, for example, macro cells 2502A-2502G, with each cell being serviced by a corresponding access node 2504 (e.g., access nodes 2504A-2504G). As shown in FIG. 25, access terminals 2506 (e.g., access terminals 2506A-2506L) may be dispersed at various locations throughout the system over time. Each access terminal 2506 may communicate with one or more access nodes 2504 on a forward link ("FL") and/or a reverse link ("RL") at a given moment, depending upon whether the access terminal 2506 is active and whether it is in soft handoff, for example. The wireless communication system 2500 may provide service over a large geographic region. For example, macro cells 2502A-2502G may cover a few blocks in a neighborhood.

Figure 26:
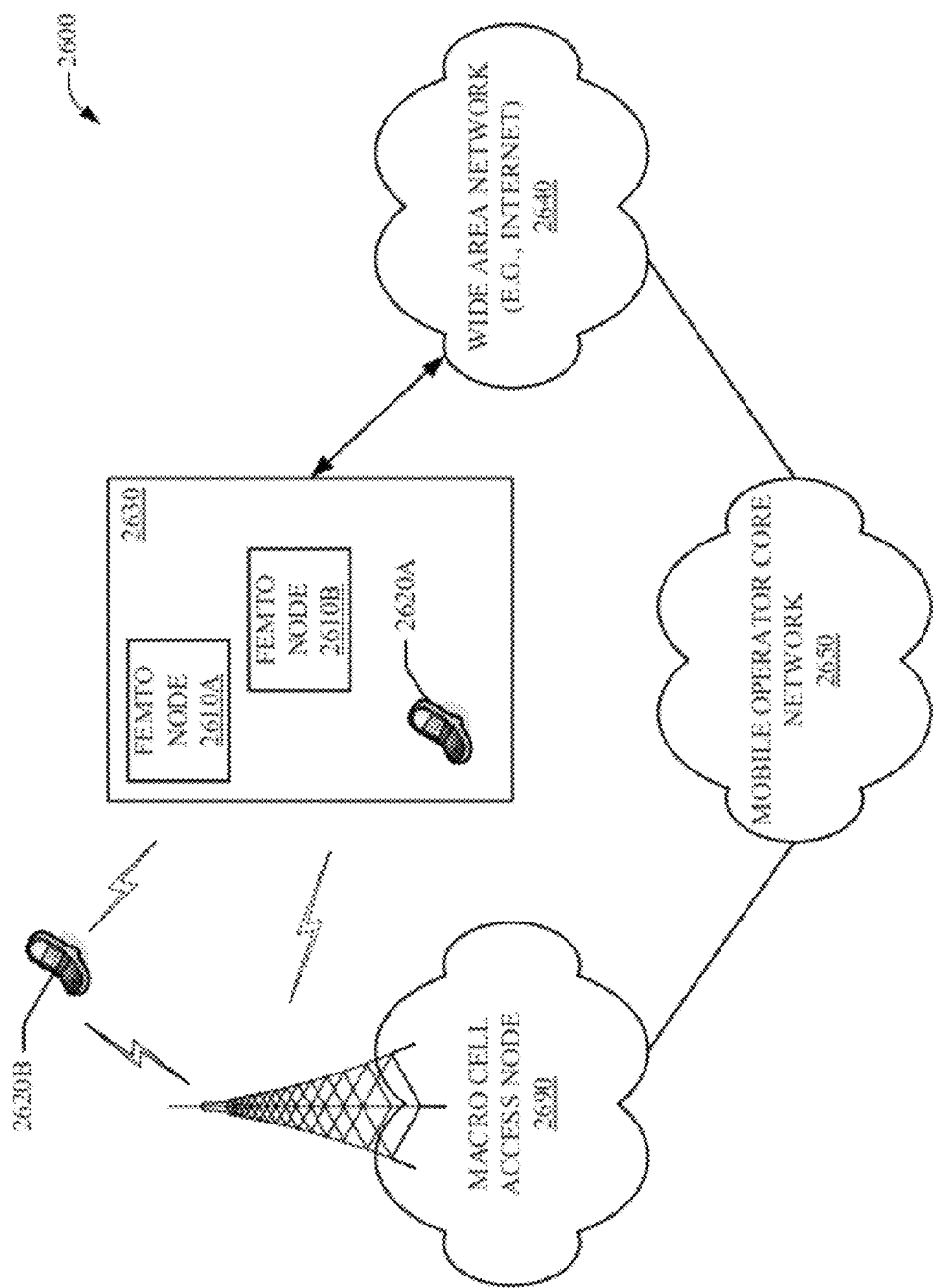
FIG. 26 illustrates an example communication system where one or more femto nodes are deployed within a network environment.

FIG. 26 illustrates an exemplary communication system 2600 where one or more femto nodes are deployed within a network environment. Specifically, the system 2600 includes multiple femto nodes 2610 (e.g., femto nodes 2610A and 2610B) installed in a relatively small scale network environment (e.g., in one or more user residences 2630). Each femto node 2610 may be coupled to a wide area network 2640 (e.g., the Internet) and a mobile operator core network 2650 via a DSL router, a cable modem, a wireless link, or other connectivity means (not shown). As will be discussed below, each femto node 2610 may be configured to serve associated access terminals 2620 (e.g., access terminal 2620A) and, optionally, alien access terminals 2620 (e.g., access terminal 2620B). In other words, access to femto nodes 2610 may be restricted whereby a given access terminal 2620 may be served by a set of designated (e.g., home) femto node(s) 2610 but may not be served by any non-designated femto nodes 2610 (e.g., a neighbor's femto node 2610).

Figure 27:
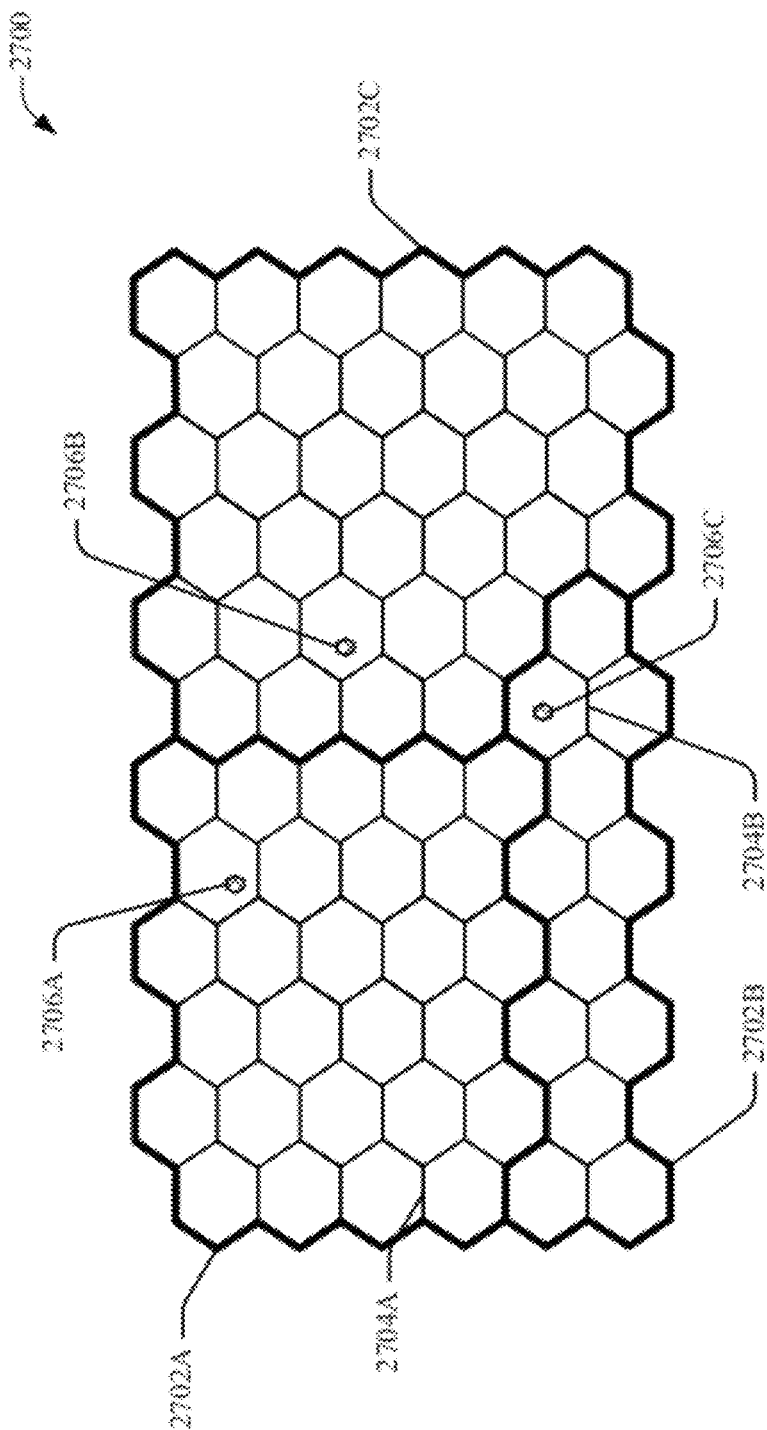
FIG. 27 illustrates an example of a coverage map in accordance with an embodiment of the disclosed subject matter.

FIG. 27 illustrates an example of a coverage map 2700 where several tracking areas 2702 (or routing areas or location areas) are defined, each of which includes several macro coverage areas 2704. Here, areas of coverage associated with tracking areas 2702A, 2702B, and 2702C are delineated by the wide lines and the macro coverage areas 2704 are represented by the hexagons. The tracking areas 2702 also include femto coverage areas 2706. In this example, each of the femto coverage areas 2706 (e.g., femto coverage area 2706C) is depicted within a macro coverage area 2704 (e.g., macro coverage area 2704B). It should be appreciated, however, that a femto coverage area 2706 may not lie entirely within a macro coverage area 2704. In practice, a large number of femto coverage areas 2706 may be defined with a given tracking area 2702 or macro coverage area 2704. Also, one or more pico coverage areas (not shown) may be defined within a given tracking area 2702 or macro coverage area 2704.

Referring again to FIG. 28, the owner of a femto node 2810 may subscribe to mobile service, such as, for example, 3G mobile service, offered through the mobile operator core network 2850. In addition, an access terminal 2820 may be capable of operating both in macro environments and in smaller scale (e.g., residential) network environments. In other words, depending on the current location of the access terminal 2820, the access terminal 2820 may be served by an access node 2860 of the macro cell mobile network 2850 or by any one of a set of femto nodes 2810 (e.g., the femto nodes 2810A and 2810B that reside within a corresponding user residence 2830). For example, when a subscriber is outside his home, he is served by a standard macro access node (e.g., node 2860) and when the subscriber is at home, he is served by a femto node (e.g., node 2810A). Here, it should be appreciated that a femto node 2820 may be backward compatible with existing access terminals 2820.

A femto node 2810 may be deployed on a single frequency or, in the alternative, on multiple frequencies. Depending on the particular configuration, the single frequency or one or more of the multiple frequencies may overlap with one or more frequencies used by a macro node (e.g., node 2860).

In some aspects, an access terminal 2820 may be configured to connect to a preferred femto node (e.g., the home femto node of the access terminal 2820) whenever such connectivity is possible. For example, whenever the access terminal 2820 is within the user's residence 2830, it may be desired that the access terminal 2820 communicate only with the home femto node 2810.

In some aspects, if the access terminal 2820 operates within the macro cellular network 2850 but is not residing on its most preferred network (e.g., as defined in a preferred roaming list), the access terminal 2820 may continue to search for the most preferred network (e.g., the preferred femto node 2810) using a Better System Reselection ("BSR"), which may involve a periodic scanning of available systems to determine whether better systems are currently available, and subsequent efforts to associate with such preferred systems. With the acquisition entry, the access terminal 2820 may limit the search for specific band and channel. For example, the search for the most preferred system may be repeated periodically. Upon discovery of a preferred femto node 2810, the access terminal 2820 selects the femto node 2810 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 2810 that reside within the corresponding user residence 2830). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 28:
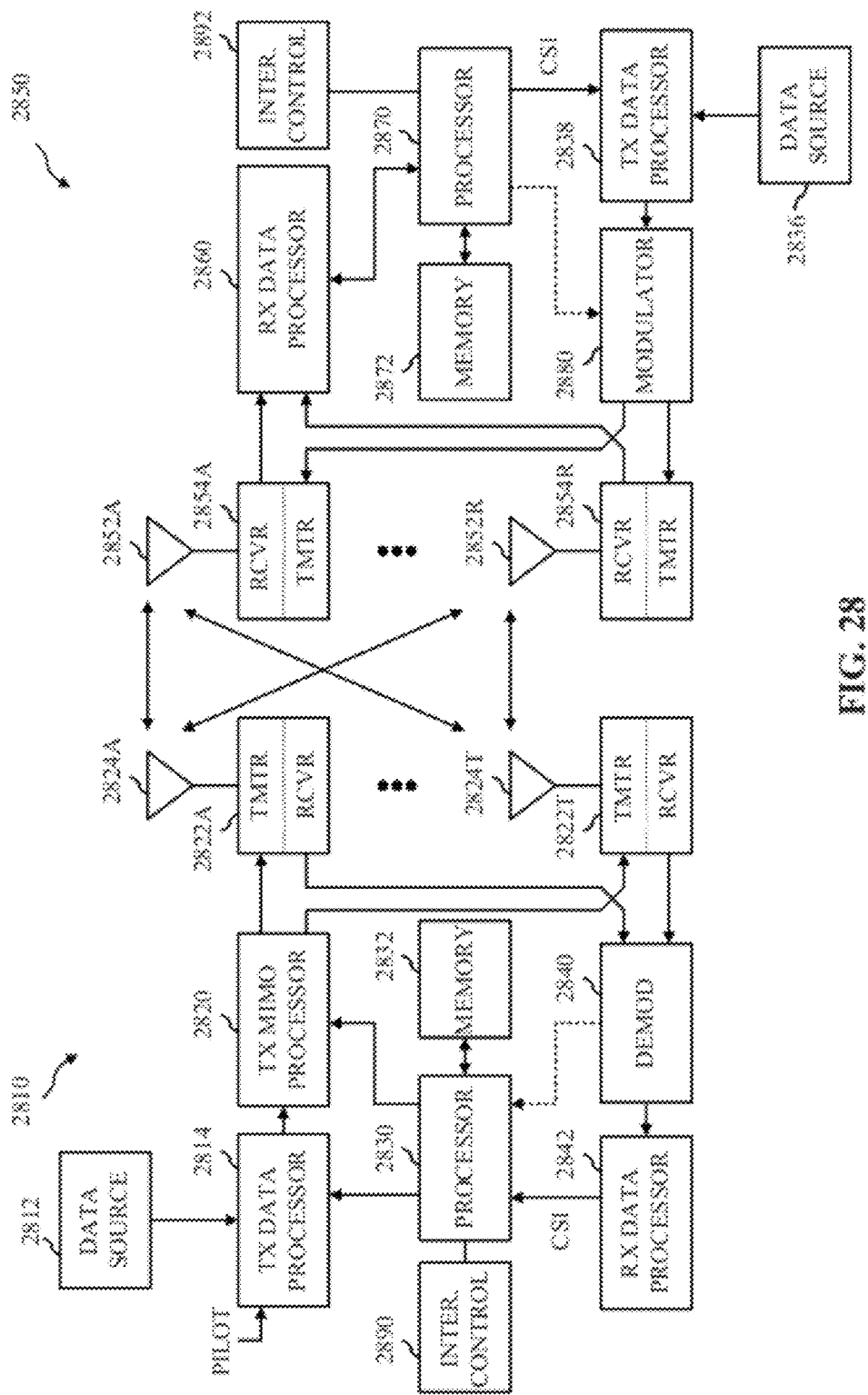
FIG. 28 depicts several sample components that can or may be employed to facilitate communication between nodes in accordance with an embodiment of the disclosed subject matter.

The teachings herein may be incorporated into a node (e.g., a device) employing various components for communicating with at least one other node. FIG. 28 depicts several sample components that may be employed to facilitate communication between nodes. Specifically, FIG. 28 illustrates a wireless device 2810 (e.g., an access point) and a wireless device 2850 (e.g., an access terminal) of a MIMO system 2800. At the device 2810, traffic data for a number of data streams is provided from a data source 2812 to a transmit ("TX") data processor 2814.

In some aspects, each data stream is transmitted over a respective transmit antenna. The TX data processor 2814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 2830. A data memory 2832 may store program code, data, and other information used by the processor 2830 or other components of the device 2810.

The modulation symbols for all data streams are then provided to a TX MIMO processor 2820, which may further process the modulation symbols (e.g., for OFDM). The TX MIMO processor 2820 then provides $N_T$ modulation symbol streams to $N_T$ transceivers ("XCVR") 2822A through 2822T. In some aspects, the TX MIMO processor 2820 applies beam-forming weights to the symbols of the data streams and to the antenna from which the symbol is being transmitted.

Each transceiver 2822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 2822A through 2822T are then transmitted from $N_T$ antennas 2824A through 2824T, respectively.

At the device 2850, the transmitted modulated signals are received by $N_R$ antennas 2852A through 2852R and the received signal from each antenna 2852 is provided to a respective transceiver ("XCVR") 2854A through 2854R. Each transceiver 2854 conditions (e.g., filters, amplifies, and downconverts) a respective received signal, digitizes the conditioned signal to provide samples, and further processes the samples to provide a corresponding "received" symbol stream.

A receive ("RX") data processor 2860 then receives and processes the $N_R$ received symbol streams from $N_R$ transceivers 2854 based on a particular receiver processing technique to provide $N_T$ "detected" symbol streams. The RX data processor 2860 then demodulates, deinterleaves, and decodes each detected symbol stream to recover the traffic data for the data stream. The processing by the RX data processor 2860 is complementary to that performed by the TX MIMO processor 2820 and the TX data processor 2814 at the device 2810.

A processor 2870 periodically determines which pre-coding matrix to use (discussed below). The processor 2870 formulates a reverse link message comprising a matrix index portion and a rank value portion. A data memory 2872 may store program code, data, and other information used by the processor 2870 or other components of the device 2850.

The reverse link message may comprise various types of information regarding the communication link and/or the received data stream. The reverse link message is then processed by a TX data processor 2838, which also receives traffic data for a number of data streams from a data source 2836, modulated by a modulator 2880, conditioned by the transceivers 2854A through 2854R, and transmitted back to the device 2810.

At the device 2810, the modulated signals from the device 2850 are received by the antennas 2824, conditioned by the transceivers 2822, demodulated by a demodulator ("DE-MOD") 2840, and processed by a RX data processor 2842 to extract the reverse link message transmitted by the device 2850. The processor 2830 then determines which pre-coding matrix to use for determining the beam-forming weights then processes the extracted message.

FIG. 28 also illustrates that the communication components can or may include one or more components that perform interference control operations as taught herein. For example, an interference ("INTER.") control component 2890 may cooperate with the processor 2830 and/or other components of the device 2810 to send/receive signals to/from another device (e.g., device 2850) as taught herein. Similarly, an interference control component 2892 may cooperate with the processor 2870 and/or other components of the device 2850 to send/receive signals to/from another device (e.g., device 2810). It should be appreciated that for each device 2810 and 2850 the functionality of two or more of the described components may be provided by a single component. For example, a single processing component may provide the functionality of the interference control component 2890 and the processor 2830 and a single processing component may provide the functionality of the interference control component 2892 and the processor 2870.

It is to be appreciated and understood that components (e.g., UE, AP, communication network, core network, IP-based network, ESMC, UE-ESMC, etc.), as described with regard to a particular system or method, can include the same or similar functionality as respective components (e.g., respectively named components or similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores executable instructions; and
a processor, communicatively coupled to the memory, that facilitates execution of the executable instructions to perform operations, comprising:
  initiating provisioning of a first communication device to facilitate integrating the first communication device with a set of interactive services and to facilitate use of the set of interactive services by the first communication device in relation to an information presentation;
  clustering a set of communication devices associated with the information presentation into a cluster, wherein the set of communication devices comprises the first communication device and a second communication device;
  facilitating presentation of a location of the second communication device relative to another location of the first communication device on a display screen of the first communication device in response to a selection of the cluster;
  receiving a preference from the first communication device, wherein the information presentation is associated with a tour, and the preference indicates that the information presentation is to be divided into a first portion of the information presentation in connection with the first communication device and a second portion of the information presentation in connection with the second communication device;
  analyzing the preference and congestion information that is received from a sensor associated with a tour exhibit that relates to the information presentation, wherein the congestion information indicates a level of congestion associated with the tour exhibit due to traffic associated with a defined area that is associated with the tour exhibit;
  customizing a first tour route relating to the first portion of the information presentation for use in connection with the first communication device and a second tour route relating to the second portion of the information presentation for use in connection with the second communication device based on the preference and the congestion information, wherein the first tour route is associated with the tour exhibit;
  facilitating a broadcast transmission of information associated with the information presentation to communication devices in the set of communication devices;
  receiving a slow-down indicator from the second communication device; and
  adjusting the second portion of the information presentation, in response to the slow-down indicator, to facilitate slowing down the second portion of the information presentation from a defined rate of speed to a slower rate of speed that is slower than the defined rate of speed and continuing the broadcast transmission of the information associated with the second portion of the information presentation at the slower rate of speed.

2. The system of claim 1, wherein the operations further comprise:
translating a set of information that is being presented by the first communication device in connection with the information presentation from a first language to a second language to generate translated information that facilitates presentation of the set of information in accordance with the second language; and
transmitting the translated information from the first communication device to the second communication device.

3. The system of claim 1, wherein the clustering comprises clustering the set of communication devices into the cluster in accordance with a set of preferences, wherein the cluster is selectable to display the location of the second communication device.

4. The system of claim 1, wherein the operations further comprise facilitating displaying of a message from the first communication device on a whiteboard associated with the cluster, and wherein the whiteboard displays messages received from the set of communication devices and is accessible by the set of communication devices.

5. The system of claim 1, wherein the operations further comprise:
receiving question information relating to a question and a request for a private reply to the question from the first communication device;
initiating selection of a uni-cast communication option, in response to the request; and
initiating a uni-cast transmission of response information relating to a response to the question to the first communication device, in response to the initiating the selection of the uni-cast communication option.

6. The system of claim 1, wherein the operations further comprise:
receiving a first tour itinerary associated with the information presentation, wherein the first tour itinerary comprises a different tour route than a second tour itinerary associated with the information presentation, and the first tour itinerary is associated with the first communication device and the second tour itinerary is associated with the second communication device; and
facilitating transmitting of a set of information associated with an exhibit that is associated with the first tour itinerary to the second communication device.

7. The system of claim 1, wherein the operations further comprise:
receiving a set of preferences associated with the first communication device, wherein the customizing the first tour route further comprises customizing the first tour route relating to the information presentation based on the set of user preferences, comprising the preference.

8. The system of claim 1, wherein the operations further comprise:
tagging a first piece of information associated with a whiteboard with a tag in response to input received from the first communication device; and
based on the tag, associating the first piece of information with a second piece of information associated with the whiteboard and having the tag.

9. The system of claim 1, wherein the operations further comprise:
facilitating a selection of a subset of communication devices of the set of communication devices;
clustering the subset of communication devices into a sub-cluster; and
facilitating a broadcast transmission of a subset of the information associated with the information presentation to communication devices in the subset of communication devices.

10. The system of claim 1, wherein the operations further comprise initiating sending of information from the first communication device to the second communication device associated with the cluster in response to a push command.

11. The system of claim 1, wherein the first communication device is a mobile communication device that establishes a wireless communication connection for the facilitating the presentation of the location.

12. A method, comprising:
integrating, by a system comprising a processor, a first user equipment with a presentation management component associated with a set of interactive services to facilitate providing the set of interactive services to the first user equipment for use in relation to an information presentation;
clustering, by the system, a set of user equipment associated with the information presentation into a cluster, wherein the set of user equipment comprises the first user equipment and a second user equipment;
initiating, by the system, a presentation of a location of the second user equipment relative to another location of the first user equipment on a display screen of the first user equipment in response to the clustering the set of user equipment into the cluster;
receiving, by the system, a tour-related preference from the first user equipment, wherein the information presentation is associated with a tour, and the tour-related preference indicates that the information presentation is to be divided into a first information presentation portion in connection with the first user equipment and a second information presentation portion in connection with the second user equipment;
analyzing, by the system, the tour-related preference and congestion information that is received from a sensor associated with a tour exhibit that relates to the information presentation, wherein the congestion information indicates an amount of traffic located in a defined area in proximity to the tour exhibit;
determining, by the system, a first customized tour route relating to the first information presentation portion for use in connection with the first user equipment and a second customized tour route relating to the second information presentation portion for use in connection with the second user equipment based on the tour-related preference and the congestion information;
facilitating, by the system, a broadcast transmission of information associated with the information presentation to user equipment of the set of user equipment;
receiving, by the system, a slow-down indicator from the second user equipment; and
adjusting, by the system, the second information presentation portion, in response to the slow-down indicator, to facilitate slowing down the second information presentation portion from a defined rate of speed to a slower rate of speed that is slower than the defined rate of speed and continuing the broadcast transmission of the information associated with the second information presentation portion at the slower rate of speed.

13. The method of claim 12, further comprising:
transmitting, by the system, contextual information and location information associated with the first user equipment to the presentation management component, wherein the contextual information comprises a time constraint for the information presentation; and facilitating, by the system, accessing an interactive service of the set of interactive services by the first user equipment based on the contextual information and the location information, wherein the information presentation is associated with a tour.

14. The method of claim 13, further comprising:

transmitting, by the system, a set of preferences relating to the information presentation to the presentation management component; and receiving, by the system, the information presentation, wherein the information associated with the information presentation is customized based on the current location of the first user equipment, the time constraint, and the set of preferences, comprising the tour-related preference.

15. The method of claim 12, further comprising:

receiving, by the system, a pace-modification request from the second user equipment to request that the information presentation be temporarily suspended; and temporarily suspending, by the system, the information presentation for a defined amount of time in response to the receiving of the pace-modification request.

16. The method of claim 12, further comprising:

receiving, by the system, a service, wherein the service is associated with an online retail site.

17. The method of claim 12, further comprising:

configuring, by the system, the first user equipment to broadcast the information associated with the information presentation to the user equipment of the set of user equipment;

receiving, by the system, selection information to facilitate selecting a broadcast communication command; and broadcasting, by the system, the information associated with the information presentation to the user equipment of the set of user equipment in response to the selection of the broadcast communication command.

18. A system, comprising:

a memory that stores executable instructions; and a processor, communicatively coupled to the memory, that facilitates execution of the executable instructions to perform operations comprising:

facilitating a provisioning of a set of mobile communication devices to enable integration of the set of mobile communication devices with respect to presentation management to facilitate providing an information presentation and a set of interactive services relating to the information presentation to the set of mobile communication devices;

receiving clustering information indicating that mobile communication devices of the set of mobile communication devices are grouped into a cluster, wherein the set of mobile communication devices comprises a first mobile communication device and a second mobile communication device;

transmitting, to the first mobile communication device, a location of the second mobile communication device relative to the first mobile communication device to facilitate presenting the location of the second mobile communication device on a display screen of the first mobile communication device in response to the receiving the clustering information;

receiving a tour-related preference from the first mobile communication device, wherein the information presentation is associated with a tour, and the tour-related preference indicates that the information presentation is to be divided into a first portion of the information presentation in connection with the first mobile communication device and a second portion of the information presentation in connection with the second mobile communication device;

analyzing the tour-related preference and congestion information that is received from a sensor associated with a tour exhibit that relates to the information presentation, wherein the congestion information indicates a level of congestion associated with the tour exhibit due to traffic located in a defined area that is in proximity to the tour exhibit;

determining a first customized tour route relating to the first portion of the information presentation for use in connection with the first mobile communication device and a second customized tour route relating to the second portion of the information presentation for use in connection with the second mobile communication device based on the tour-related preference and the congestion information;

facilitating a broadcast transmission of information associated with the information presentation to mobile communication devices in the set of mobile communication devices;

receiving a slow-down indicator from the second mobile communication device; and adjusting the second portion of the information presentation, in response to the slow-down indicator, to facilitate slowing down the second portion of the information presentation from a defined rate of speed to a slower rate of speed that is slower than the defined rate of speed and continuing the broadcast transmission of the information associated with the second portion of the information presentation at the slower rate of speed.

19. The system of claim 18, wherein the operations further comprise:

identifying a current location of the first mobile communication device;

receiving a time constraint associated with the first mobile communication device;

receiving contextual information associated with the first mobile communication device, wherein the contextual information comprises a set of preferences of a user identity associated with the first mobile communication device, and the set of preferences comprises the tour-related preference; and generating the first portion of the information presentation to be customized based on the current location of the first mobile communication device, the time constraint associated with the first mobile communication device, and the contextual information.

20. The system of claim 19, wherein the operations further comprise:

receiving sensed information from a sensor that indicates that the first mobile communication device is within a defined distance of an exhibit associated with the tour; and in response to the receiving the sensed information, transmitting an exhibit-related portion of the information presentation relating to the exhibit to the first mobile communication device.

* * * * *